US006949024B2

(12) United States Patent
Kaku et al.

(10) Patent No.: US 6,949,024 B2
(45) Date of Patent: Sep. 27, 2005

(54) IMAGE PROCESSING APPARATUS FOR A GAME, METHOD AND PROGRAM FOR IMAGE PROCESSING FOR A GAME, AND COMPUTER-READABLE MEDIUM

(75) Inventors: Tetsuya Kaku, Tokyo (JP); Yuichiro Mine, Takamatsu (JP); Takashi Ono, Tokyo (JP); Norio Haga, Tokyo (JP); Makoto Osaki, Tokyo (JP); Takayuki Yamaguchi, Yokohama (JP); Norihiro Sekine, Tokyo (JP); Ryoya Yui, Tokyo (JP); Saori Nishikawa, Tokyo (JP); Tetsuya Sugimoto, Tokyo (JP); Shigeru Yoshida, Tokyo (JP); Manabu Nakatani, Tokyo (JP); Masumi Uchida, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 17 days.

(21) Appl. No.: 09/962,594

(22) Filed: Sep. 26, 2001

(65) Prior Publication Data

US 2002/0013172 A1 Jan. 31, 2002

Related U.S. Application Data

(62) Division of application No. 09/011,023, filed as application No. PCT/JP97/01896 on Jun. 4, 1997, now Pat. No. 6,322,448.

(30) Foreign Application Priority Data

Jun. 5, 1996 (JP) .............................................. 8-165224
Jun. 27, 1996 (JP) .............................................. 8-186666

(51) Int. Cl.$^7$ ................................................. A63F 13/00
(52) U.S. Cl. ......................................................... 463/31
(58) Field of Search ............................. 463/30, 31, 32, 463/33, 34

(56) References Cited

U.S. PATENT DOCUMENTS

| 4,342,454 A | * | 8/1982 | Baer et al. ..................... 463/31 |
| 4,423,870 A | * | 1/1984 | Bristow ........................ 463/31 |
| 4,905,147 A | * | 2/1990 | Logg ............................ 463/31 |
| 4,930,074 A | * | 5/1990 | McCarthy ..................... 463/31 |
| 5,229,756 A | | 7/1993 | Kosugi et al. |
| 5,238,250 A | * | 8/1993 | Leung et al. ................. 463/24 |
| 5,731,819 A | | 3/1998 | Gagne et al. ............... 345/433 |
| 5,755,620 A | * | 5/1998 | Yamamoto et al. ........... 463/34 |
| 5,812,138 A | * | 9/1998 | Devic ........................ 345/422 |
| 6,419,581 B2 | * | 7/2002 | Asai et al. ..................... 463/32 |

FOREIGN PATENT DOCUMENTS

| EP | 0 700 010 | 3/1996 |
| EP | 0 808 644 | 11/1997 |
| JP | 6-277362 | 10/1994 |

(Continued)

Primary Examiner—Michael O'Neill
(74) Attorney, Agent, or Firm—Finnegan, Henderson, Farabow, Garrett & Dunner, L.L.P.

(57) ABSTRACT

This image processing device for games is a device whereby a prescribed number of models (characters) are setup in virtual space, these models are controlled such that they move in prescribed directions in the virtual space, and images of this virtual space from a virtual viewpoint are displayed on means for display. In order to display the movement of the models that are arranged in virtual space more realistically, in one construction thereof, this device is provided with means for image processing that apply virtual centripetal force to the models. Furthermore, in order to display the movement of the models more realistically and to heighten the dramatic effect, in one construction thereof, this device is equipped with means for processing residual image presentation in order to represent the track of movement of a model as residual images. This means for processing is equipped with means for storage that store without modification motion data of the model prior to the current motion and with means for display control that display this stored data together with the current motion data.

12 Claims, 60 Drawing Sheets

FOREIGN PATENT DOCUMENTS

| | | |
|---|---|---|
| JP | 6-277363 | 10/1994 |
| JP | 7-105401 | 4/1995 |
| JP | 7-116343 | 5/1995 |
| JP | 7-191662 | 7/1995 |
| JP | 7-328228 | 12/1995 |
| JP | 8-137378 | 5/1996 |
| JP | 8-202342 | 8/1996 |
| WO | WO 95/10080 | 4/1995 |

* cited by examiner

FIG.7
(1)
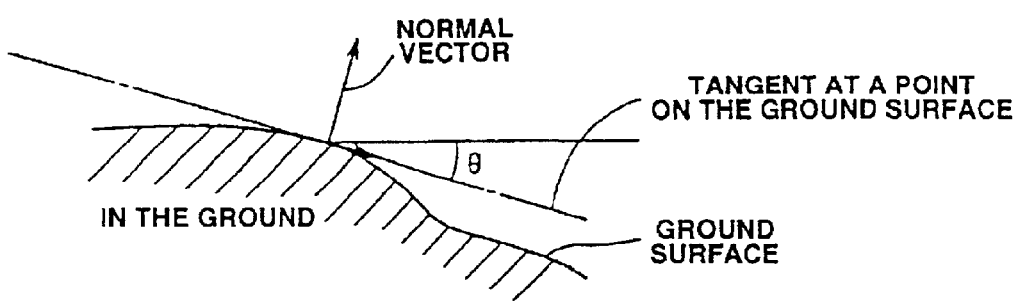
(2)
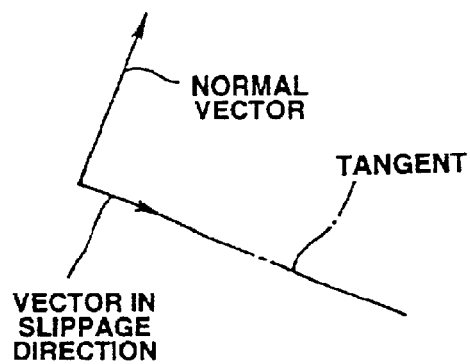

FIELD OF VIEW REGION FROM VIEWPOINT TO CHARACTERS 1 AND 2

FIG.27

| | COMMAND MOVE | FRAME NUMBER |
|---|---|---|
| 1 | Ⓟ Ⓟ Ⓟ | 002 |
| 2 | Ⓟ Ⓚ Ⓖ | 004 |
| 3 | Ⓟ + Ⓚ | 020 |
| | ⋮ | ⋮ |
| n | | |

(COMBINATION MOVEMENT)

| n | COMBINATION MOVE FILE #1 | REGISTERED BUTTON #1 |
|---|---|---|

Ⓟ (PUNCH) : BUTTON B
Ⓚ (KICK) : BUTTON C
Ⓖ (GUARD) : BUTTON A
+ : SIMULTANEOUS PUSH

FIG.30

KEY ASSIGN — 1P

| | |
|---|---|
| GUARD (G) | NOT USED |
| PUNCH (P) | SPECIAL 1 |
| KICK (K) | SPECIAL 2 |
| P+G | SPECIAL 3 |
| K+G | SPECIAL 4 |
| P+K | SPECIAL 5 |
| P+K+G | |

EDIT

| | |
|---|---|
| A | GUARD (G) |
| B | PUNCH (P) |
| C | KICK (K) |
| X | SPECIAL 1 |
| Y | NOT USED |
| Z | NOT USED |
| L | NOT USED |
| R | NOT USED |

COMBO $$\cos\theta = \frac{\vec{p} \cdot \vec{p}\,'}{|\vec{p}|\,|\vec{p}\,'|}$$

POINT OF OCCURRENCE : $(ox + spdx \times \frac{1}{10}, oy + spdy \times \frac{1}{10}, oz + spdz \times \frac{1}{10})$

S2100

WHEN IN THE AIR
    $l\_xspd = l\_xspd \times 0.87$
    $l\_yspd = l\_yspd \times 0.02$
    $l\_zspd = l\_zspd \times 0.87$ WHEN LANDED
    $l\_xspd = l\_xspd \times 0.50$
    $l\_yspd = 0$
    $l\_zspd = l\_zspd \times 0.50$

FIG.54
(1)
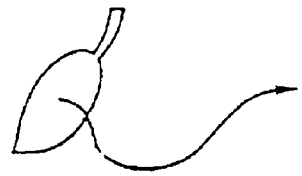
MOVEMENT WHEREBY CENTER
POSITION OF LEAF MOVES
UNDER THE INFLUENCE OF
WIND AND WEIGHT
(2)
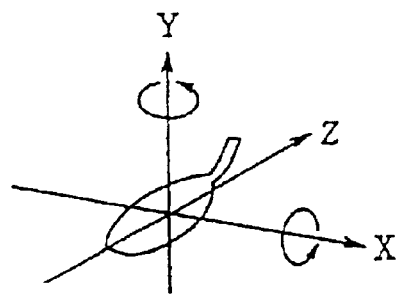
FLUTTERING
MOVEMENT OF LEAF

FIG.57

(A) 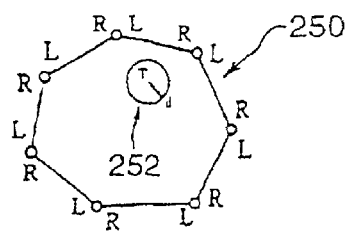

(B) 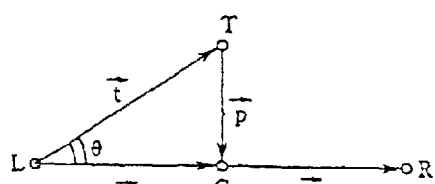

(C) 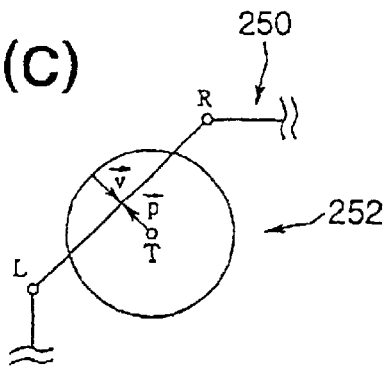

$\vec{r} = \vec{R} - \vec{L}$ $\vec{t} = \vec{T} - \vec{L}$ $\vec{p} = \vec{c} + \vec{L} - \vec{T}$ $cx = rx \cdot \frac{|\vec{c}|}{|\vec{r}|}$, $cz = rz \cdot \frac{|\vec{c}|}{|\vec{r}|}$

WHERE $|\vec{c}| = |\vec{t}| \cos\theta$

FROM DEFINITION OF INTERNAL PRODUCT $|\vec{r}| \cdot |\vec{t}| \cos\theta = rx\, tx + rz\, tz$ $\frac{|\vec{c}|}{|\vec{r}|} = \frac{rx\, tx + rz\, tz}{|\vec{r}|^2} = \frac{rx\, tx + rz\, tz}{rx^2 + rz^2}$

WHERE $0 < \frac{|\vec{c}|}{|\vec{r}|} < 1$ —— (3)

TAKING THE UNIT VECTOR AS PE OF EXPULSION VECTOR V, P, IF POINT T IS IN THE POSITIVE REGION OF STRAIGHT LINE LR $\vec{v} = (|\vec{p}| + d) \cdot \vec{pe}$ —— (1)

IF POINT T IS THE NEGATIVE REGION OF STRAIGHT LINE LR $\left. \begin{array}{l} |\vec{p}| - d < 0: \quad \vec{v} = (|\vec{p}| - d) \cdot (-\vec{pe}) \\ |\vec{p}| - d \geq 0: \quad \vec{v} = \vec{0} \end{array} \right\}$ (2)

IMAGE PROCESSING APPARATUS FOR A GAME, METHOD AND PROGRAM FOR IMAGE PROCESSING FOR A GAME, AND COMPUTER-READABLE MEDIUM

This is a division of application Ser. No. 09/011.023, filed Aug. 20, 1998, now U.S. Pat No. 6,322,448 itself a National Stage filing under 35 U.S.C. §371 of PCT/JP97/01896, filed Jun. 4, 1997 all of which are incorporated herein by reference.

TECHNICAL FIELD

The present invention relates to the processing of images in a virtually set-up game space (hereinbelow called "virtual space") (hereinbelow called "virtual images"); in particular, it relates to image processing for a game whereby the movement of a virtual model that is set up in virtual space (for example called a "character") on a screen can be represented more realistically. This image processing technique is suitable in particular for 3D video games machines.

BACKGROUND ART

Due to the development of computer graphics (CG) technologies, it has become possible to represent a virtual space (also called "virtual world") that is set up in virtual fashion three-dimensionally and in real time. This is the technical field of video games machines: these have been developed in recent years and incorporate a central processing unit (CPU) capable of high speed computation and a video display processor (VDP) and enable such computer graphics technologies to be utilised at high speed and in economical fashion.

In such a video games machine, the content of game play changes continually depending on the actions of the user (also called the game player or player), so the objects that are displayed have to be moved freely at high speed in virtual space. To this end, usually a model constituting an object to be displayed (for example a character) is constituted of a set of polygonal fragments called polygons of triangular or quadrilateral shape, and the movement of such models is displayed by simultaneously altering the spatial position of these polygons.

Also, when specified portions or faces of objects to be displayed such as the arms or legs of characters were to be moved simultaneously, a polygon data group consisting of an assembly of a plurality of polygons was taken as a unit and a spatial position was given to each polygon data group, so that the specified portions or faces could be moved simultaneously.

In recent years, so-called 3D (three-dimensional) games have attracted attention in the market, in which a character is made up of polygons and an image is represented on a monitor in which the movement of the character in virtual space is captured from a virtual viewpoint; simulations of fights between a plurality of wamors are particularly popular (for example, VIRTUAL FIGHTER™ made by Sega Enterprises Limited). In such a fighting simulation game, a player rapidly operates a stick or pad or button attached to a controller to make a warrior represented on the screen perform actions in accordance with commands determined by operation of the stick etc. The movements of the warrior are called "motion" and data in order to implement such motion is acquired using the "motion capture" technique. This data is then processed, if need be, and is utilised as final motion data in a 3D video games machine. In such a video game, in order to raise the product value, it is desirable to represent the movement of the character more realistically. More specifically, this consists in for example adding more varieties of movement whilst approaching very closely to the actions of an actual warrior. However, since the anticipated movements of a character extend over a very wide range of possibilities, there are many problems that still need improvement in order to achieve such an objective. Of course, consideration has been given to for example compiling beforehand all the desired motion data and storing this in memory and obtaining characteristic expressions in order to get such motion, but the problem is that a large amount of data is required for this, which is impossible to process in real time.

A chief object of the present invention is therefore to provide an image processing technique for games whereby the amount of calculation and/or the amount of data required for image processing can be greatly reduced and whereby the movement of the character on the screen can be expressed more in real time and more realistically.

First specific aspects of a problem that was experienced in conventional video games machines from the point of view of this object are as follows.

A1. In a 3D video game, since the image on the two-dimensional screen from the virtual viewpoint is represented by performing a projection conversion, it is difficult to move the warrior in the depth direction of the screen (z direction of virtual space) i.e. in the direction of the player's gaze, so no consideration at all was given to enabling a warrior to walk around other warriors. To improve such movement around the characters is therefore a first specific object of the present invention.

A2. With a conventional 3D video games machine, there was the problem that, since the images were displayed from a virtual viewpoint, if a structure such as a wall was arranged in virtual space in a position such as to screen the warrior, display was effected with the character blocked out. Accordingly, a further specific object of the present invention is to effect display in which this situation that the character is blocked out by a structure is improved.

A3. In a conventional video games machine, the method was adopted of generating the motion of the character sequentially using for example a spline function, or the method of effecting reproduction of predetermined patterns in sequential frames. However, with the conventional video games machine, this motion was fixed, so it was not possible to correct the motion to match the movement of a character on the other side etc. Accordingly, a further specific object of the present invention is to enable such motion correction to be performed.

Further, as a derivation from the viewpoint of the above chief object, in addition to the first aspects described above, it is desired to perform screen display with improved dramatic effect such as character movement, in order to raise product value. Second aspects of the problems of conventional video games machines when this demand is taken into consideration may be described specifically as follows.

B1. "Motion blur" is known as a technique for improving the dramatic effect of a CG image. By means of such motion blur, a large number of rays are generated at a single pixel, and coloration is applied wherein these are averaged, thereby enabling a picture to be created that shows "out-of focus" or movement.

Furthermore, in recent years, in the field of CG video such as video games, in order to raise the dramatic effect further, in movement of a character, display is effected together with residual images such as are liable to be produced physiologically in human visual perception. For example, residual images may be attached to the track of a sword that is being waved by a warrior. Persons skilled in the art would therefore calculate polygons and to constitute residual images matching the motion of the warrior and display these residual images in the vicinity of the warrior.

However, the anticipated movements of characters are extremely diverse, so compiling polygons for a large number of modes of residual images matching all these cases and storing these in memory restricts the performance of a limited computer graphics device and furthermore calculation of residual-image polygons in conformity with the motion of the character puts a large load on the computer graphics device. Accordingly, in the formation of a CG image, yet a further specific object of the present invention is to make it possible to display residual images simultaneously with the actual image screen without large increase in calculation load (or more precisely, reducing the load), even though measures are taken to raise the dramatic effect.

B2. In a games device using a conventional image processing device, flying material such as sand or water splashes is displayed on the screen (for example SEGA RALLY™ manufactured by Sega Enterprises Limited). However, since such water splashes or sand scattering consisted merely in mapping texture on to polygons, it was not possible to reflect accurately the movement of the model (car etc.) by the flying material. Yet a further specific object of the present invention is therefore to reflect the movement of the model more accurately in the flying material.

B3. The quality of the conventional image processing device was insufficient in simulation of movement of a model falling in virtual space. Yet a further specific object of the present invention is therefore to raise the quality of simulation of movement of free-fall through virtual space.

B4. In a conventional image processing device, the proximity of a zone in virtual space and a moving model were determined and if this determination was positive, movement of the model was restricted such as not to go beyond the zone. Usually, as zones of this type, fixed-shape, for example quadrilateral or circular, type zones were setup. In this case, since the zone was of a typical shape, it was easy to calculate movement that would expel the character from the zone. However, when this zone was irregularly shaped, there was the problem that it was difficult to cope with this situation with the conventional computer graphics device. Accordingly, yet a further specific object of the present invention is to enable the calculation processing of the movement (motion) of a model after there has been a positive determination of collision between the zone and the model to be executed accurately and easily.

B5. Conventionally, in the field of image processing applied in games devices, when a series of periodic pictures (for example, a picture of repeating waves or skipping etc.) was to be reproduced, a series of such pictures was compiled by a manual operation to produce a texture series and a series of images in which the same action was repeated were represented by repeated sequential mapping of these on to a polygon.

Since the compilation of such texture series requires a lot of manual work, attempts have been made to utilise application software. A known example of such application software is called by the trade name: Alias/Wavefront (manufactured by Alias/Wavefront Inc. (110 Richmond Street, East Toronto, Ontario, Canada, M5c 1p1). When such software is employed, the target texture series can be obtained by supplying prescribed parameters to the software.

However, when prior art software of this type is employed, pictures in which the starting and ending of the texture series i.e. the texture pattern (mode) are not continuous for the player often result.

There was therefore room for improvement in the creation of repeating pictures in the field of conventional image processing. It is therefore yet a further specific object of the present invention to enable the compilation of a texture series of this type by image processing.

B6. In a prior art image processing device, there were scenes in which, in order to improve the dramatic effect of the reproduced image, slow reproduction was performed in which the reproduction speed of character action was slowed down. However, the benefits of such slow-reproduction performance were limited. Yet a further specific object of the present invention is therefore to provide means for image processing for games whereby the speed of reproduction can be varied in order to create a better dramatic effect.

DISCLOSURE OF THE INVENTION

A chief object of the present invention is that there are provided from various viewpoints techniques for the processing of images for games whereby movement of characters on a screen can be represented in more real-time fashion and more realistically by greatly reducing the amount of computation and/or amount of data required for the image processing. In the present invention, various constructions given below are adopted in order to achieve various specific objects derived from this main object.

A series of constructions constituting a first aspect of the present invention are as follows. Specifically, according to the present invention, there is provided an image processing device for games wherein a prescribed number of models are set up in virtual space and these models are controlled such that they move in prescribed directions in the virtual space and images of this virtual space from the virtual viewpoint are displayed by means for display, comprising means for image processing whereby virtual centripetal force is applied to the models. There is also provided a games device equipped with this image processing device for games. Furthermore, there is provided a recording medium on which is recorded information containing a series of procedures for implementing this means for image processing.

Furthermore, according to the present invention, an image processing device of this type for games comprises means for image processing whereby the amount of frictional force that is applied to these models is varied when the models are moving and when they are stationary.

Furthermore, according to the present invention, an image processing device of this type for games comprises means for image processing whereby a projection image of the models is displayed matching the surface shape of a stage on which the models are placed. Further, according to the invention, an image processing device of this type for games comprises means for image processing whereby a determination is performed of overlap of the field of view created by the virtual viewpoint with respect to the model which is the subject of display and another model which is not set as the subject of display, and, if the result of this determination is affirmative, the other model is not displayed.

Further according to the present invention, there is provided an image processing device of this type for games comprising means for image processing whereby, with respect to the end-point of a predetermined movement track of the model, a target point is set up different from this end point and the movement track is interpolated such that the end point coincides with this target point.

Further according to the present invention, there is provided an image processing device of this type for games comprising means for image processing whereby a difference of level at which the model is positioned in the virtual space is found and the action which is applied to this model is interpolated in accordance with this level difference.

By means of such constructions, the movement of the model such as a character that is arranged in virtual space can be displayed more realistically. Specifically, images whereby one model moves around another model can be easily generated. Furthermore, the condition of the stage on which the model is placed can be reflected in the movement of the model. Furthermore, unevenness of the stage can be reflected accurately and in a simple manner in the projection image of the model. Furthermore, even if a structural object is a wall arranged in virtual space at a position which would screen the model, display can be effected without the model being screened. Also, versatile movement of the model can be represented in a reliable manner since it is possible to correct motion of the model by matching it to movement etc. of the other model. Furthermore, more realistic images can be generated since it is possible to take into account level differences between models.

Also, a series of constructions that constitute a further aspect of the present invention is disclosed below. As one specific construction thereof, according to the present invention there is provided an image processing device for games wherein a prescribed number of models are set up in virtual space and these models are controlled such that they move in prescribed directions in the virtual space and images of this virtual space from a viewpoint of prescribed position are displayed by means for display; comprising means for residual image representation processing for representing the track of movement of a model as residual images; this means for processing comprising means for storage whereby motion data of the model before the current motion are stored without modification and means for display control whereby this stored data is displayed together with current motion data of the model. This means for display control may comprise means for dramatic effects for effecting display with addition of dramatic effects to the data of the means for storage. This means for dramatic effects may perform semi-transparent image processing.

As a further specific construction, according to the present invention, there is provided an image processing device for games wherein a prescribed number of models are set up in virtual space and these models are controlled such that they move in prescribed directions in the virtual space and images of this virtual space from a viewpoint at a prescribed position are displayed by means for display; comprising means for dramatic effects that apply dramatic effects to the movement characteristic of the model and means for controlling flying material that cause flying material to be present in the virtual space and that control the series of movements of this flying material in accordance with the results of the calculation by the means for calculation. As a further specific construction, according to the present invention, there is provided an image processing device for games wherein free-fall movement of a model set in virtual space is simulated and comprising first means for simulating overall movement of the model and second means for conferring a circulating movement on the model. Further, as another specific construction, according to the present invention, there is provided an image processing device for games wherein a prescribed number of models are set up in virtual space and these models are controlled such that they move in prescribed directions in the virtual space and images of this virtual space from a viewpoint at a prescribed position are displayed by means for display; comprising means for setting up a zone that set up an irregularly shaped zone in the virtual space; means for setting up a vector consisting of means for setting up a prescribed vector between this zone and this model and that, if this model tries to move beyond this zone, sets up this vector in a direction such that the model does not go beyond the zone; and means for controlling model movement that control the movement of the model in accordance with this vector.

Furthermore, as a further specific construction, according to the present invention, in a device in which texture is formed that varies in periodic fashion on application of a prescribed parameter, there are provided first means for creating a first texture series and means for creating a second texture series and a texture series is formed wherein parameters are applied to the respective means such that the first or last texture of the first texture series and the first or last texture of the second texture series are constituted in continuous mode and the degree of transparency of at least one of the first texture series and second texture series is gradually increased or decreased with the object that superposition is effected in order from the first textures of both texture series.

Also, according to the present invention, in a method of forming texture series wherein periodically changing textures are formed, there are provided a first step of creating a first texture series which changes in a prescribed direction and a step of creating a second texture series that likewise changes in a prescribed direction and wherein the last or first texture of the first texture series and the first or last texture of the second texture series are made to be constituted in continuous mode and the degree of transparency of at least one of the first texture series and second texture series is gradually increased or gradually decreased with the object that superposition is effected in order from the first textures of both texture series.

Further, as a further specific construction, according to the present invention, there is provided an image processing device for games wherein a prescribed number of models are set up in virtual space and these models are controlled such that they move in prescribed directions in the virtual space and images of this virtual space from a viewpoint in prescribed position are displayed by means for display; comprising first means that determines whether or not a prescribed condition is established between two models; second means for reflecting the establishment of the condition in the movement of the respective models and third means for, if this condition is established, changing the reproduction speed of movement of one model with respect to the other model.

By means of such constructions, the movement of models in virtual space can be represented more realistically and games images that are rich in dramatic effects can be generated. In more detail, with one specific construction, there can be provided an image processing device for games in which large calculating load is not applied even though measures are taken to improve the dramatic effects in forming game images. Also, with another specific construction, there can be provided an image processing device for games whereby, even though such load is small, residual images can be displayed simultaneously with the real image screen. Furthermore, according to a further specific construction, there can be provided an image processing device for games wherein movement of a model can be accurately reflected in flying material. Further, with a further specific construction, there can be provided an image processing device for games whereby simulation of higher quality of free-fall movement in virtual space can be achieved. Further, according to a further specific construction, there can be provided an image processing device for games whereby calculation processing of movement (motion) of a model after an affirmative determination of collision between a zone and a model can be executed easily and reliably even for the case of an irregularly shaped zone. Further, according to a further specific construction, a series of texture series can be created whereby continuous images can be represented without a feeling of incompatibility even though display is repeated and image processing is employed. Yet further, with a further specific construction, there can be provided an image processing device for games in which the speed of reproduction can be varied to create a better dramatic effect.

BRIEF DESCRIPTION OF THE DRAWINGS

FIG. 7 is a diagram of the principles of virtual frictional processing;

FIG. 27 is a diagram illustrating file structure for a combining technique;

FIG. 30 is a front view displaying another screen displayed by this processing step;

FIG. 54 is a view illustrating a mode of movement of flying material;

FIG. 57 is a diagram illustrating the principles of collision determination processing of an irregularly shaped zone and a model;

BEST MODE FOR CARRYING OUT THE INVENTION

Preferred embodiments of the present invention are described below with reference to the drawings, in respect of a video games machine constituting an image processing device.

First Embodiment

A first embodiment of a video games machine is described with reference to FIG. 1~FIG. 33.

Description of the Hardware

Figure 1:
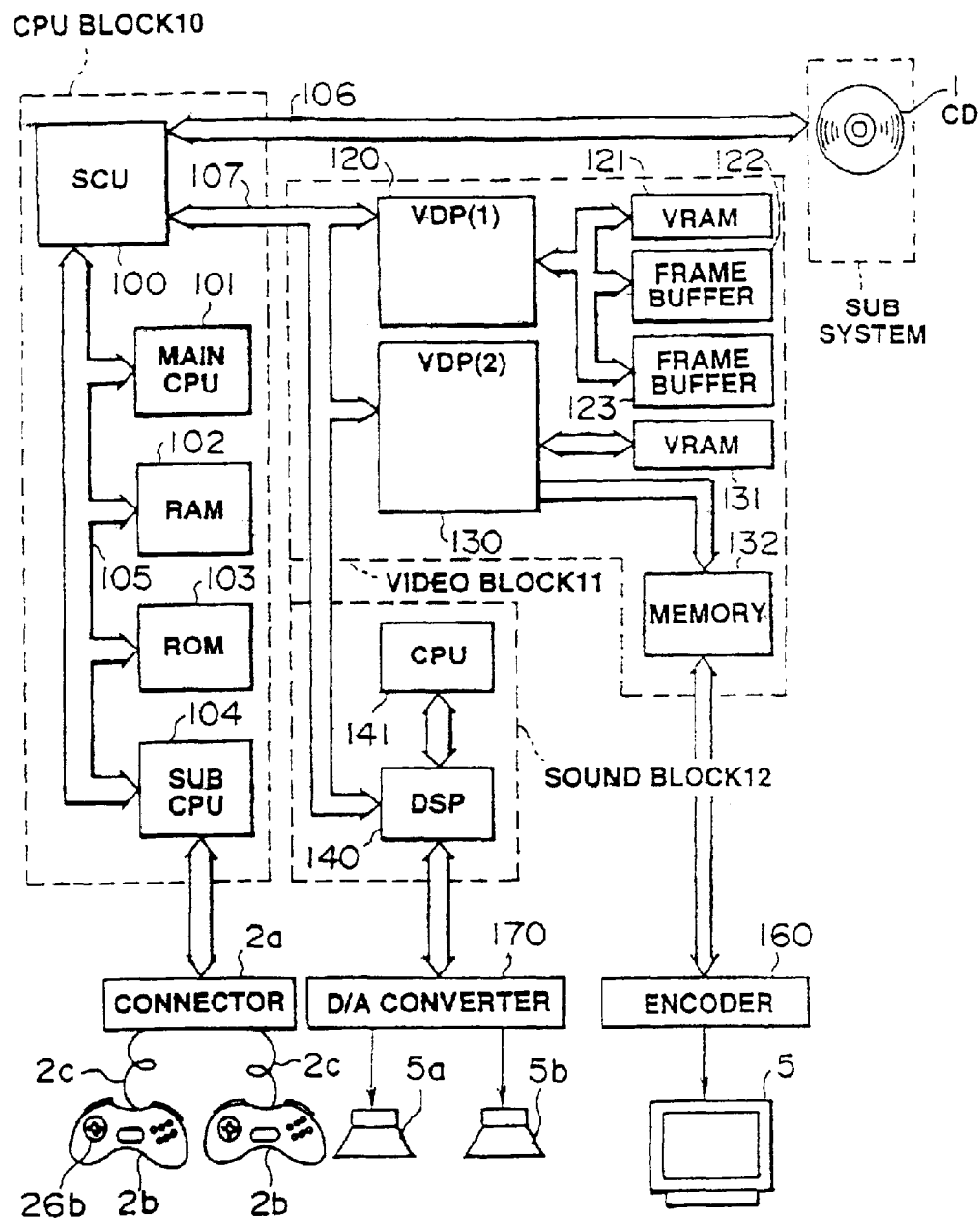
FIG. 1 is a block diagram of a video games machine constituting an image processing device according to an embodiment of the present invention.

FIG. 1 is a block diagram of this video games machine. Respective image generation and processing No. 1 to No. 6, to be described, are executed by this video games machine.

This video games machine comprises: a CPU block 10 that performs control of the device as a whole, a video block 11 that performs display control of the game screen, a sound block 12 that generates effects sounds etc., and a subsystem 13 that performs reading of a CD-ROM.

CPU block 10 comprises an SCU (System Control Unit) 100, main CPU 101, RAM 102, ROM 103, sub CPU 104, and CPU bus 105 etc. This block is the heart of the image processing device of the present invention. Main CPU 101 incorporates a DSP (Digital Signal Processor), which executes computer programs at high speed. RAM 102 stores polygon data of various types that are sent to it from subsystem 13 that reads the CD-ROM, and is also employed as a work area of the main CPU 101.

ROM 103 stores an initial program for initial processing in the initial condition of the device. SCU 100 governs the transfer of data that is performed through bus 105, 106 and 107. Also, SCU 100 incorporates a DMA controller that sends the image data required during running of a game to VRAM in video block 11. Control pad 2b functions as means for information input by the user and is equipped with various buttons needed for operation. Sub CPU 104 is called an SMPC (System Manager & Peripheral Controller) and has the function of collecting peripheral data from controller 2b in accordance with requests from main CPU 101.

Main CPU 101 performs processing such as movement of an image displayed on a display in accordance with peripheral data sent to it from sub CPU 104. Sub CPU 104 identifies the peripheral equipment that is connected to connector 2a (terminal of the main unit) and collects peripheral data in accordance with the communication system corresponding to the type of peripheral equipment that has thus been identified.

Video block 11 acts as means for figure generation and comprises a VDP (Video Display Processor) 120 for generating an image displayed using polygons and a VDP 130 that performs image synthesis, shaded surface processing, and clipping for the background image. It is connected to VDP 121 and frame buffers 122, 123.

When an image to be displayed on the display is generated in virtual space, the polygon data necessary for display are sent from CPU 101 through SCU 100 to VDP 120 and are written to VRAM 121. The polygon data written in VRAM 121 are stored in image-drawing frame buffer 121 or 123 as image-drawing data including color information of 16 bits or 8 bits per pixel. The image-drawing data that are stored are sent to VDP 130. Main CPU 101 supplies control information to control image drawing through SCU 100 to VDP 130. VDP 130 controls the image-drawing data in accordance with this control information.

VDP 130 is connected to VRAM 131 and comprises a scroll function whereby the entire display screen is shifted vertically or horizontally or is rotated and a priority function (Z sort or Z buffer) that determines the order of display of polygons. VDP 130 outputs image-drawing data through memory 132 to encoder 160. Image-drawing data output to encoder 160 is converted to video-signal format and is then subjected to D/A conversion and displayed on monitor device 5. An image is displayed on monitor device 5 based on this video signal.

Sound block 12 comprises a DSP 140 that performs audio synthesis by the PCM system or FM system and a CPU 141 that controls DSP 140. The audio data generated by DSP 140 is output to two speakers 5a or 5b by D/A converter 170 after conversion to a two-channel signal. Subsystem 13 includes a CD-ROM drive etc. and is equipped with a function of reading application software supplied by a recording medium such as a CD-ROM and a generating video etc.

Figure 2:
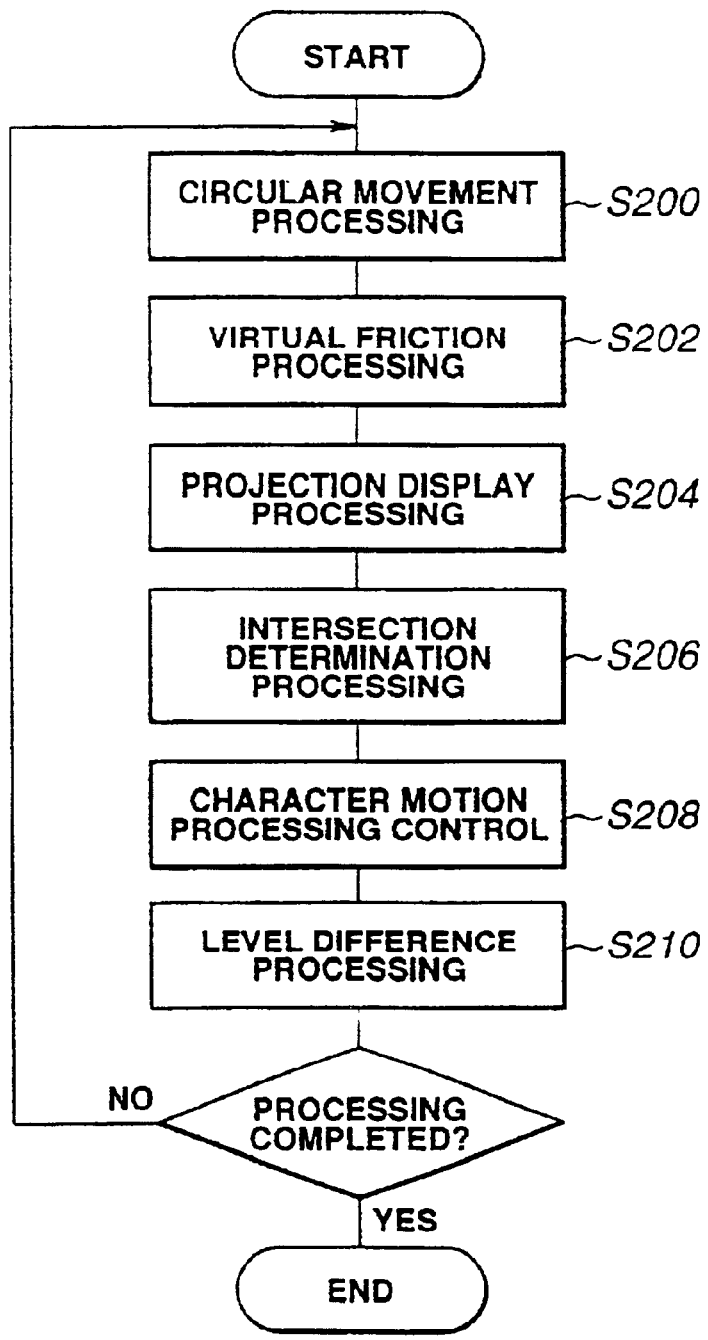
FIG. 2 is a flow chart showing the main processing in a first embodiment.

The processing performed by an image generating device as described above will now be described. FIG. 2 is a flow chart showing the main processing executed by CPU block 10. The following are executed in sequence: circular movement processing S200 for moving a character in a circle virtual friction processing step S202, display of a shadow on the ground when there is a difference of level (S204) i.e. projection display processing of a character, intersection determination processing (S206), character motion processing control (S208), and character level difference processing (S210). Processing which is not essential is not performed but is shifted to subsequent processing. The content of each processing is described in detail below.

Circular Movement Processing

In general terms, the effect of this processing is as follows. When a direction key 26b (also see FIG. 26) formed with a + on control pad 2b, to be described, is operated to the left or the right in the Figure, the character (warrior) 30 that is operated by this direction key (see FIG. 3) is moved in the vertical or horizontal direction in virtual space. In circular motion processing mode, a virtual centripetal force (force directed to the other side's character is applied between a warrior 30 operated by the player and a warrior 32 operated by the other side, causing processing 30 to be executed whereby warrior 30 of the player automatically goes round (circular motion) the other side's warrior.

Figure 4:
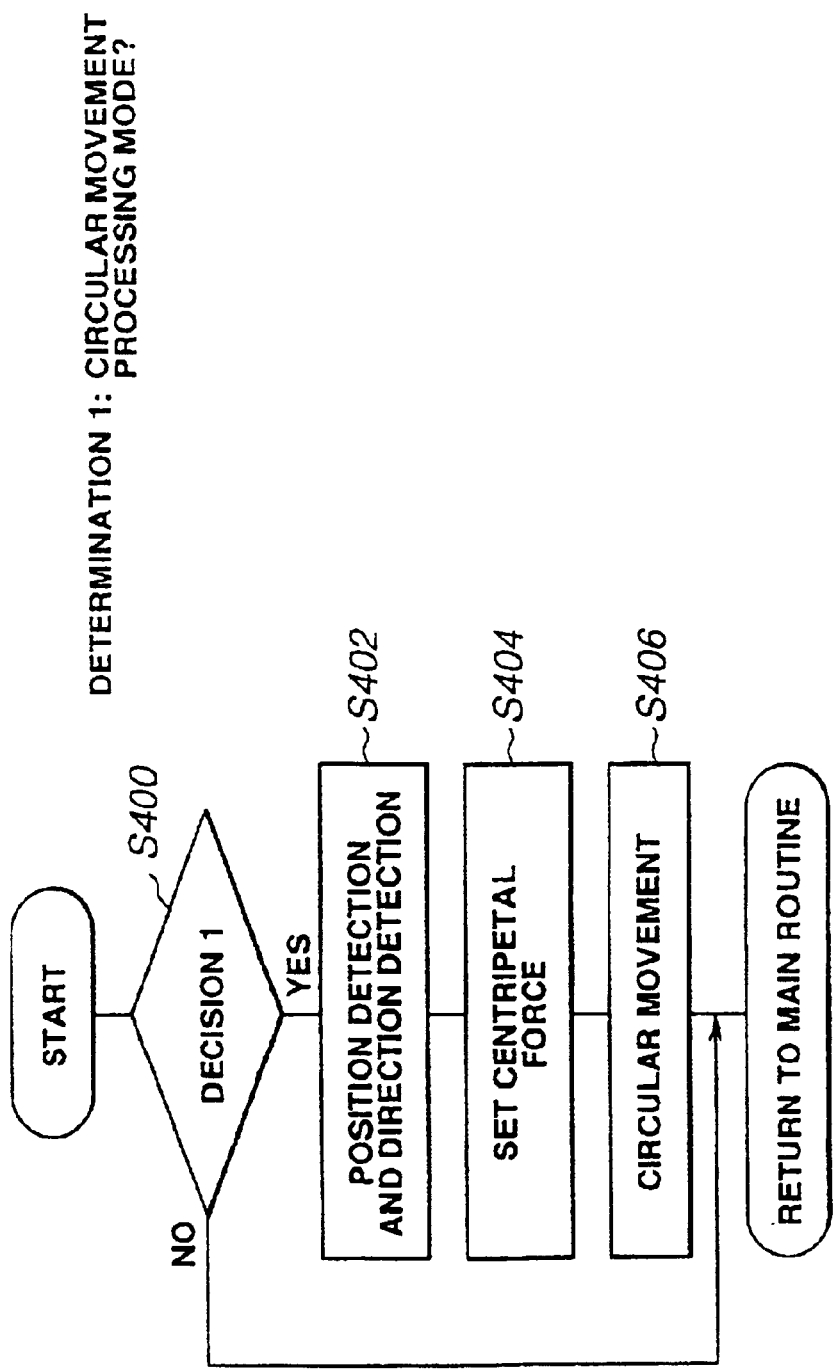
FIG. 4 is a detailed flow chart of circular movement processing.

The details of this processing will now be described with reference to the flow chart of FIG. 4. In step 400, a determination is made (determination 1) as to whether the circular motion processing mode has been entered or not. A circular motion request is deemed to have been made if the player has performed a prescribed operation. This may be for example pressing of a prescribed button on the controller (pad 2*b*). Next, by for example reading the amount of operation in the left/right direction in the drawing of the direction key 26*b* of FIG. 26, the position of the player's warrior and the other side's warrior are detected and the direction that the other side's warrior presents with respect to the player's warrior is calculated (step 402).

Next, an angle in this direction is applied to the player's warrior 30 and virtual centripetal force towards the other side's warrior is applied to this warrior (step 404). Considered physically, this centripetal force is equivalent to an attractive force acting between the two objects.

If the x co-ordinate and z co-ordinate of the other side's warrior are respectively taken as (exp, ezp), and the x co-ordinate and z co-ordinate on the other side's warrior are respectively taken as (mxp, mzp), the direction of the other side's warrior 32, as described above, is calculated from: arctan (exp-mxp, ezp-mzp). For convenience, the y-direction co-ordinate i.e. the height direction of the warriors on both sides is neglected in this calculation.

Figure 3:
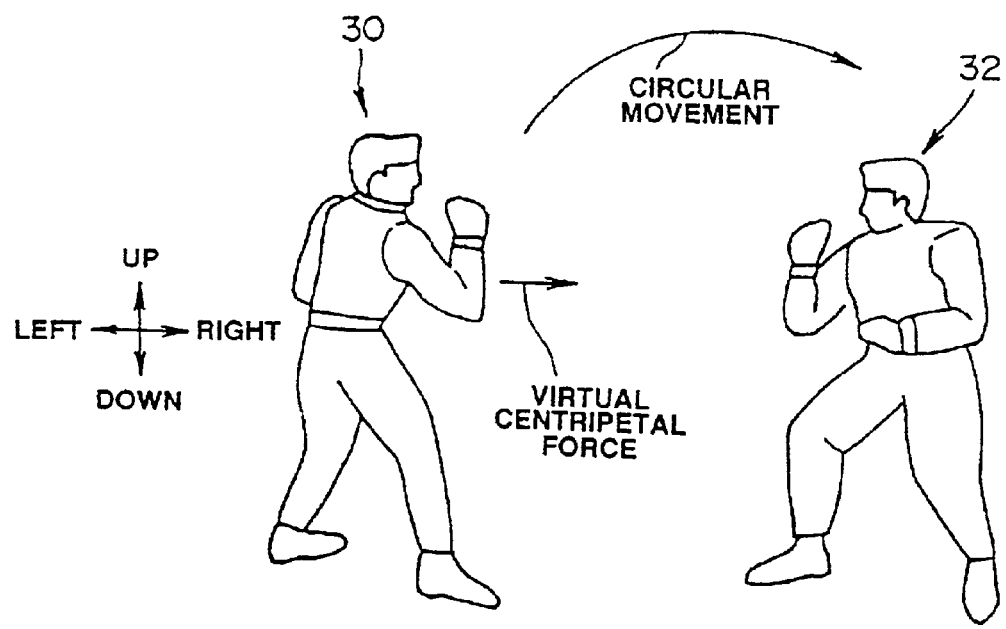
FIG. 3 is a perspective view showing circular movement of a character in circular movement processing.
Figure 5:
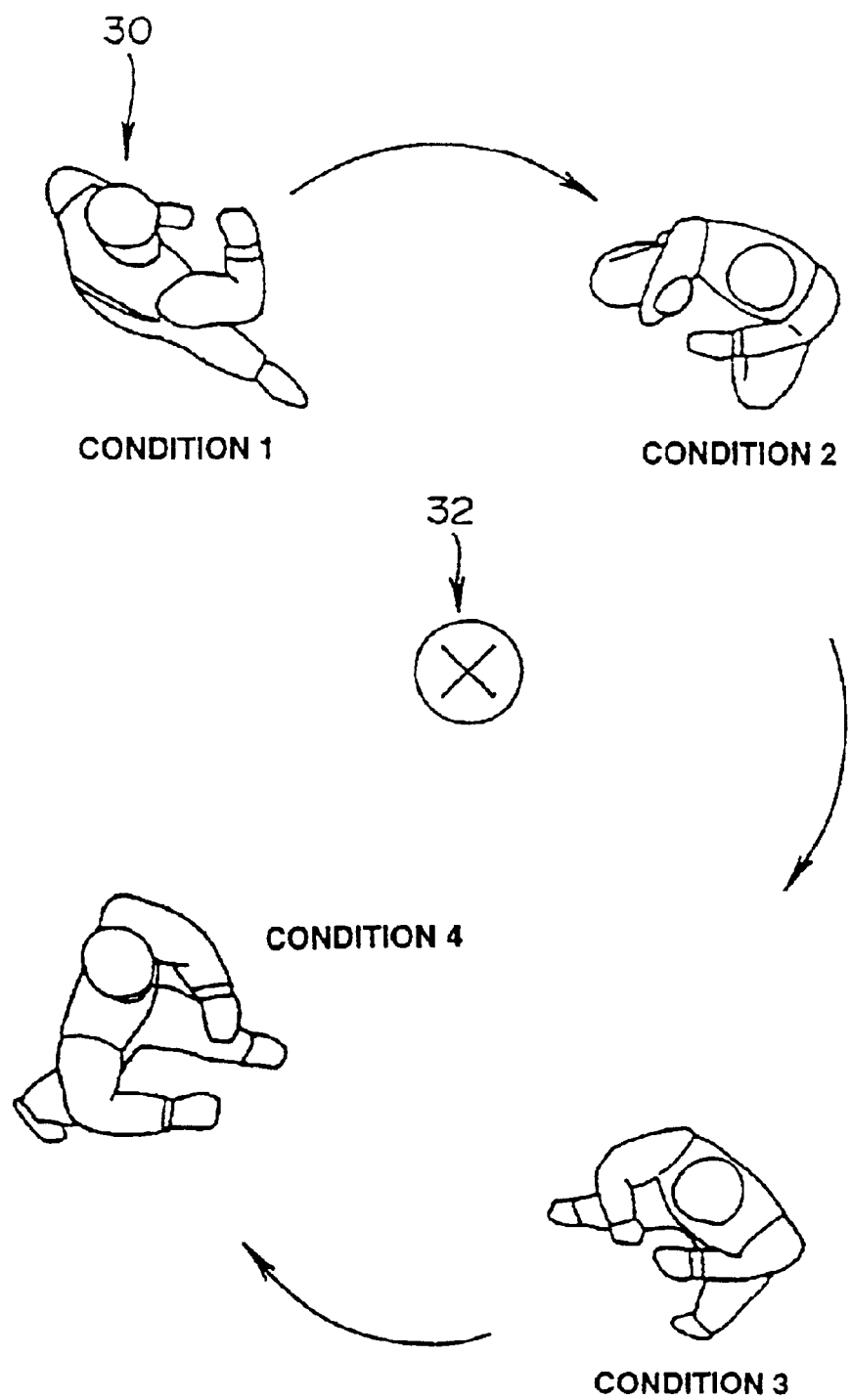
FIG. 5 is a diagram illustrating circular movement in virtual space.
Figure 6:
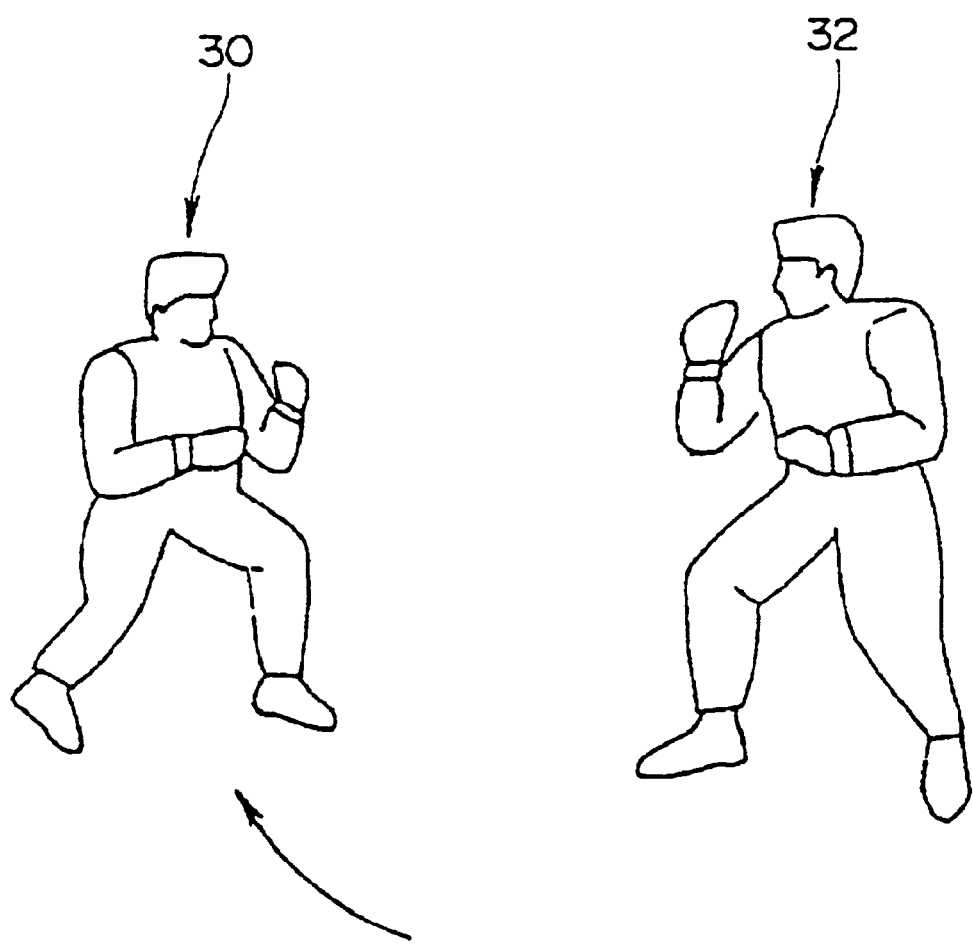
FIG. 6 is a perspective view corresponding to a condition of completion of circular movement.

As a result, circular motion in virtual space is produced (step 406) in accordance with the speed in the horizontal direction produced by the transverse direction key and the centripetal force. By means of this circular motion, the player's warrior 30 is made to move around the other player's warrior 32 whilst facing the other player's warrior. FIG. 5 is a conceptual diagram seen from above in virtual space of this circular movement, in which a warrior 30 performs circular movement from condition 1 through condition 2 and condition 3 to condition 4. FIG. 3 described above is an image in virtual space according to condition 1 displayed from a prescribed viewpoint, being the image displayed on monitor 5 described above (see FIG. 1). FIG. 6 is an image like that of FIG. 3 relating to condition 4.

Figure 26:
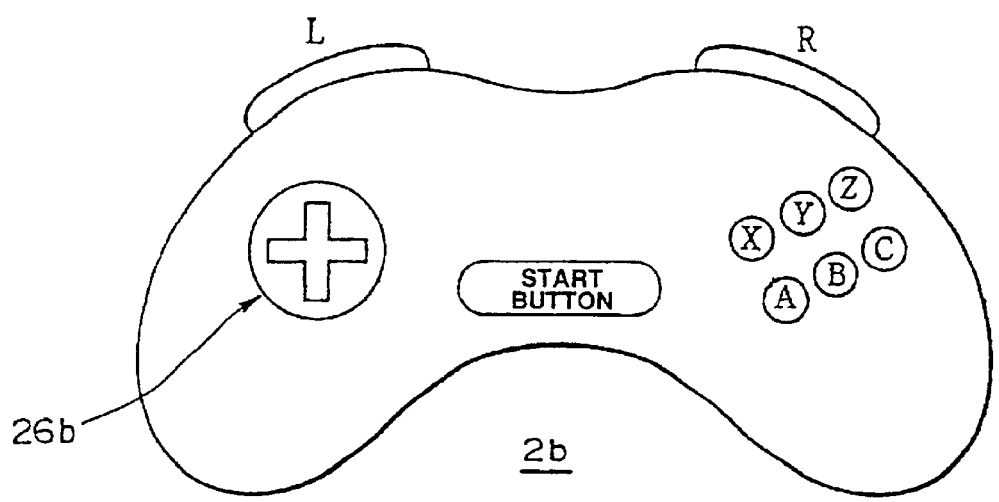
FIG. 26 is a front view of a control pad to a larger scale.

Consequently, with the circular movement processing described, a single character is given a virtual centripetal force, so the player, simply by operating direction key 26*b* of FIG. 26 in the horizontal direction in the drawing, can easily apply a circular movement to character 30. For example, movement whereby warrior 30 which [the player] is himself operating moves around the other side's warrior 32 as described above can easily be implemented.

Virtual Friction Processing

The effect of this processing is that the movement of the character is made more varied by altering the slippage in the movement of the character depending on the slope of the ground surface and the frictional force acting on the character in accordance with the nature of the ground surface, and applying dynamic friction when the character is moving and static friction when the character is not moving.

Figure 8:
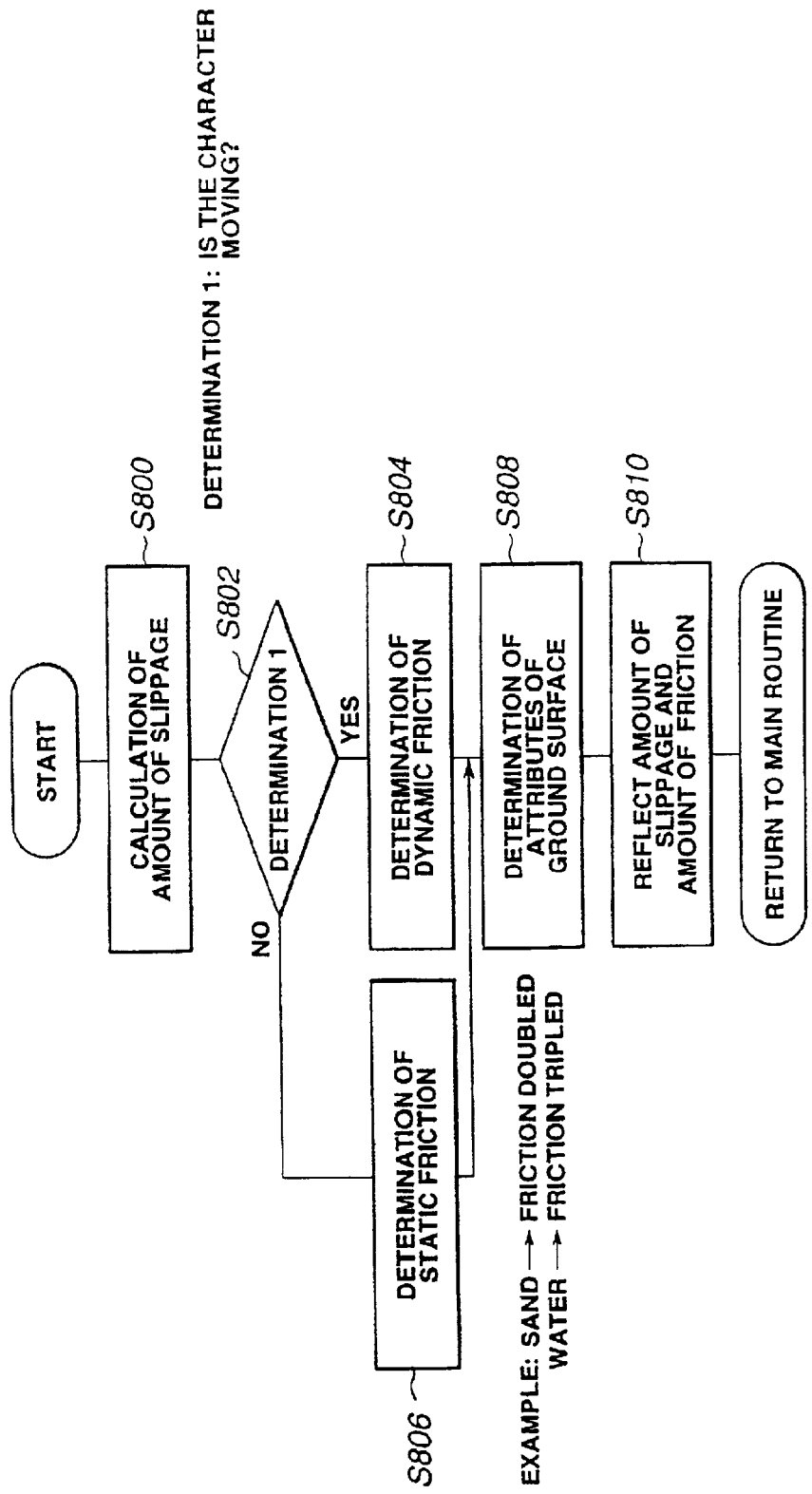
FIG. 8 is a detailed flow chart of virtual frictional processing.

First of all, FIG. 7 shows a cross-section of the ground surface in virtual space. As shown in FIG. 8, the amount of slippage is calculated as follows from the slope of the ground surface in step 800.

Amount of slippage $(=dv/dt)=ivg$ where i is a prescribed constant v is a unit normal vector expressing the slope of the ground surface and g is the acceleration due to gravity.

As shown in FIG. 7(1), the unit normal vector is a normal vector with respect to the tangential direction to the ground surface. When the angle ($\theta$) that this normal unit vector makes to the co-ordinate axis (x axis) in virtual space gets large, a larger amount of sliding (acceleration) tending to descend along the sloping ground surface is applied to a character who is on this ground surface.

Next, in step 802, a determination is made as to whether the character (warrior) is moving or not. This is done for example from the point of view of the player by determining whether or not the direction key for controlling movement of the warrior is being operated (determination 1).

If the character is moving, dynamic friction is applied; if the character is not moving, static friction is applied (steps 804, 806). The friction (=dv/dt) itself is calculated as follows.

$$M.(dv/dt)=\mu.S.M(g.\cos\theta+(dv'/dt).\sin\theta)$$

$$dv/dt=T.g.\cos\theta+T.(dv'/dt).\sin\theta$$

where M is the weight v is the frictional speed (speed of the object after calculation)

v' is the speed of the object $\mu$ is the coefficient of friction

S is the ground-contacting area of the character (constant)

g is the acceleration due to gravity (constant)

$\theta$ is the angle of the ground surface

T=$\mu$. S

The dynamic friction and static friction are determined by applying prescribed processing to the friction (or coefficient of friction) obtained by this expression. The static friction has a larger value than the dynamic friction. This friction changes depending on the angle of the ground surface, the friction being smaller as the slope of the ground surface is increased.

Next the attributes of the ground surface are determined. That is, it is determined whether the surface on which the character is grounded is for example a water location or a sandy location. These attributes are applied virtually beforehand to each ground surface. For example, the amount of friction calculated in the case of a sandy location is taken to be doubled and the amount of friction in the case of a water location is taken to be tripled. This is then reflected (step 810) so as to subtract this frictional force from the amount of slippage that was previously calculated.

Thanks to this processing, static friction or dynamic friction is constantly applied to the character, so once a character has stopped it will not readily move off again, but once it has started moving it becomes easier to move. Also, the movement characteristics of the character can be-altered depending on the attributes of the ground. By this means, movement of a character can be represented very realistically.

Figure 9:
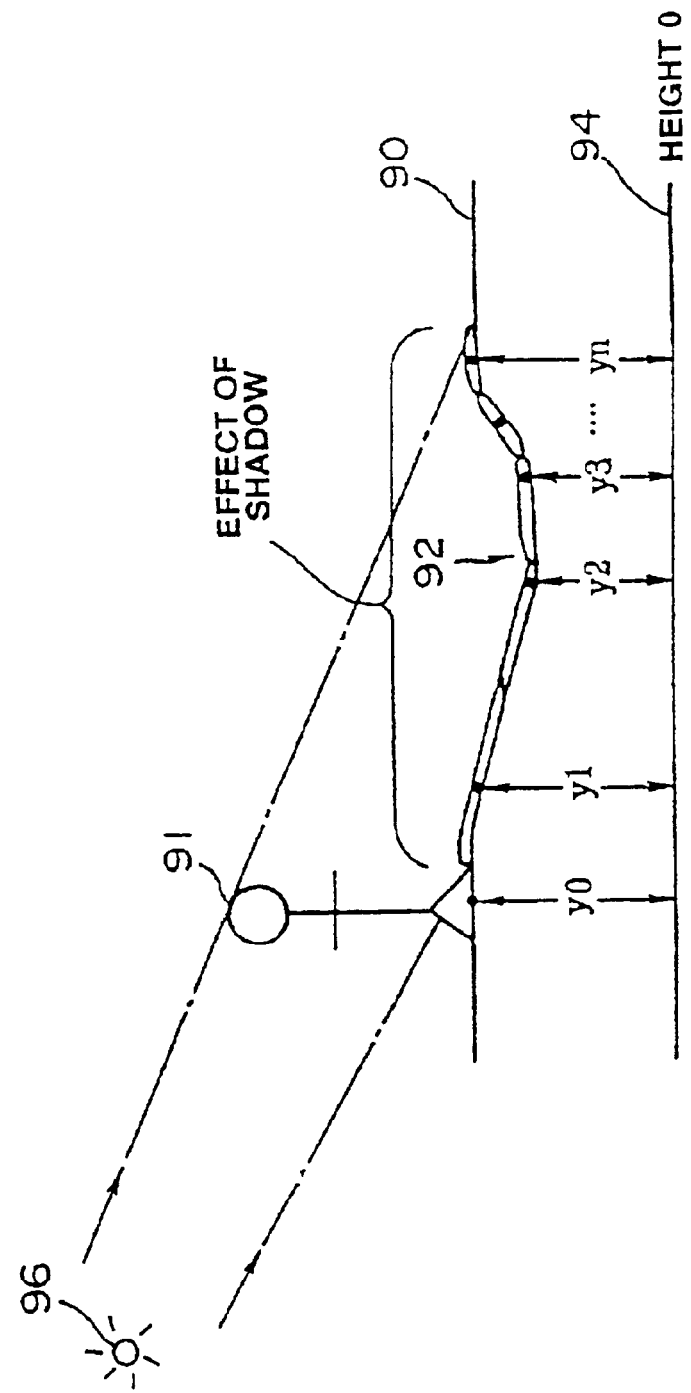
FIG. 9 is a diagram of the principles of projection display processing.

Display of shadow on to a ground surface having a level difference:

As shown in FIG. 9, the effect of this processing is that, when there is irregularity 91 of the ground surface 90 on which character 91 is standing, the shadow (projected image) of the character can be represented by a simpler calculation whilst applying irregularity to this ground surface. An outline of this processing is shown in FIG. 9. 92 in this Figure is a virtual reference line of height 0 and 96 is a parallel light source at infinite distance. This character is constituted of a set of objects such as head, breast, abdomen, hips and legs etc. Each object is created by a plurality of polygons. yG in the drawing is the distance from the base line to the ground surface where the character is standing and y1 . . . yn are the distances from each object to the base line. This processing is calculated using the following expression.

$$E'(x', y', z')=Ms.E(x, y, z)$$

a where E'(x', y', z') are the co-ordinates of the shadow.
E(x, y, z) are the co-ordinates of the character and
Ms is the matrix (matrix expression) for converting the shadow co-ordinates to the world co-ordinate system.
This Ms is given as follows.

$$Ms=Mu.(-Tyg).Pn.Tyn.(-Tsn).Rn.Tsn$$

Mu is a conversion matrix for converting the co-ordinates of the character to the world co-ordinate system of FIG. 9.

Tyg is a parallel movement matrix for producing parallel movement from the ground surface on which the character is standing up to the base line.

Pn is a conversion matrix for slantwise projection of the character on to the base line.

Tyn is a matrix for effecting parallel movement of the slantwise projected shadow to the ground-contacting point of each object (i.e. the ground surface where each object is located).

Tsn is a parallel movement matrix for effecting parallel movement of each object with respect to the origin of the world co-ordinate system.

Rn is a matrix for rotating shadow polygons in accordance with the slope of the ground.

This processing is carried out by the following steps.

Processing step 1: Human-like character 91 for creating a shadow is subjected to parallel movement from the ground surface to base line of height 0; then Processing step 2: This human-like polygon set 91 is projected slantwise on to reference line 94 using parallel light source 96; then Processing step 3: The slantwise projected objects are respectively moved in parallel for each object with width y1 . . . yn as far as the ground surface; then Processing step 4: Each object is moved in parallel from the position of the world co-ordinate system up to the origin of this system; then Processing step 5: Each object is rotated in accordance with the respective angle of the ground surface; and finally Processing step 6: Parallel movement is performed to return the objects that have been moved to the origin by processing step 4 to their original co-ordinate system.

Consequently, by this processing, if there is irregularity in ground surface 90, the projected image of a character can be displayed in a simple manner on ground surface 90 incorporating such irregularity in a manner matching this irregularity.

Figure 10:
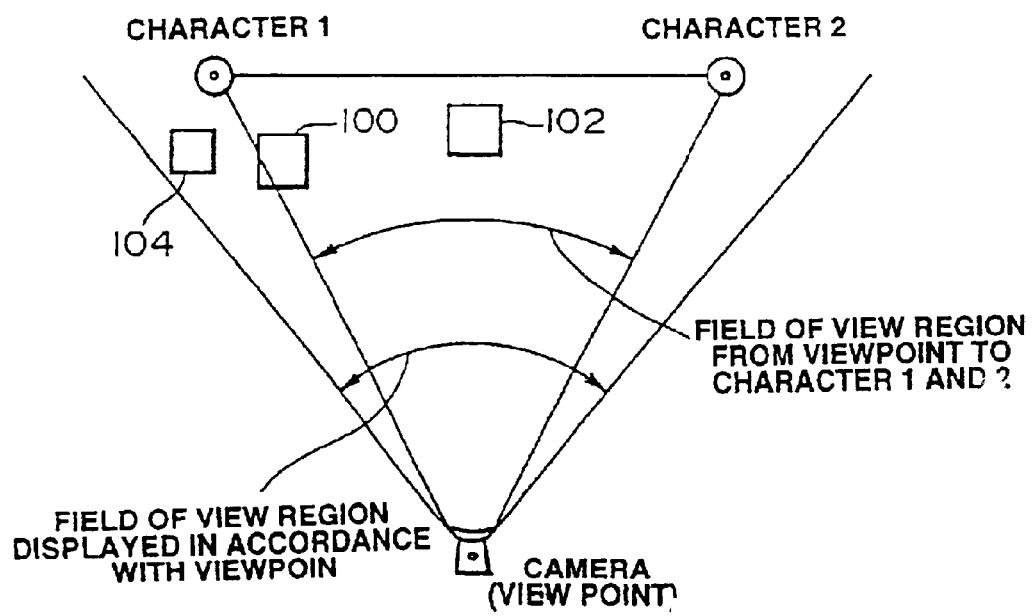
FIG. 10 is a diagram of the principles of intersection determination processing.
Figure 11:
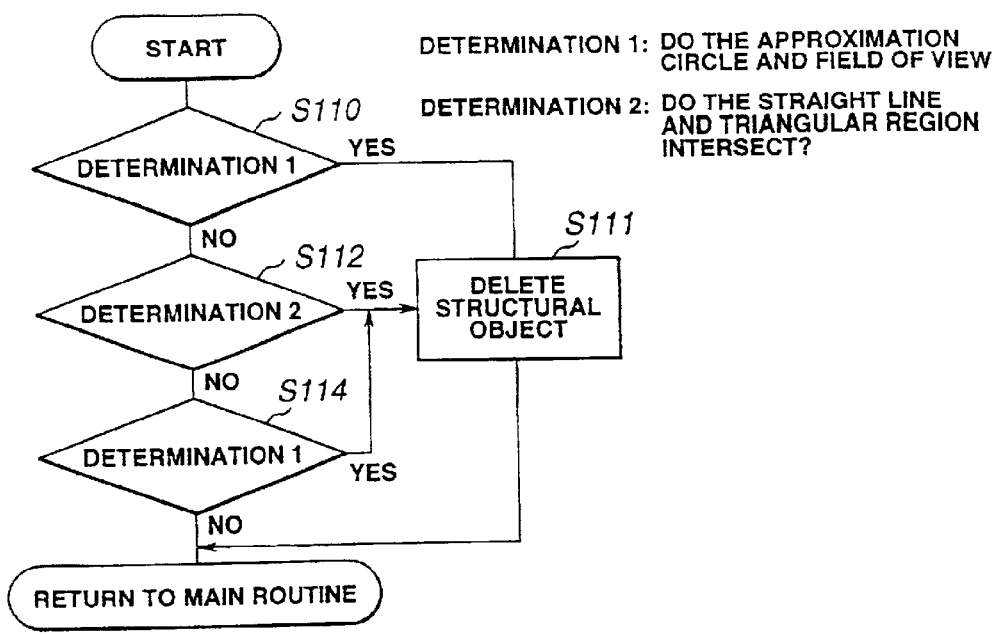
FIG. 11 is a detailed flow chart of intersection determination processing.
Figure 12:
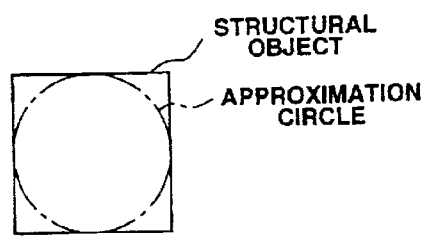
FIG. 12 is a xz plane view of a structural object approximated by an inscribed circle.

Intersection Determination Processing:

FIG. 10 is a xz plan view showing the region of the field-of-view of a virtual camera that picks up two characters, for example warriors facing each other (character 1, character 2). An image as shown in FIG. 3 already described is displayed by this virtual camera (viewpoint). In this processing, when this field-of-view region is overlaid by virtual structural objects other than the warriors, such as walls or buildings that screen the field-of view region, arrangements are made not to display some or all of such structural objects. In FIG. 10, while structural objects 100, 102 screen the field-of-view region from the viewpoint to the character, structural object 104 does not obstruct the region of the former, notwithstanding that, depending on the viewpoint, it is in the displayed region. In this case, image generation or image processing is performed to delete structural objects 102 and 104. FIG. 11 is a flow chart showing this processing. In this processing, in order to speed up and facilitate the determination of whether or not such structural objects overlay the field-of-view region, the determination is performed in the xz co-ordinate plane, and objects having thickness are approximated by circles. FIG. 12 is a xz plan view showing how such a structural object is approximated by an inscribed circle.

Figure 13:
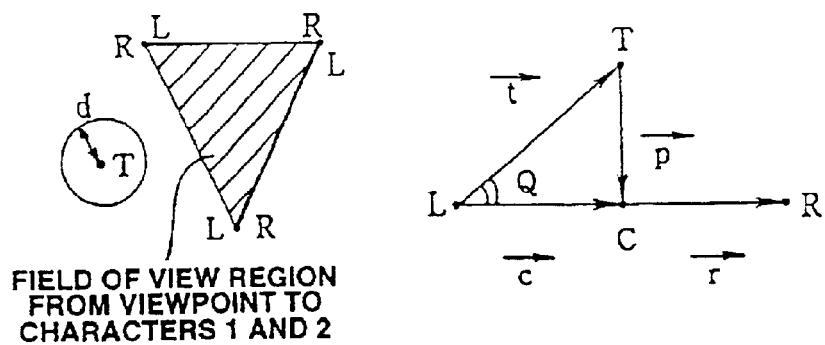
FIG. 13 is a diagram illustrating the principles of a specific example of intersection determination processing.

In FIG. 11, step 110 is the processing to determine whether or not this approximation circle overlays the field-of-view region. FIG. 13 is a conceptual view of the determination performed in this step. The determination as to whether a given approximation circle having radius t of centre point T is overlying or not is performed by the following processing for all the sides constituting the triangular region corresponding to the field-of-view region from the viewpoint to characters 1 and 2. In the following description, vector L, vector R and vector T are the vectors to L, R and T from a prescribed origin. Point L and point R are set sequentially for the respective vertices of each side of the triangle.

$$r=R-L$$

$$t=T-L$$

$$p=c+L-T$$

$$cx=rx.|c|/|r|, \quad cy=ry.|c|/|c| \qquad \text{[Mathematical expression 1]}$$

where:

$$|c|=|t|\cos\theta \qquad \text{[Mathematical expression 2]}$$

cx is the x component of vector c
cy is the y component of vector c
rx is the x component of vector r
ry is the y component of vector r
From the definition of the inner product, $$|\vec{r}|=|\vec{t}|\cos\theta=rx\ tx+rz\ tz$$

$$|\vec{c}|/|\vec{r}|=(rx\ tx+rz\ tz/|\vec{r}|^2=(rx\ tx+rz\ tz)/(rx^2+rz^2) \qquad \text{[Mathematical expression 3]}$$

where $$0\leq|c|/|r|\leq1 \qquad \text{[Mathematical expression 4]}$$

If the centre T of the approximation circle is within the positive region of straight line TR (if T is outside the inside of the triangle), if $$|p|-d>0 \qquad \text{[Mathematical expression 5]}$$

the circle is independent with respect to the region within the triangle i.e. it does not overly this region; if $$|c|/|r|<0 \text{ or}$$

$$1<|c|/|r| \qquad \text{[Mathematical expression 6]}$$

if point T is in the positive region of straight line LR, the circle is independent with respect to the region.

Figure 14:
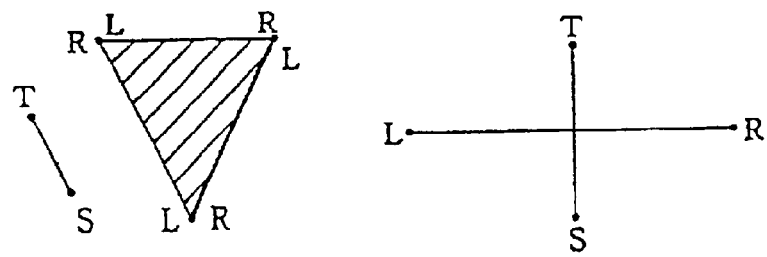
FIG. 14 is a diagram illustrating the principles of another specific example of intersection determination processing.

Instep 110, if the approximation circle does not overly the internal region of the triangle, processing is performed (step 111) such that this structural object is not displayed; if it does not overly this, processing advances to the next step (step 112). The effect of the next processing is to perform a determination as to whether there is overlapping in respect of a structural object such as a wall where this structural object has length in a fixed direction. This processing is performed as follows as shown in FIG. 14. For a structural object that can be approximated as a straight line TS, a determination is made as to the intersection (a type of overlap) of this straight line and the triangular region. The following processing is performed for all sides constituting this triangular region. If the function for determining the positional relationship of the straight line LR and an arbitrary point P is taken to be F1 (P), $$F1\ (P) = a1\ Px + b1\ Pz + c1$$

$$a1 = Lz - Rz$$

$$b = Rx - Lx$$

$$c1 = Lx\ Rz - Rx\ Lz \qquad \text{[Mathematical expression 7]}$$

If the function for determining the positional relationship of straight line ST and an arbitrary point P is taken to be F2 (P), $$F2\ (P) = a2\ Px + b2\ Pz + c2$$

$$a2 = Sz - Tz$$

$$b2 = Tx - Sx$$

$$c2 = Sx\ Tz - Tx\ Sz \qquad \text{[Mathematical expression 8]}$$

If F1 (S).F1(S)<0 and F2 (S).F2(S)<0, it is determined that straight line TS intersects straight line LR.

Figure 15:
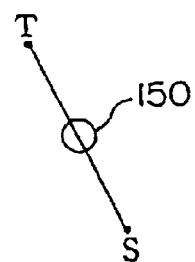
FIG. 15 is a diagram illustrating the principles of a mode of approximating a structural object shaped as a wall.

If this intersection is denied, processing shifts to step 114 and the determination is made to whether there is overlap with the approximation circle. The reason for this is as follows. If the straight line TS described above enters fully within the region of the triangle, the result of the overlap decision is negative and the wall-shaped structural object would be displayed. Accordingly, a small circle 150 corresponding to the thickness of the wall as shown in FIG. 15 is associated with this straight line TS and a determination of overlapping is performed in respect of this small circle in the same way as in step 110. As a result, if this approximation circle enters the region of the triangle, even if straight line TS enters completely into the triangular region and the determination made in step 112 is that there is no overlap, it is concluded that overlap does take place and processing shifts to step 111.

By such processing, it can be arranged that structural objects such as walls, fences, or screens in the field-of-view region from the virtual camera to the character to be displayed are not displayed. However, if, as shown in FIG. 10, this structural object such as a wall projects beyond this field-of-view region as shown at 104, this structural object is still displayed. By the above processing, character display can be effected in the most suitable manner without the character being hidden by unnecessary structural objects. Of course, when the character in question is absent, such structural objects are displayed as normally. As the approximation circle, a circumscribed circle could be employed as shown in FIG. 12 instead of an inscribed circle.

Character motion processing control

The effect of this processing is to form interpolation such that the final position of a single motion is matched to a target point, when it is desired to effect display in series from a single motion without linkage of other motions.

Figure 16:
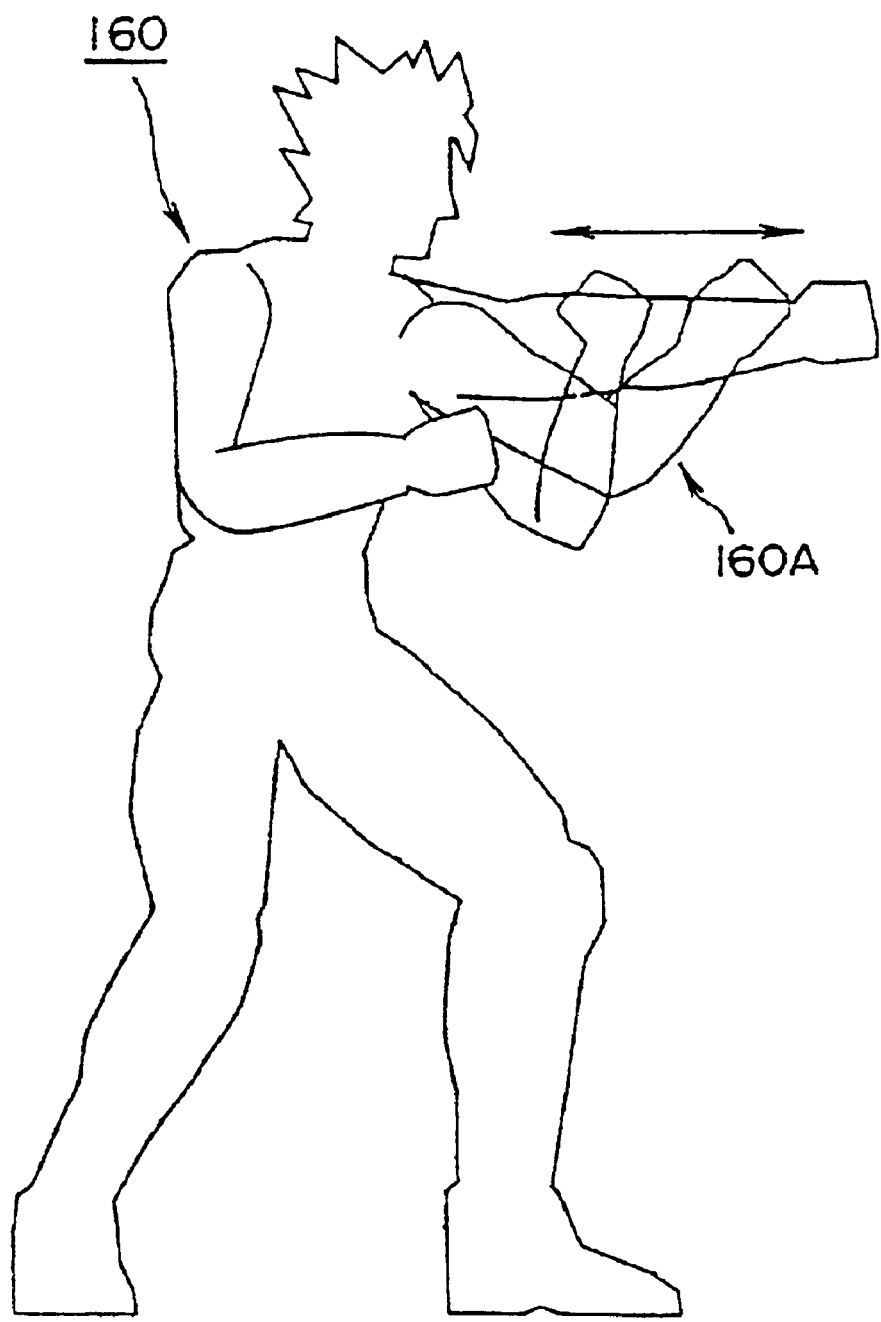
FIG. 16 is a perspective view illustrating a standard mode of character motion.
Figure 17:
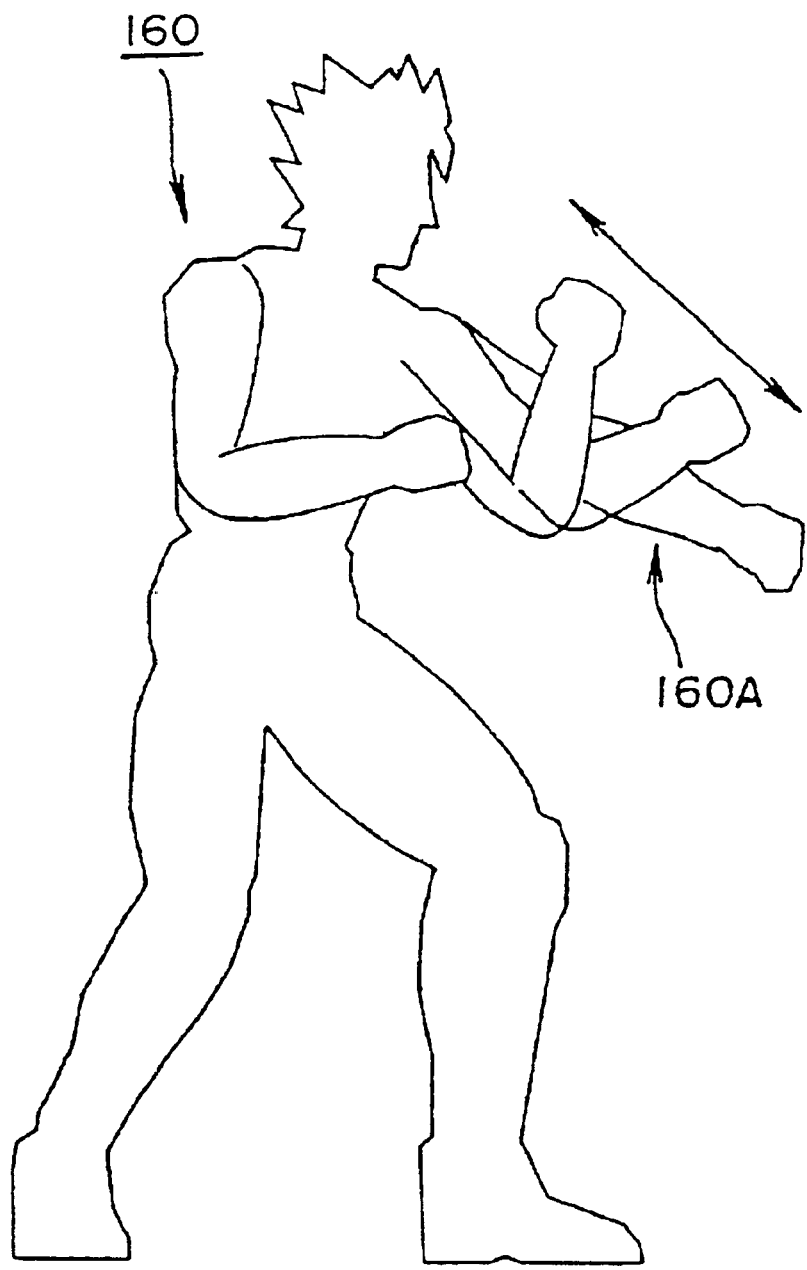
FIG. 17 is a perspective view illustrating an interpolated mode of character motion.

FIG. 16 shows a series of steps of motion of a single character; the steps are shown whereby a human-like character (warrior) 160 delivers blows using arm section 160A to another warrior by operation of pad 2b by the player.

This action of the arm part is displayed on the monitor by calculation by means of a well-known spline function (in particular, a third-order spline function). If now at this point it is assumed that this arm part 160A is moving towards the breast part of the other warrior, and, at a certain time point, the other warrior moves in the y direction (for example, suddenly stoops), from the point of view of the player, it is very difficult to suddenly change the track of the moving arm to downwards as in FIG. 17 and also if CPU block 10 simply attempts to do this, the movement of the arm can easily become unnatural.

Accordingly, a link region is provided in the vicinity of the termination of the spline track alteration process of the motion that is currently being executed, and interpolation such as applying a new spline function is performed in this link region such that the terminal point of the initial spline track becomes a target point in another position.

Figure 18:
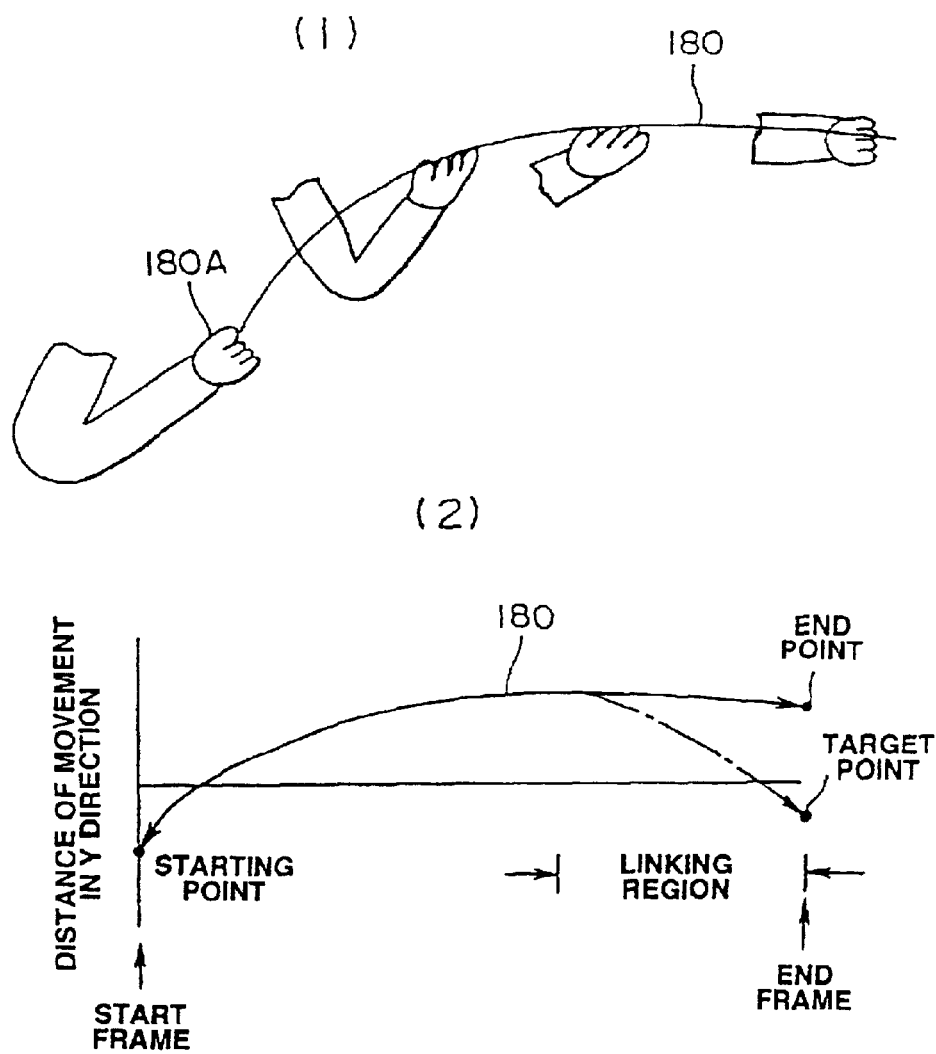
FIG. 18 is a conceptual diagram illustrating the track of movement of a character produced using a spline function.

This will now be described with reference to the drawings. As shown in FIG. 18(1), the fist 180A that is at the tip of the arm part of the warrior of FIG. 16 is moving along a track 180 determined by a spline function. FIG. 18(2) shows the track 180 obtained by this spline function; fist 180A moves from the starting point of this track until it reaches the end point and then returns to the starting point.

Let us now assume that fist 180A is moving from the starting point of spline function track 180 towards its end point. Let us assume that, in this process, due for example to a change in the behaviour of the other warrior, the need arises to alter the initial end point to a target point.

Accordingly, at the time point where the position 180A of a fist is in the link region, CPU block 10 corrects the function in this region such that it terminates at the target point. This interpolation is performed for example as follows. Of course, this could also be achieved by suitably altering the degree and/or coefficient of the spline function in the link region. As a result, the motion shown in FIG. 16 is automatically interpolated to the motion shown in FIG. 17, and the motion in the link region can thereby be represented more smoothly. It should be noted that, for convenience in illustration, the vertical axis in FIG. 18(2) shows only the amount of movement in the y axis direction. In accordance with the general conventions of three-dimensional video games, the x axis is given in the transverse direction when looking at the monitor screen, the y axis is given in the height direction, and the z axis is given in the depth direction i.e. the direction perpendicular to the screen.

The link region (link time) is appropriately set up by means of a group of a plurality of frames comprising an end frame. Also, interpolated motion of the entire arm is effected by applying similar processing for the objects other than the fist, namely the upper arm part and lower arm part. The interpolated co-ordinates in the link region are set by means of the following characteristic expression:

Current co-ordinate+(current co-ordinate−target co-ordinate).

(Current Time/Link Time)

Figure 19:
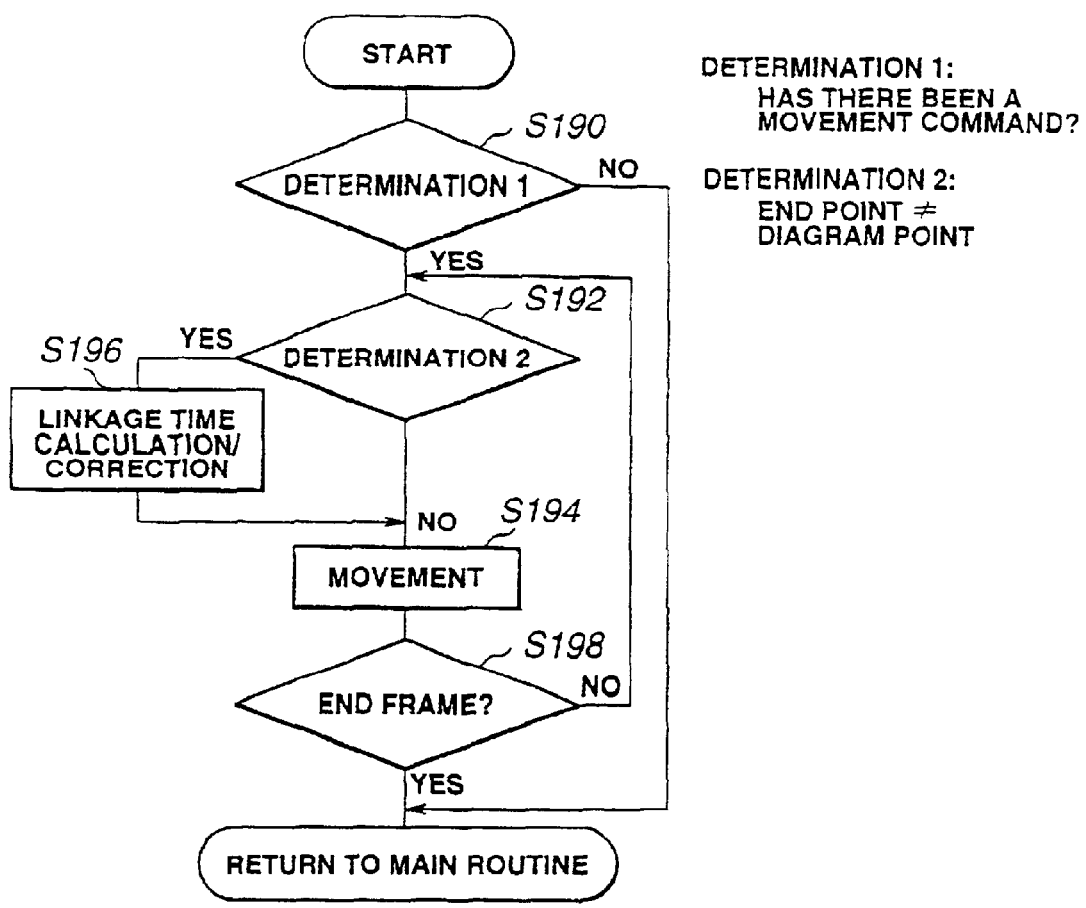
FIG. 19 is a flow chart illustrating an operation for character motion processing control.

FIG. 19 is a flow chart given in explanation of the above processing; in step 190, a determination is made as to whether a motion movement command has been generated by operation of pad 26b by the player. In step 192, a determination is made as to whether a target point whose co-ordinates are different from the end point has been set. In step 194, the selected motion is reproduced. In step 196, if the result of this determination is positive, the link time is calculated and processing shifts to step 194, in which the motion interpolated during this link time is reproduced. In step 198, a determination is made as to whether or not the current frame is the end frame of the motion series and, if it is the end frame, processing returns to the main routine; if the end frame has not yet been reached, processing returns to step 192.

In this process, the link frames constituting the link time represent 0.1 of the maximum number of frames of the motion (number of frames from the start frame of FIG. 18(2) to the end frame); if the link frames exceed 10, [their number] is fixed at 10. The number of link frames should be in the range of at least 1 to ½ of the maximum number of frames. If the link frames are too long, the original movement of the motion is lost; on the other hand, if they are too short, interpolation becomes abrupt and smoothness of the motion is lost.

The following benefits are achieved by this processing. When, as in a video games device, the controller is operated in order to rapidly operate a character such as a warrior appearing on the game screen, varied movements of the character are continuously reproduced. At a time point when a series of motions is reproduced, even though [the player] tries to alter the motion to match rapid actions of the other character, so long as the motion itself is fixed, this is difficult. However, if motion is interpolated as described above, the motion matching the movements of the other character for example can be reproduced in a varied manner, making the motion more realistic. Usually, such interpolation is extremely difficult for a user to perform and conventional video games devices are particularly ill-constructed to performing such interpolation.

It should be noted that, while this processing has been described taking as an example the case where the motion was calculated using a spline function, this processing could be applied to pattern change systems in which a predetermined pattern is sequentially reproduced. In such cases, it may be arranged to reproduce a corrected pattern in the link region.

Character Level Difference Processing

Figure 20:
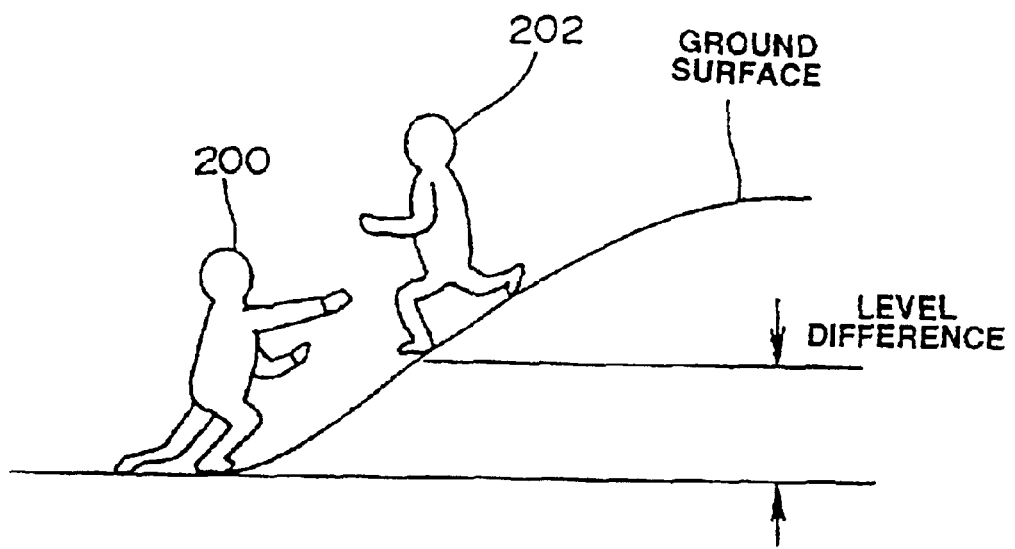
FIG. 20 is a diagram illustrating a condition in which there is a level difference between two characters.

The effect of this processing is to display a desired image in which this level difference is corrected when there is a mutual level difference between a character (warrior) and the ground. For example, as shown in FIG. 20, when there is a level difference between two warriors 200, 202 that are facing each other, it is unrealistic if punching from a warrior 200 to a warrior who is on a higher level is performed horizontally. Accordingly, this processing is designed to perform the assault from warrior 200 directed in the higher direction, correcting for this level difference (see FIG. 23).

Figure 21:
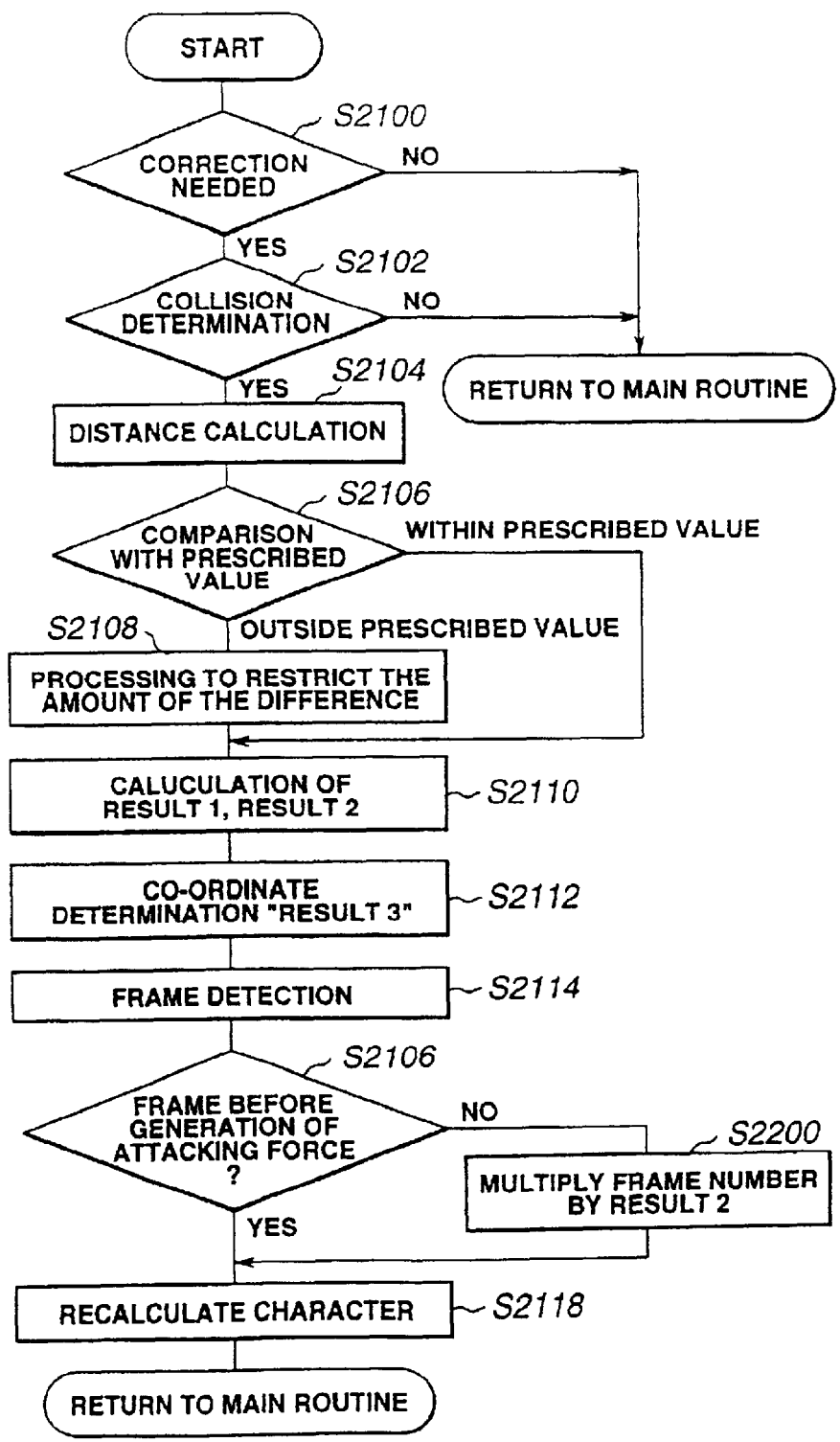
FIG. 21 is a flow chart illustrating processing of character level difference.

In this processing, as shown in FIG. 21, in step 2100, a determination is made as to whether this level difference needs to be corrected. Such a determination "correction required" is made if an attack request (command) for assault using arms or legs from one warrior to another warrior is generated in respect of mutually facing warriors for example as in the drawing.

If the result of this determination is negative, next, processing returns to the main routine. On the other hand, if the result of this determination is positive, further, in step 2102, a collision determination is performed between the character and ground i.e. to establish whether the other warrior is standing on the ground; if the result of this is positive, character level difference processing is deemed to be necessary, and processing shifts to the next step. If this determination leads to a negative result, the routine in the Figure is terminated.

Next, in step 2104, the distance from the ground on which the character controlled by the player is standing to the aforementioned character is calculated. The same calculation is performed for the other character also. Next, in step 2106, the value of this result is compared with a prescribed value, and, if the range of the prescribed value is exceeded, processing is performed to keep the difference relating to this distance within this range. Specifically, if we let the height of a warrior operated by one player be (my) and the height of a warrior operated by another player or operated automatically by a prescribed program by the image processing device itself be (ey), the difference (diff1) between these two is (my–ey). An evaluation is then performed as to whether for example diff1 is within the range $-0.15 \leq \text{diff1} \leq 0.15$, and, if diff1 exceeds this range, a diff1 smaller than this range is taken as being –0.15 and a diff1 greater than this range is taken as being 0.15, while a diff1 within this range is directly determined as (diff2) without modification. The reasons for carrying out this correction on diff1 will be described later.

Figure 22:
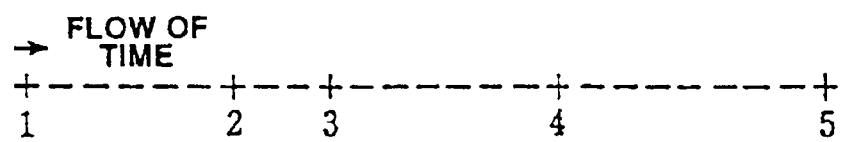
FIG. 22 is a flow chart given in explanation of time flow of such processing.

In the next step 2110, diff2 is divided by the time (number of frames) for which attacking force is generated and the result is taken as "result 1"; the result obtained by dividing diff2 by the time from generation of the attacking force until hardening is dissolved is taken as "result 2". This will be described using FIG. 22. FIG. 22 shows the flow of an attacking move (kick, punch or jump etc. executed by the warrior); this is as follows in respect of the flow of frames (flow of time) for each time 1, 2 . . . 5.

1: commencement of the move (frame number 0)
2: attacking force generated (frame number 1 to frame number 3)
3: attacking force dissipated (frame number 3 to frame number 4)
4: hardening time (this is a time in which commands for other attacking moves are not accepted and may be from 0 to 4 frames)
5: end of the move (from frame number 0 to 5)

"Result 1" described above is therefore: (diff2)/2 and "result 2" is (diff2)/(4 –2). These values are of course set and stored in a prescribed work RAM region. The characteristic shown in FIG. 22 is predetermined for each move. Result 1 is a value corresponding to the rate of change of each frame until attacking force is generated and result 2 is a value corresponding to the rate of change of each frame until hardening is dissolved.

Next, the co-ordinates whereby the hands and/or feet etc. move when a move is executed are determined for each requested move in step 2112. The seco-ordinate values are determined before and under the assumption that there is no difference of level with respect to the other character. This co-ordinate (leaf) is taken as "result 3". This leaf is determined in accordance with the spatial co-ordinate position of the hand or foot when a move is executed by a function fat for returning the leaf. The processing when an attacking move is executed is described below with reference to the following and subsequent steps.

After a move has been generated, in step 2114, detection is carried out to ascertain the serial number of the frame to which the currently displayed frame corresponds. In the next step 2116, it is determined whether or not this frame is a frame prior to generation of attacking force. In the Figure, it is determined that frames up to frame 1 are frames prior to generation of attacking force.

Next, if the result of this determination in step 2116 is positive, in step 2118, this "result 1" and the frame number are multiplied and the result of this calculation is added to the leaf of the step 2112 as a difference. Using this result, the shape of the body of the warrior is then recalculated using the value etc. obtained by adding this difference to the lease[1], using the known inverse kinematic technique (see for example "Dynamics And Control Of Robots", compiled by the System Control Information Association, by T Arimoto, published by Asakura Shoten, 5.2 Reverse kinetics (page 132~)).

In step 2116 already described, if it is determined that [the frame] is a frame subsequent to that in which attacking force is generated, in step 2200, the current frame number ("2 or 3") in the Figure, is subtracted from the frame number ("4" in the Figure) at which hardening is dissolved, and processing shifts to the step where this frame number is multiplied by result 2.

Figure 23:
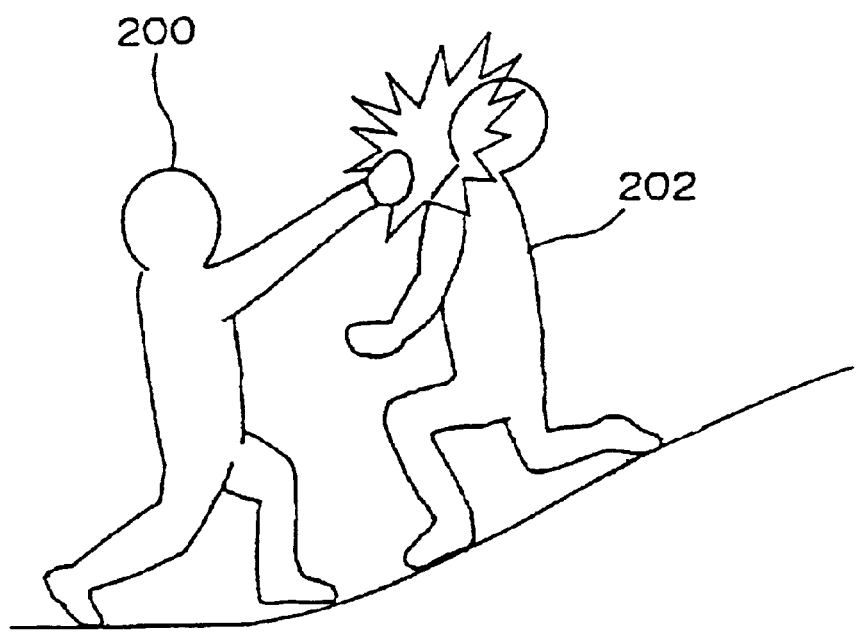
FIG. 23 is a diagram illustrating a condition in which level difference processing has been performed.

As a result, as shown in FIG. 23, by step 2118, a punch is executed from the warrior 200 which the player himself controls towards the other warrior 202, with a height in which the level difference of the warriors is compensated; the arm that executed this punch is then returned to its original position whilst effecting level compensation, whether the punch hit its target or not.

With the processing that has been described, image processing is executed that reflects the difference in level of the two warriors, so an attack (punch or kick) that is performed by a single warrior is carried out to a warrior in a higher location and images matching the current situation of the actual attack can thereby be provided. Consequently, even without storing beforehand in memory motion in respect of a warrior in a higher position, image processing between one character and another character can be implemented in a condition reflecting the level difference between the characters. Incidentally, the reason why diff1 is corrected is as follows. If such correction were not carried out, when there is a large level difference between the two warriors, in an extreme case, the assault from one warrior to another warrior could be directed in the direction at right angles with respect to the ground, which would itself be unnatural.

Figure 24:
FIG. 24 is a drawing showing a front view of an example of a human-like character.
Figure 25:
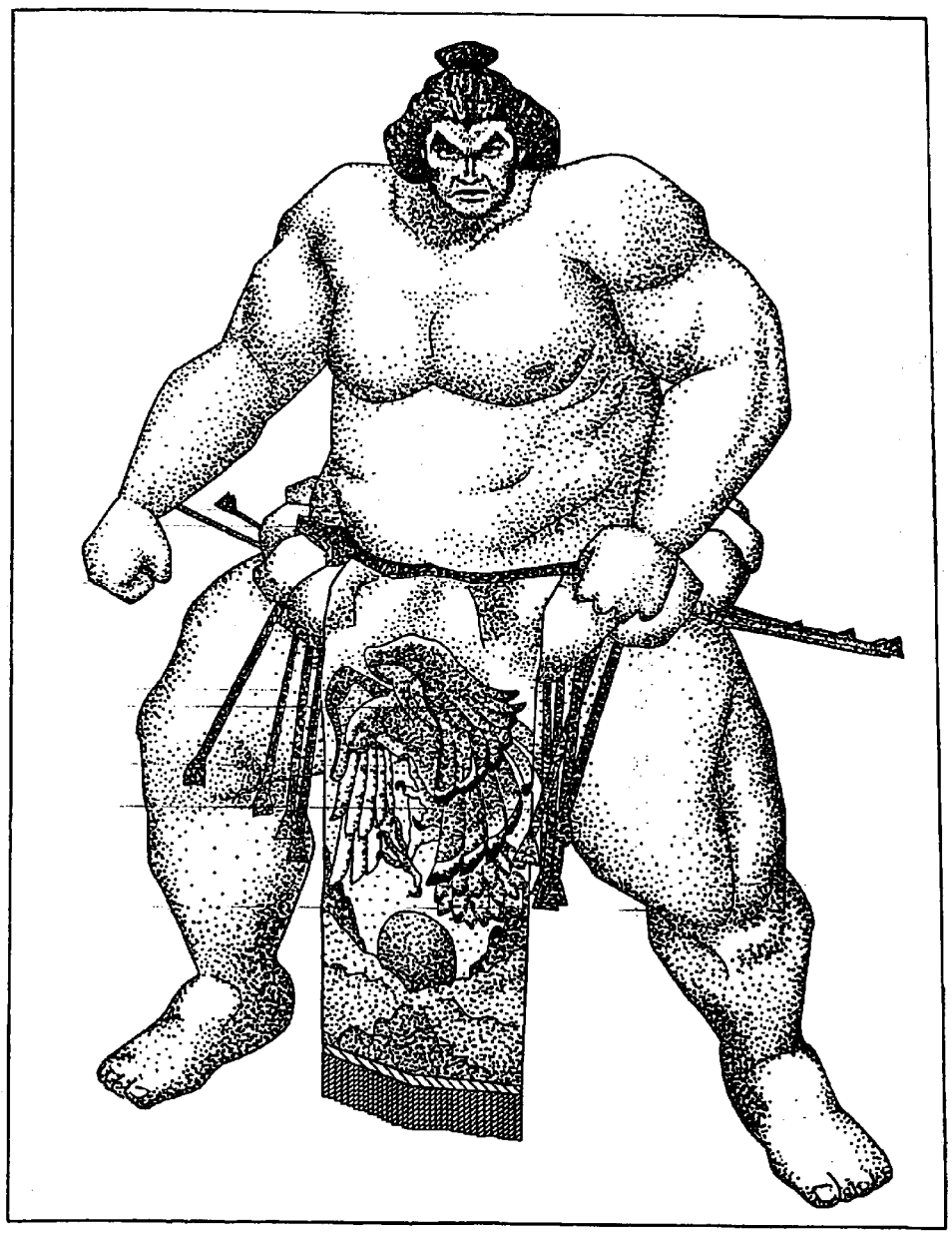
FIG. 25 is a drawing showing a second example of a human-like character.

It should be noted that, although in the explanation of the various processes described above, the example of a video game was taken, there is no restriction to this. If FIG. 1, a ROM cassette could be employed instead of a CD-ROM. These function as memory media in which the operating program of an image generating device according to the present invention is stored. Also, in the intersection determination processing, the case where a structural object as already described is displayed incompletely and in the case where this structural object is displayed using for example mesh polygons or poly lines are to be taken as being covered by the mode "not displayed". FIG. 24 and FIG. 25 are respective examples of a human-like character (warrior) constituting a model according to the present invention.

In glow shading by CPU block 10 (the same applies to other types of shading), processing may be performed not only for all the polygons of a character but also for only part of a character, in particular for a portion which it is desired to show three-dimensionally by linear interpolation of color (for example, polygons corresponding to exposed skin). In this way, the load on CPU block 10 during execution of processing can be reduced. In the case of the character of FIG. 24, glow shading may be performed only in respect of the fist, face, and chest below the neck which are exposed from the clothing; in the case of the character of FIG. 25, glow shading may be performed only in respect of approximately the upper part of the body and the feet.

Also, although conventionally in the case of a quadrilateral polygon four vertices were employed when Z sorting was applied to the polygons, it would be possible to determine this using only the point of intersection (mid point) of the diagonals respectively joining two vertices. As a result, processing speed can be improved by reducing the frequency with which the main CPU accesses memory. It should be noted that, even though Z sorting is applied using such a mid point, the same accuracy as in the case of Z sorting using four vertices is still maintained, since this mid point represents the average value of the four vertices. In the case of a triangular polygon, the centre of gravity could be used.

Next, another embodiment of processing operation of the image generating device described above will be explained. FIG. 26 is a front view showing details of the control pad 2b described above. This control pad is provided with a direction key 26b as described above and buttons A, B, C, X, Y, Z, L and R. Pressing this direction key or buttons corresponds to movement of a character (warrior) of FIG. 24 or 25: for example, button A corresponds to "defensive action against attack from another warrior", button B corresponds to "punch other warrior" and button C corresponds to "kick aimed at other warrior".

The user i.e. the player controls a character as he wishes by operating this key and/or buttons in various manners; however, a great deal of practice is required in order to control a warrior moving very rapidly and with great versatility in an appropriate manner.

Accordingly, in a mode of the processing described herein, as shown in FIG. 27, a set of command moves constituted by pressing combinations of a plurality of buttons are designated as "combination moves" and these are stored beforehand in working RAM as a file. Then, by reading these by pressing one of the buttons described above, the warrior can be made to execute the command moves in sequence. In FIG. 27, PPK is equivalent to pressing button B, button B and button C in sequence and P+K is equivalent to pressing button B and button C simultaneously. In addition, the number of frames to be occupied by these moves can be set for each command move. Consequently, the player can create combined moves in versatile fashion as he wishes since he can freely set the number of frames of each command move in a combination move. A specific example of such a combination move is "throwing the other warrior over one's head, and kicking him when he gets up".

Continuing the description in more detail, "P, K, P" indicates that the punch button, kick button and punch button are continuously pressed and, if we assume that an overhead throw is performed if continuation of these is determined, when P is pressed, the character goes into the punch motion. If K is pressed after the commencement of this motion but for example before the motion goes into punch return, a kick is commenced from the attitude of a delivered punch and with the timing of the punch return motion; if P is input whilst the kick motion is being executed, this is deemed as a continuous move and continuance is effected with the overhead throw motion (command move). If the timing at this point is made to coincide with the timing at which the other character is about to fall over, a very effective overhead throw can be created in which moves are easily applied to the same overhead throw. A player can create a plurality of such combination files and allocate a single button to each file of course, if the player presses a button to which no such combination file has been allocated, the single move that was originally allocated to this button is executed. What range of buttons are to be used to register combination moves may be suitably determined in accordance with requirements for combination moves and requirements for single movements. A plurality of buttons could be allocated to individual files.

Figure 28:
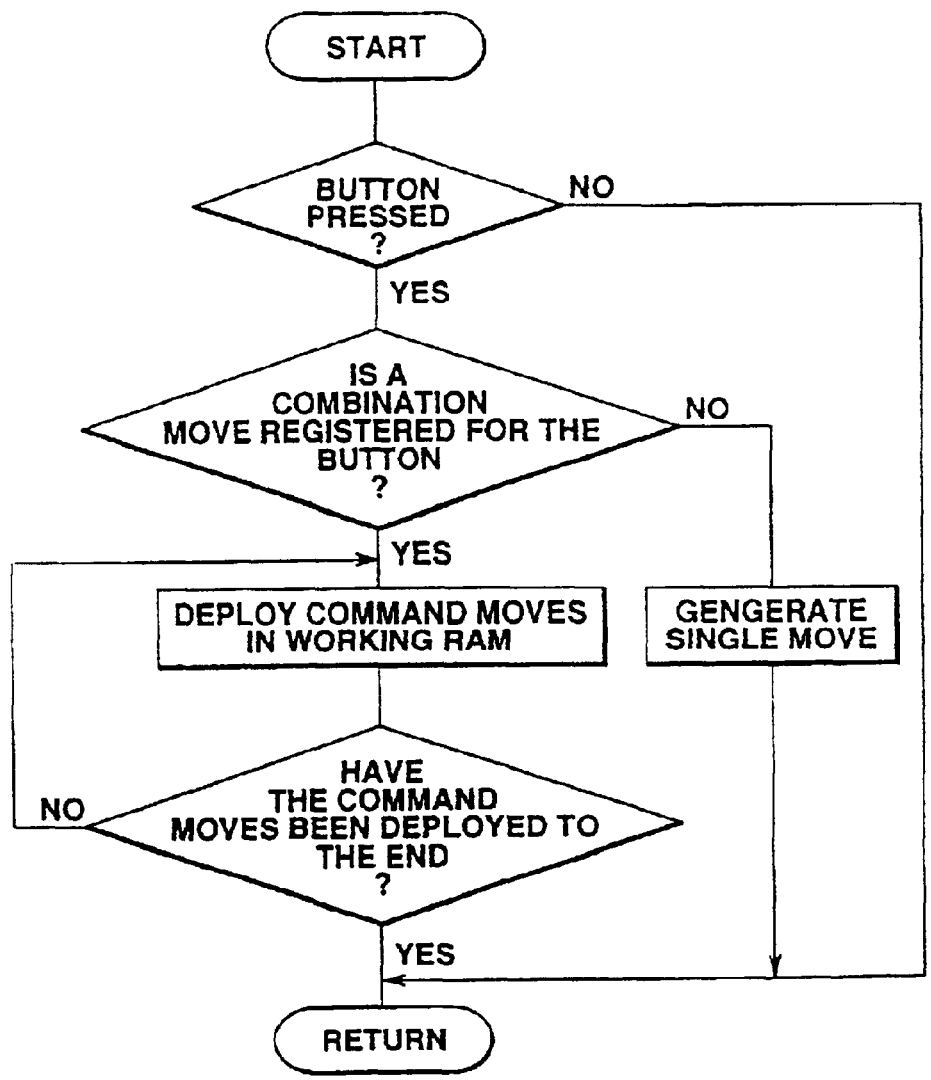
FIG. 28 is a flow chart for the deployment of the combining technique.

Next, the operation of this processing will be described with reference to the flow chart shown in FIG. 28. First of all, in step S280, a determination is made as to whether a button as described above has been pressed. If a button has been pressed, if a combination move is registered in respect of the button that has been pressed (step S282: affirmative), in step 284, the commands in the combination moves registered in working RAM (equivalent to pressing plural or single buttons) are sequentially read. Next, in step S286, a determination is made as to whether or not the command in the file has been executed as far as its end; if this is affirmed, this flow chart is repeatedly executed until it terminates. In contrast, in step S280, if no button has been pressed, return is effected; and, in step S282, if no combination-move file is registered for a button that is pressed, the single move allocated to this button is executed.

In the presently described mode, a combination of action commands to a character (model) (e.g. combination of operating switch presses: pressing a single switch, pressing a plurality of switches, pressing the switches in sequence, or pressing the switches simultaneously) is stored in memory; the means for image processing reads this by a simple switch operation such as for example pressing a single button, and the movement (motion) of the model is continuously controlled in accordance with the group of commands that are thus read. Consequently, as described above, the user can represent more versatile movement (motion) of the model as he wishes, without complicated key operation.

Figure 29:
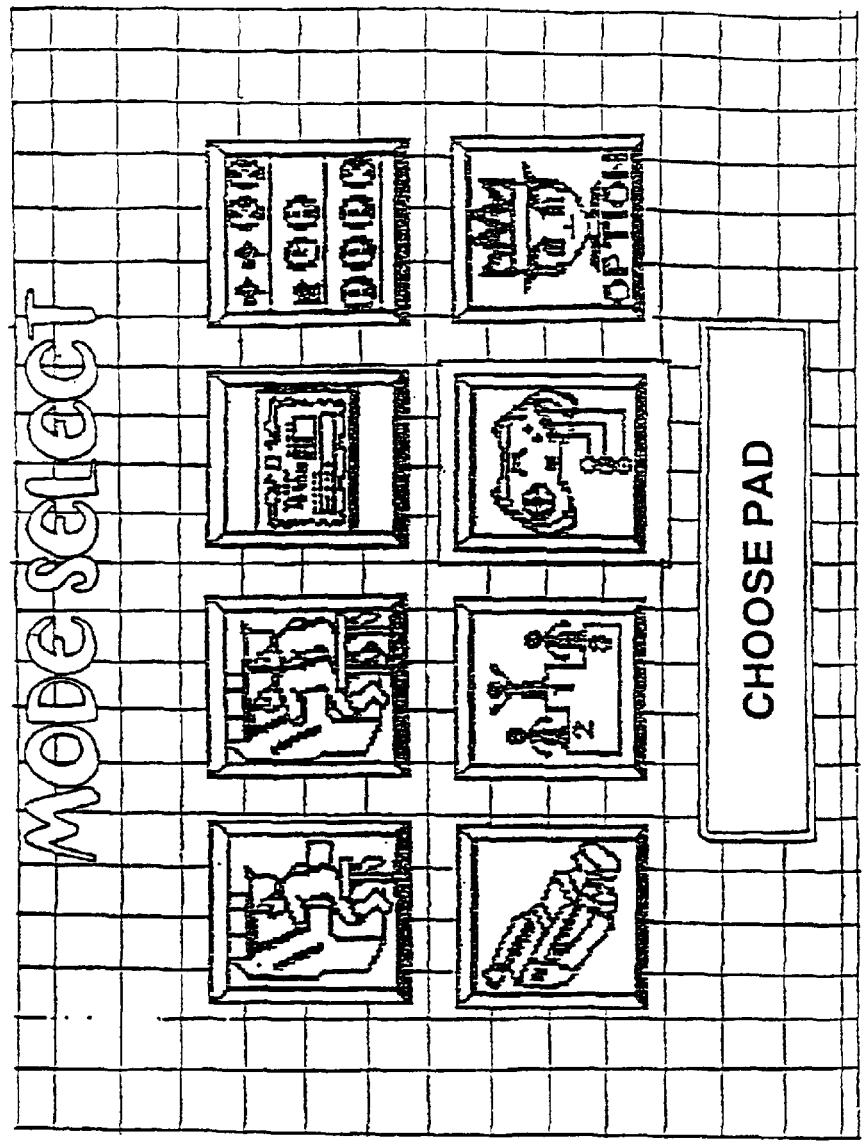
FIG. 29 is a screen front view illustrating a screen displayed by a combining technique processing step.
Figure 31:
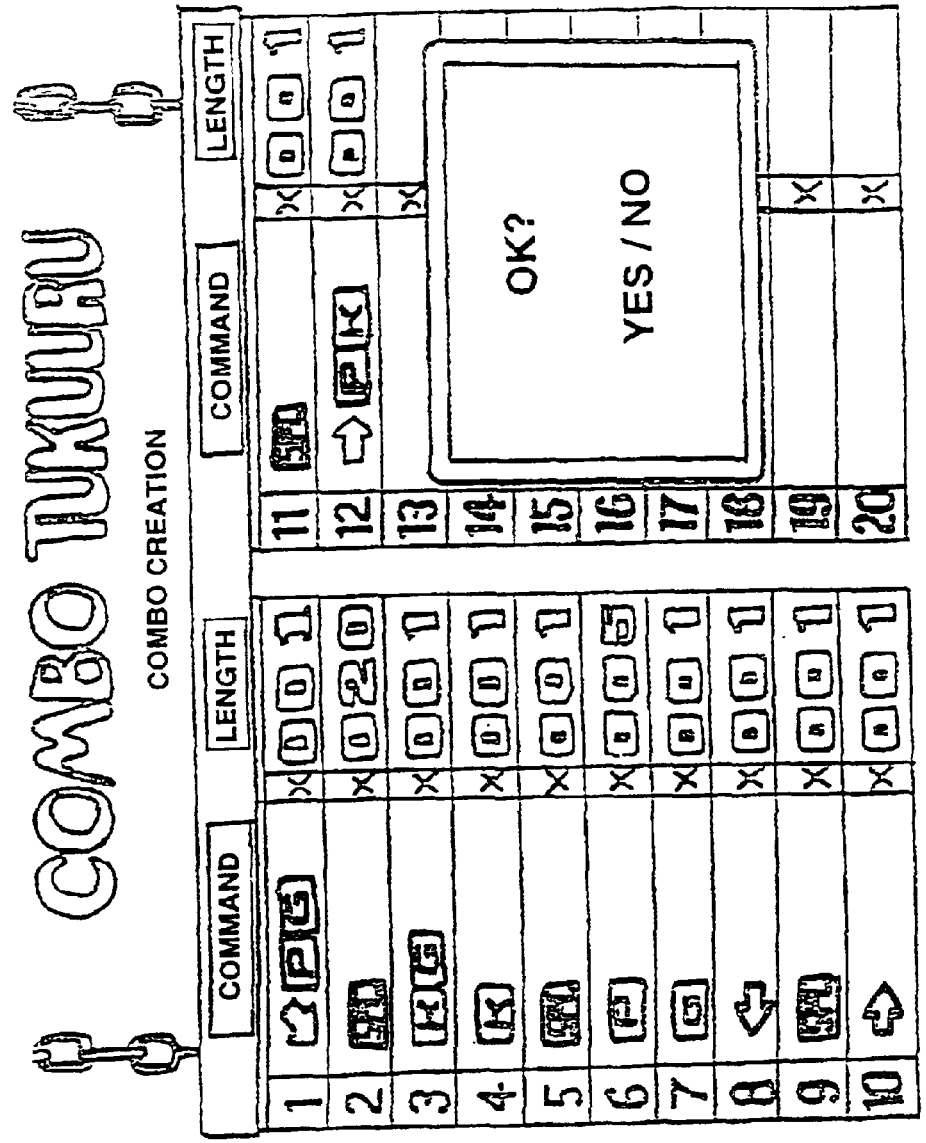
FIG. 31 is a front view displaying another screen displayed by this processing step.
Figure 32:
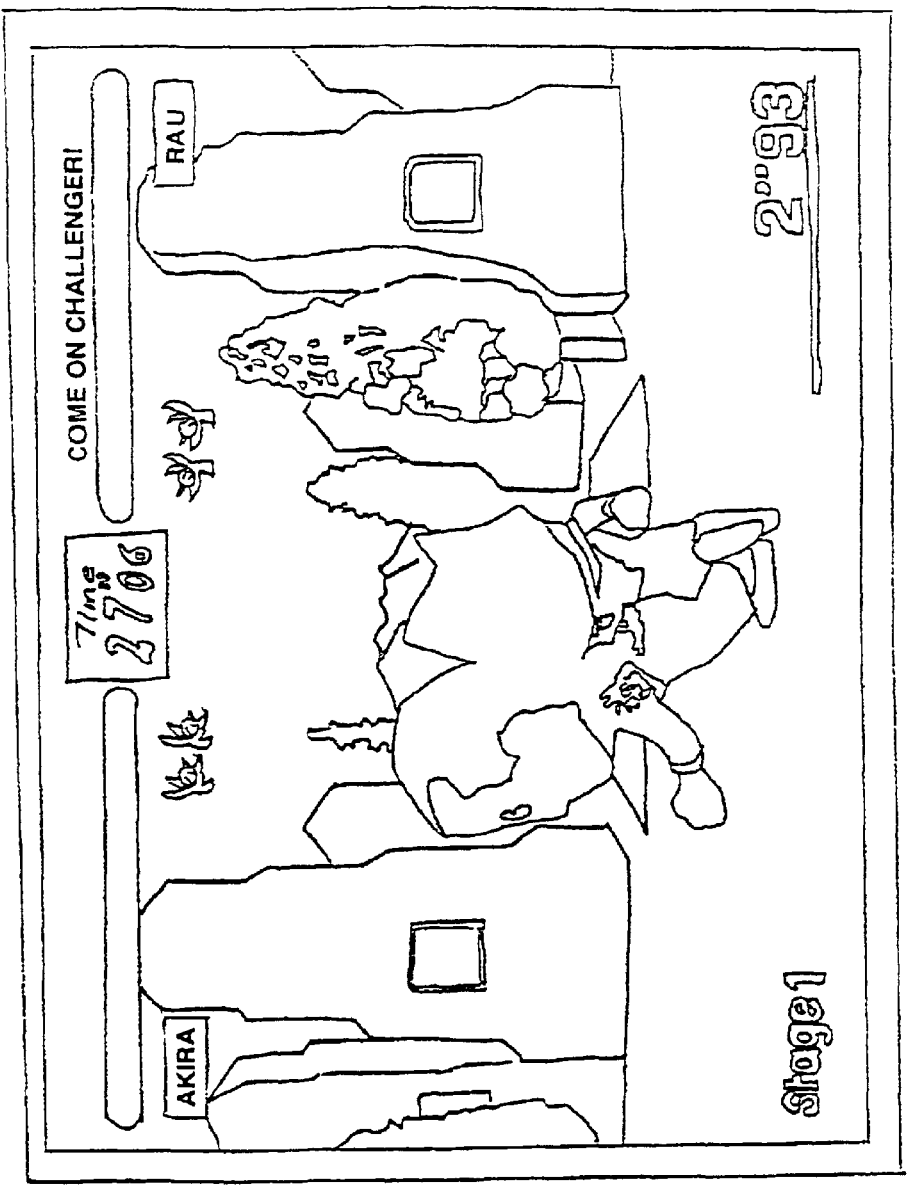
FIG. 32 is a front view displaying another screen displayed by this processing step.
Figure 33:
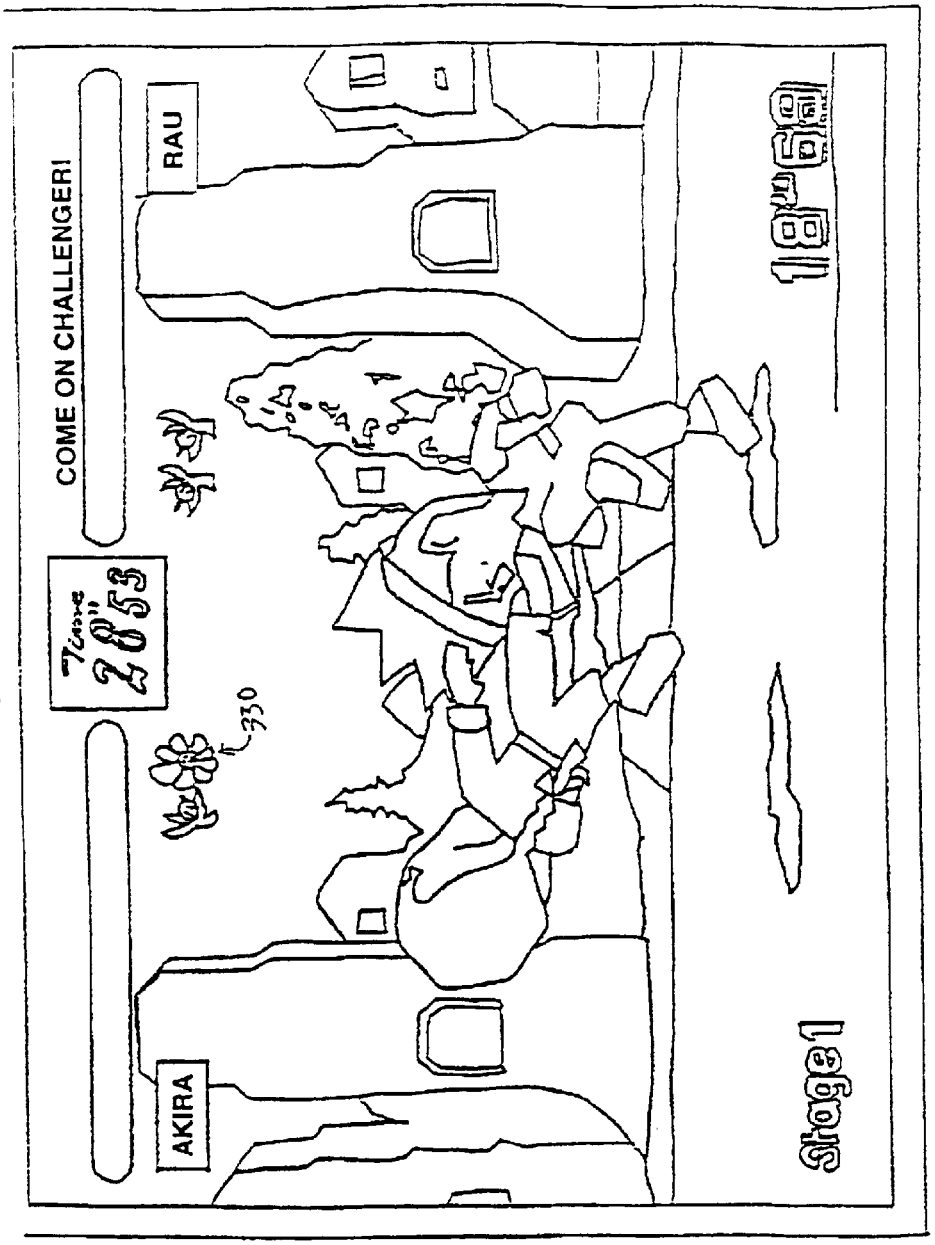
FIG. 33 is a front view displaying another screen displayed by this processing step.
Figure 34:
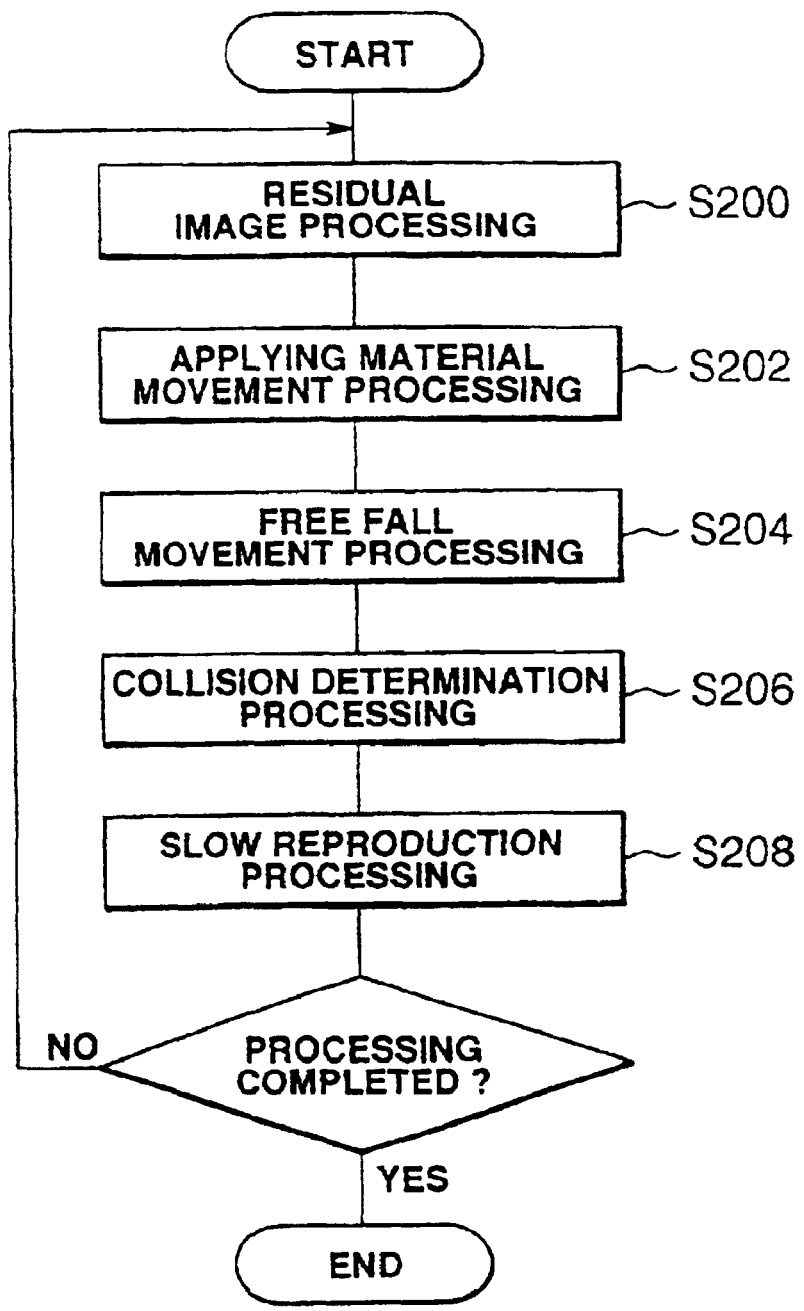
FIG. 34 is a flow chart illustrating main processing in a second embodiment.

FIG. 29 shows the initial screen for mode selection that is displayed on the monitor when combination processing as described is to be performed: in order to select a combination move, an icon at the top right is selected. FIG. 30 is a screen showing the case where a button (key) has been assigned to a move; FIG. 31 is a screen for compilation of the combination-move file; and FIG. 32 is a screen showing one condition wherein warriors are in mutual combat condition. FIG. 33 is a screen that is deployed later on the screen of this one condition and shows a condition in which a warrior ("Akira") has been knocked down by the warrior ("Rau"). It should be noted that, as can be seen from FIG. 33, when one warrior has knocked down another warrior (when this has been determined by the CPU block), the character 330 on the screen is made to display this. In FIG. 33, this is displayed by changing a "plant-like bud character" to a "plant-like open-flower character".

Second Embodiment

Next, a second embodiment of a video games machine constituting an image processing device will be described with reference to FIG. 33~FIG. 68. Since the hardware construction of the video games machine in this second embodiment is the same as in the case of the first embodiment described above, description thereof is omitted.

FIG. 33 is a flow chart showing the main processing executed by CPU block 10; the processes described below are executed. S200 is a residual image processing routine, S202 is a routine for churning-up processing (processing of flying material); S204 performs model free-fall movement processing, S206 performs processing for determination of collision between the model and an irregularly shaped zone, and S208 performs processing for alteration of playback speed. These processes are executed repeatedly. Each of these processes will be described below.

Residual Image Processing

Figure 35:
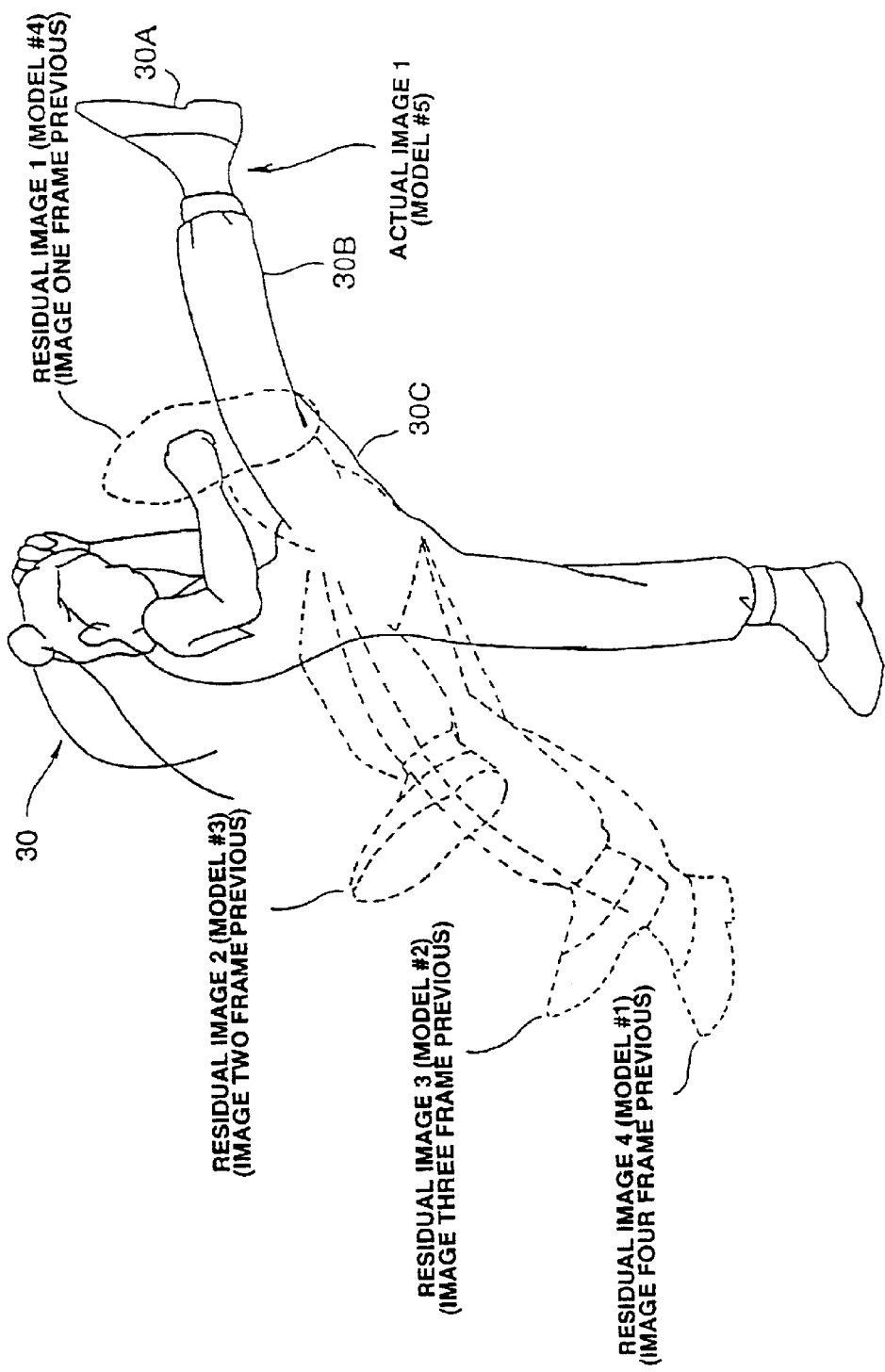
FIG. 35 is a front view of a model in respect of which residual image processing has been performed.

FIG. 35 shows the principles of residual image processing applied to a warrior constituting a model. In FIG. 35, 30 is a warrior and residual images are displayed in respect of the warrior's leg 30B. Specifically, simultaneously with the display of the actual image of the current frame, residual images 1 to 4 of the previous frames are concurrently displayed.

Figure 36:
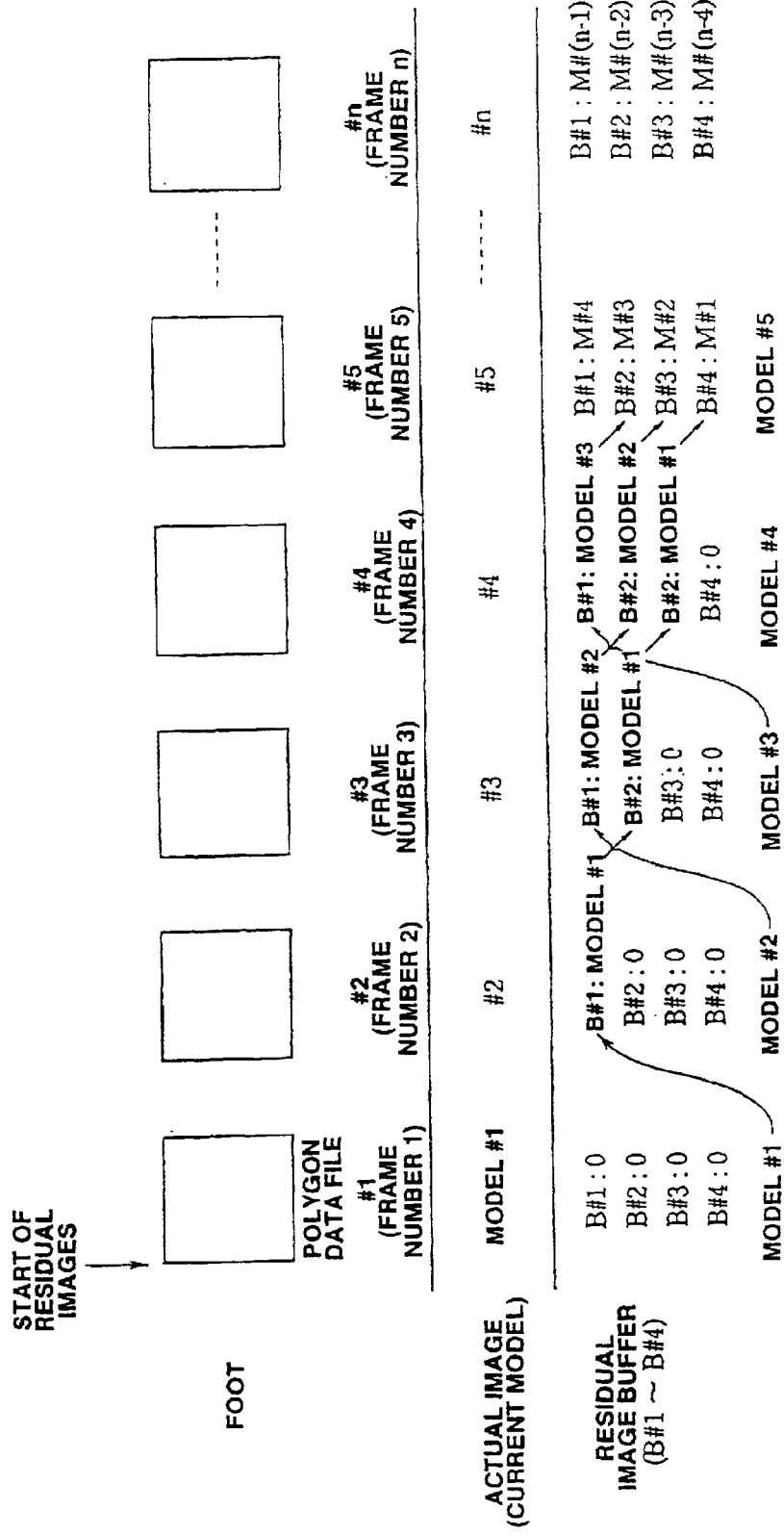
FIG. 36 is a diagram showing the principles of residual image processing.

FIG. 36 shows the principles of this residual image processing. The polygon data file (or parameter file) stores parameters that determine the motion (revolving kick) of the leg of this warrior. #1 to #n of the polygon data file show the number of frames from the time point of residual image commencement.

In polygon data file #1, a model #1 corresponding to residual image 4 is stored. Model #1 of the warrior is therefore displayed as actual image on the screen at this time point. At the next time point, model #2 corresponding to residual image 3 is stored in polygon data file #2. Model#2 of the warrior is therefore displayed as actual image on the screen at this time point. Subsequently in the same way, warrior's leg models #3 . . . , #n are displayed on the screen. In the case of the fourth frame (#4) of FIG. 4, #1 to #4 are successively displayed as the actual image model of the leg.

B#1, B#2, B#3 and B#4 are provided as buffers for the residual images. The warrior motion data recorded in the polygon data files are successively recorded in these buffers. This is displayed in the bottom portion of FIG. 36. The data of model #1 that is stored in polygon data file #1 is stored in residual image buffer #1 after residual image commencement; at the next time point, the data of model #2 that is recorded in polygon data file #2 is stored in residual image buffer #1, and the content of residual image buffer #1 is sent to residual image buffer #2. That is, the residual image buffer data is transmitted in the order #1→#2 →#3→#4, and the actual image motion data in the one-previous frame are sent from the polygon data file to residual image buffer #1. Residual image buffer #4 is successively directly updated.

For example, at the time point of the fifth frame, motion data of model #5 is stored in the polygon data file and this model is displayed as actual image. Motion data of model #4 is stored in residual image buffer #1, motion data of model #3 is stored in residual image buffer #2, motion data of model #2 is stored in residual image buffer #3, and motion data of model #1 is stored in residual image buffer #4.

Figure 37:
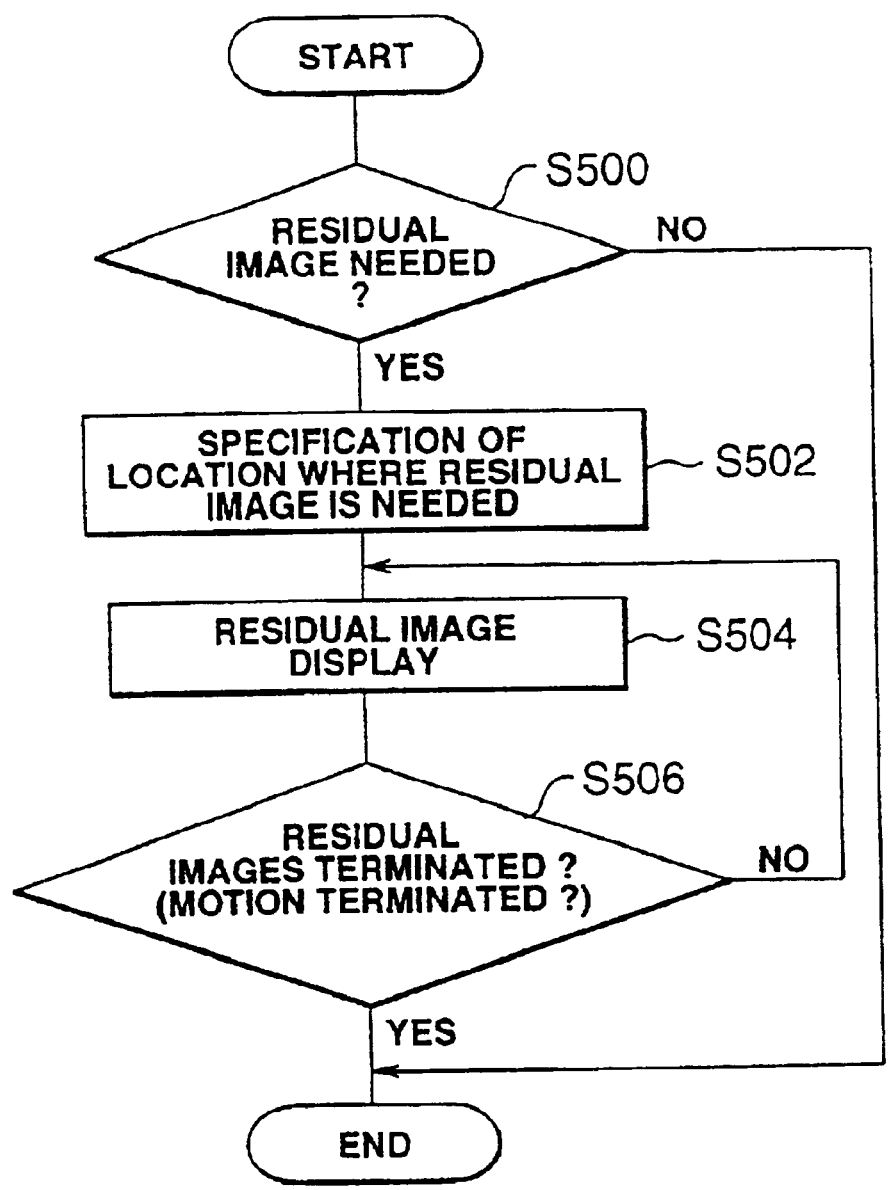
FIG. 37 is a diagrammatic flow chart of residual image processing.
Figure 38:
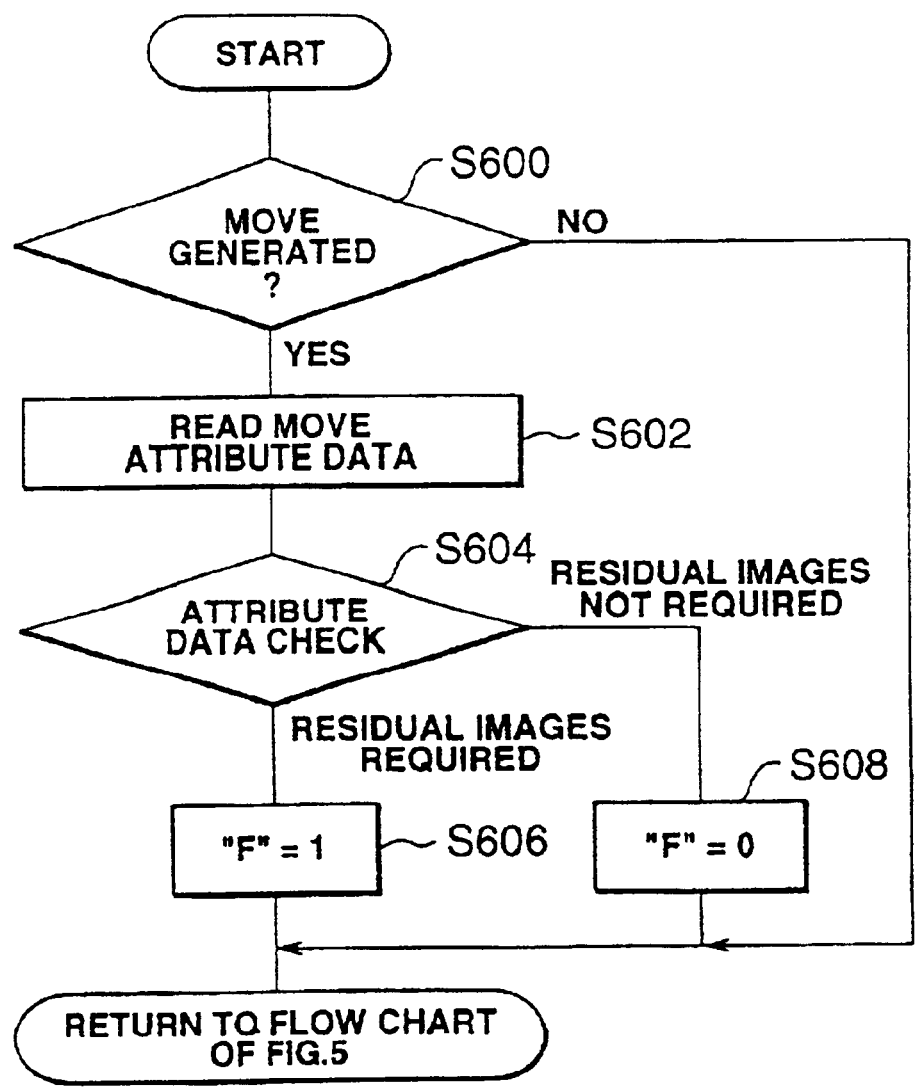
FIG. 38 is a detailed flow chart thereof.

Since the motion data of the polygon data file and the data of the residual image buffers (equivalent to previously calculated motion data) are displayed simultaneously, the actual image and the residual images are simultaneously displayed on the screen. This is shown in FIG. 35. Whereas display of the actual images is effected with ordinary rendering, in the case of the residual image, in order to create a better dramatic effect, in other words, in order to "show in the manner of a residual image", rendering is performed whilst applying processing for semi-transparency. The degree of this semi-transparency may be increased as the number of frames by which the residual image is previous to the time point in question increases, the residual image being displayed in more transparent fashion as the number of frames by which it is previous is increased. The residual image buffers are set up in RAM 102. Next, the operation of residual image processing in this embodiment will be described. FIG. 37 is an outline flow chart of this processing. First of all, it is determined whether or not residual images are required (S500). This determination is made for example for each motion. For example, residual images may be deemed as necessary and such processing performed for large-scale moves (rotating kick, back throw etc.) involving large movements of the warrior. FIG. 35 may be referred to. Otherwise, this is the same as in the case where the amount of action exceeds a prescribed value. FIG. 38 is a detailed flow chart of this processing for determining the necessity for residual images. First of all, a check is made to establish whether a move has been generated (S600). This check is made by ascertaining the operating condition of the control buttons and/or control stick of controller 2b described above. If it is ascertained that a move has been generated, the attributes of the move are read from data (S602). The move attribute data are data relating to the nature conferred on individual moves, for example "attacking move", "move using the feet", "move using the hands" etc.

Next, it is determined (S604) whether this attribute data is data to the effect that residual images are to be generated or the reverse. For example, in the case of "attacking move" or "move using the feet", residual image representation is deemed to be necessary and a prescribed flag "F" is set to "1" (S606); otherwise, "F" is set to "0" (S608).

In the next step of the outline flow chart, the location where residual images are required is identified (S502). This identification is performed by the processing shown in FIG. 39, which is a detail flow chart. First of all, in S700, a check is made to establish whether or not an attack command has been generated. An attack command is a command generated by operation of a control button or control stick in a condition reached in a command mode such that an attack on another opposing warrior is made by a warrior controlled by the player.

Figure 39:
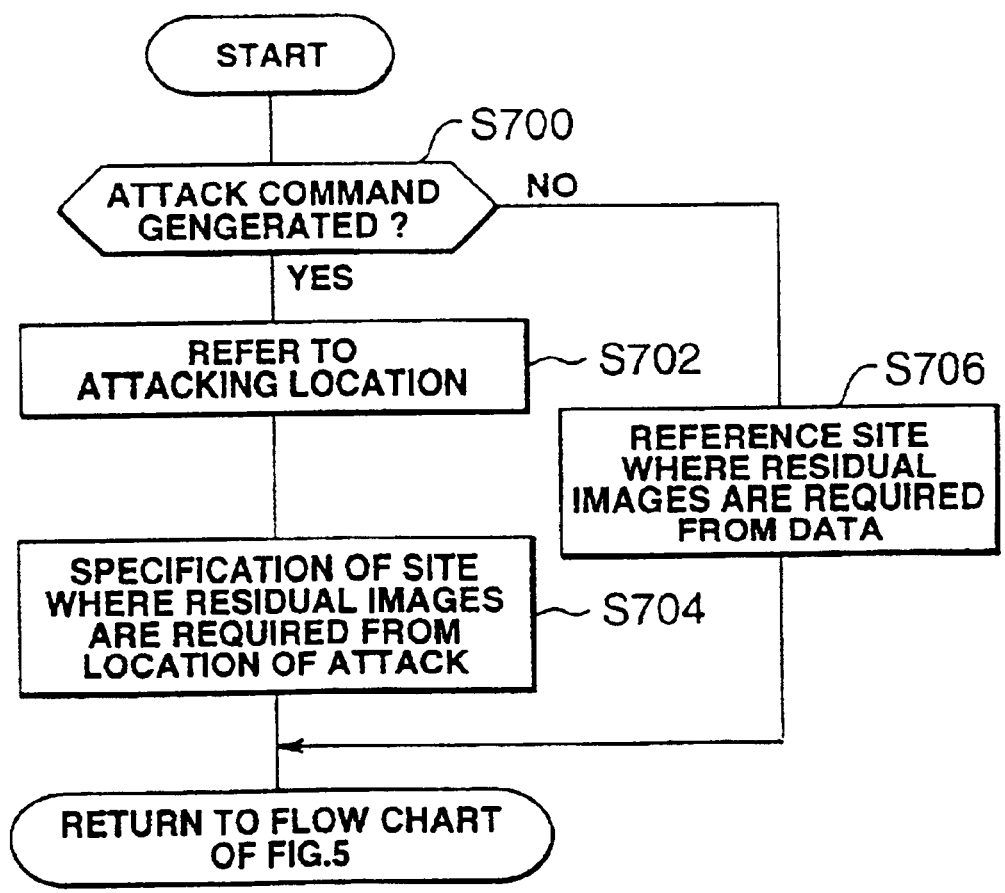
FIG. 39 is a detailed flow chart of the flow chart of FIG. 37.

In FIG. 39, when for example a rotating kick command is generated (the case of FIG. 35 corresponds to this), it is established by reference (S702) that the location of the attack is the ankle part (30A of FIG. 35); then, in order to form a residual image of the entire leg, ankle 30A, leg 30B, and thigh part 30A i.e. the entire leg on the left side (see FIG. 35) is identified as the site where residual images are required (S704). At this point, as described, it should be noted that a warrior is constituted of plurality of parts, each part being constituted of respective polygons. of course, it would be possible to display (S706) residual images even if an attack command is not generated. Of course, in this case, in the determination "are residual images required?" in S500 of FIG. 37, the need for residual images is determined such that residual image representation is possible even when "currently attacking" is not the case. This could happen for example in the case where the process of a warrior being knocked down by a move is displayed, accompanied by residual images. In this case, the part where residual images are needed is determined from the motion data as in S702 and S704.

Then, in S504 of FIG. 37, residual image display as described in FIG. 35 is executed; on arriving at S506, a determination is made as to whether or not residual image display has terminated. For example, a determination is made as to whether or not a series of motions has terminated; in the example of FIG. 35, a determination is made as to whether or not the rotating kick has terminated: if it is determined that it has terminated, residual image display processing is terminated.

In this embodiment, the data of the polygon file having a series of movement data of a warrior are directly successively recorded in the residual image buffers. In this polygon file, there are recorded the co-ordinates of each vertex of a polygon converted to co-ordinates and clipped, together with the normal vector at each point. Since this polygon file data is directly recorded in the residual image buffers, it only needs to be output together with the current actual image, so co-ordinate conversion (modelling) of polygons for use as residual images on each occasion, as was done in the prior art, is unnecessary, thereby lightening the calculation load on the CPU block. Furthermore, since residual images are displayed in the past positions of a part (leg) and semi-transparent calculation is applied, the residual image representation can be displayed with considerable dramatic effect. It should be noted that, in addition to the semi-transparent calculation, the display of leg polygons could be represented by mesh-shapes or a line. By semi-transparent processing, the residual image of the leg and the background are displayed simultaneously.

With this embodiment, large moves, to which residual images are affixed, and medium or small moves, to which residual images are not affixed, can be distinguished by the presence/absence of residual images by the visual sense of the player, thereby improving the realism of the game (variation and interest of the image representation as a game).

Flying Material Movement Processing

Next, churning-up processing of flying material (ground material) will be described. As will be described, this processing provides a mode whereby sand or water on the ground or leaves that have fallen on the ground can fly up. A description concerning the first two of these will be given first. The gist is as follows.

As shown in FIG. 35, when a warrior 30 performs motion involving kicking upwards using his feet or a warrior lands from the air, processing is performed whereby water or sand is churned up. Such processing is performed in order to raise the dramatic effect of the game. In particular, in a video game such as a hand-to-hand fighting game, in which the player seeks to control the character by rapidly operating the control buttons, the movements of the character are varied and rapid, so it is necessary to represent such churning-up of water etc. by rapid and precise calculation matching the movement of the character. The processing described below makes this possible.

Figure 40:
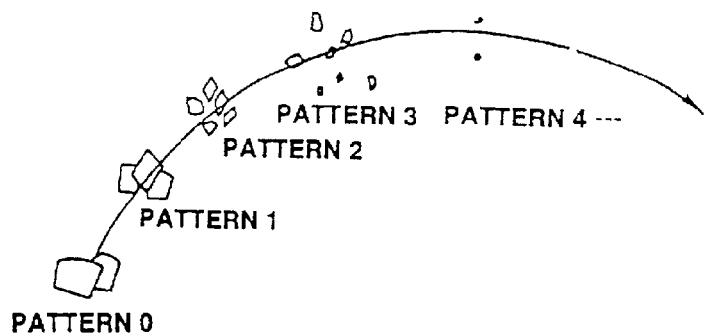
FIG. 40 is a diagram showing the track of flying material that has been churned up.

First of all, churning-up processing of sand or water will be described. In this connection, churning-up processing, as shown in FIG. 40, comprises sequential movement along a track found by calculation of a polygon of changing pattern (total of 32 patterns). These patterns simulate the condition of water or sand as it is sequentially scattered. If calculation were to be carried out for each particle of sand or water, a long calculation time would be required; movement is therefore performed whilst applying a pattern change, taking many particles together.

In this processing, a parts check of the warrior is performed. The warrior consists of the parts: head, right hand (upper arm, lower arm, wrist), left hand, breast, abdomen, hips, left leg (thighs, leg, ankle) and right leg. The parts check is performed for legs, head and hips. For example, [material] kicked up by the feet or falling from the head or hips is therefore simulated. The parts check includes a check of the amount of movement of the parts. Apart from this, the attribute flag of the virtual ground surface and the parts position flags are checked. The virtual ground surface attribute flag (b water) is set to "1 (water attribute)" or "0 (sand attribute)", and the part position flag (b air) is set to "1 (grounded condition)" or "0 (aerial condition)". If (b water) is "1 (water attribute)", churning-up of water is performed; if it is "0 (sand attribute)", churning-up of sand is performed. The churning-up of water or sand comprises the following modes.

Generation on landing: this is the case where the part lands on a ground or water surface: sand or water is scattered in all directions from the point of generation.

Generation by kicking up: this occurs in the condition in which the part is grounded on a ground surface (water surface); sand or water is churned up in the direction of movement of the feet (part that is being checked) by being kicked up by the feet. Generation by kicking up and landing are shown diagrammatically in FIG. 60. 280 in the Figure is a character (warrior); sand or water 282 is churned up in response to the movement characteristic of the feet by being kicked up by the feet. Alternatively, water or sand is churned up in all directions in response to the landing action, on landing.

In this processing, processing, called continuation processing, is executed, which is continued for a period of a few interrupts (a few scenes or a few frames) of occurrence of landing or occurrence of kicking-up. Usually, at the time of such occurrence, the churning-up number is determined and set to ¼ thereof. If the churning-up number is taken to be N, the churning-up number is successively decreased as follows with each interrupt. If the churning-up number is taken to be N:

First time: ¼N, $N'=N-(¼).N$

Second time: ¼N', $N''=N'-(¼)N'$

Third time: ¼N"

That is, it is set to ¼ in each case of the remainder of the churning-up number at each interrupt. Regarding the mode of churning-up, a pattern change is arranged to be performed as already described.

Processing in the case of landing occurrence will now be described. Let the position of the checked part on the previous occasion (i.e. one interrupt previous) be (OX, Oy, OZ), and the present position be (PX, Py, PZ). Let the height of the ground surface or water surface (Y co-ordinates) be epos.

Basic speed of the part:

SPDX=PX−OX      X direction

SPDy=Oy−Py      Y direction

SPDZ=PZ−OZ      Z direction

Total number of churning up (set number): Amount=Basic set number. Part movement amount.

Figure 41:
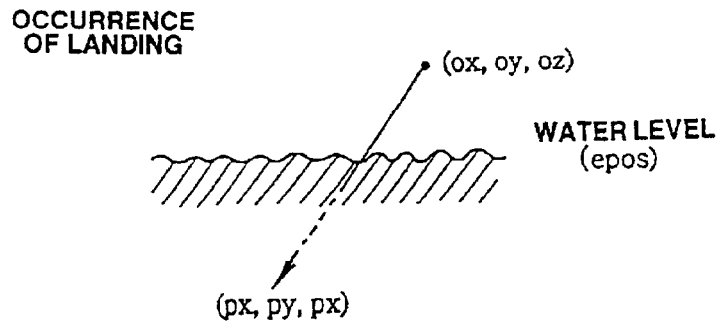
FIG. 41 is a diagram given in explanation of the occurrence of landing of flying material.
Figure 42:
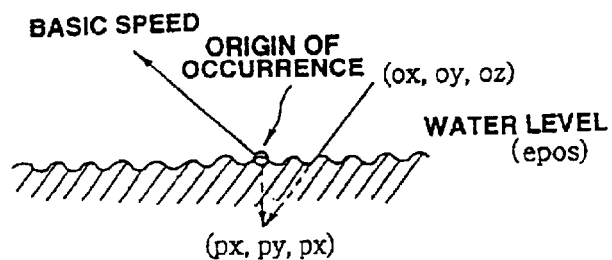
FIG. 42 is a view given in explanation of the occurrence of landing of flying material.

Point of origin of churning-up (point of origin of occurrence): FIG. 41 is a diagram represented from the height direction (Y direction) of virtual space. When the checked part is moved in the direction indicated by the arrow, as shown in FIG. 42, the point of origin of occurrence of churning-up of water or sand is set as OX, epos, OZ).

Figure 43:
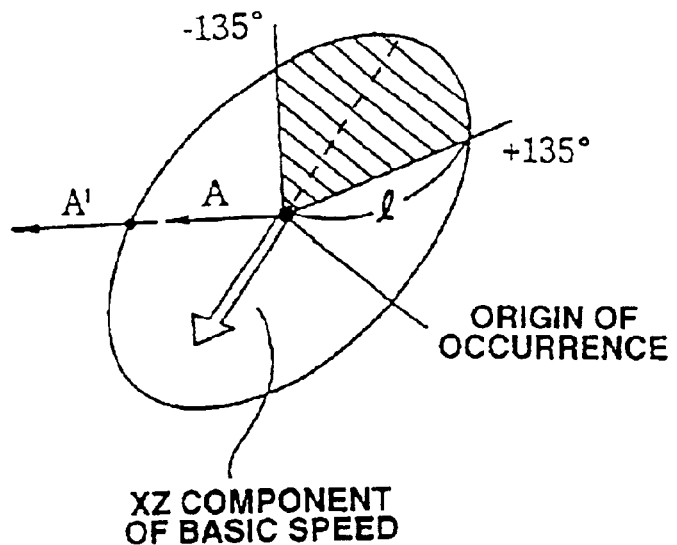
FIG. 43 is a view given in explanation of the occurrence of landing of flying material.

Processing of dispersion of sand (water drops): the X and Z components of the basic speed of the checked part are extracted. FIG. 43 is the X-Z plane of virtual model space set up in the image generating device. This Figure shows a condition in which this plane is seen from a position diagonally above it. The vectors of the X, Z components are randomly rotated in a range from +135° to −135° in the XZ plane. In the Figure, the range enclosed by the circle (excluding the hatched portion) is the direction in which sand (or water drops) are dispersed.

Figure 44:
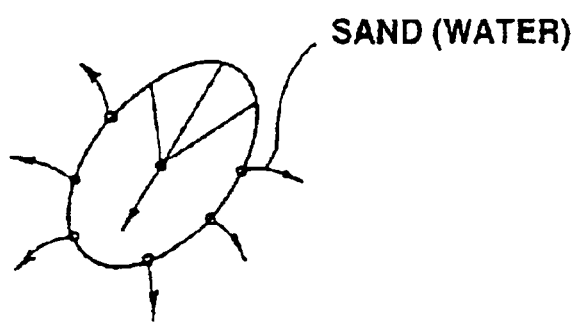
FIG. 44 is a view given in explanation of the occurrence of landing of flying material.

Let us now take A as a vector that is randomly rotated. Next, take A' as being the result obtained by moving L in the direction of the vector along this vector. In this case "L" is the radius of the part. For example, in the case of a leg this is set to 10 cm, in the case of hips this is set to 20 cm, and in the case of the head this is set to 15 cm. The final speed of churning-up of sand and water droplets is determined by adding this A' to the Y component of the basic speed. After this speed has been determined, the sand or water droplets etc. are moved along the track shown in FIG. 40 whilst being subjected to pattern change. In this way, as shown in FIG. 44, the appearance of sand (water drops) being scattered in all directions from around the part (radius L) is simulated.

Figure 45:
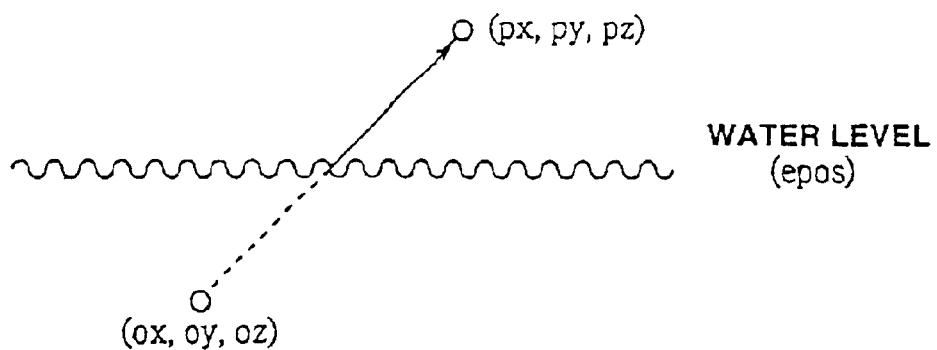
FIG. 45 is a view given in explanation of the occurrence of churning-up.
Figure 46:
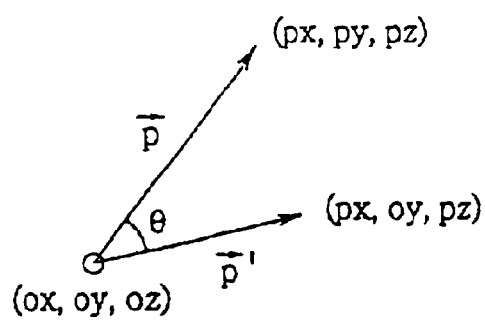
FIG. 46 is a vector line diagram on the occurrence of churning-up.

Next, the processing of occurrence of churning-up will be described. Let us assume that a foot is kicked upwards in water or sand as shown in FIG. 45 corresponding to FIG. 41. In the case of such an action, let the basic speed of the checked part be (Px−OX, Py−Oy, PZ−OZ). The angle of churning-up of this vector (COS θ), as shown in the Figure, is calculated, as shown in FIG. 46, using the inner product of the vector.

The reason for finding COS θ in this case is that the amount of churning-up decreases as the angle of churning-up gets larger, as it gets closer to (90°). That is, the set number for the water/sand is: Basic set number. Amount of movement. COS θ.

The speed of the sand/water drops is a value obtained by multiplying the basic speed by the numerical value of a random number (0~255)/2550. This is identical with the previous case of occurrence on landing. Variations in sand/water scattering occurring randomly can be represented by multiplying by a random number.

Figure 47:
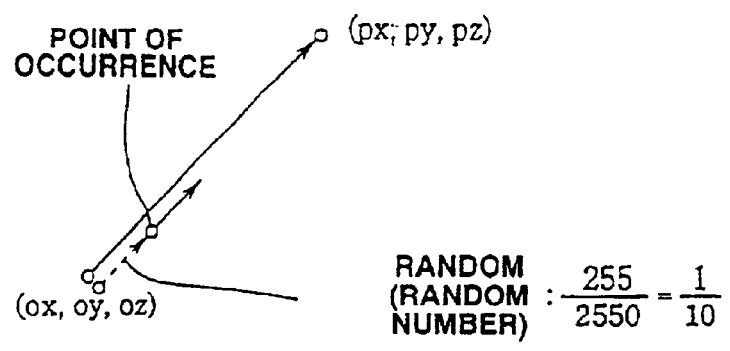
FIG. 47 is a vector line diagram on the occurrence of churning-up.

The point of generation of scattering of sand or water is obtained by further adding (OX, Oy, OZ) to this speed. Referring to FIG. 47, if the random number is 1/10 (=255/2550), the point of generation is expressed by the co-ordinates shown in FIG. 47. Sequential pattern change (32 patterns) is applied to the sand/water as shown in FIG. 40.

Continuation processing, as described above, is used to effect continuous display of sand/water scattering, using the landing occurrence point or churning-up occurrence point that has thus been determined.

Figure 48:
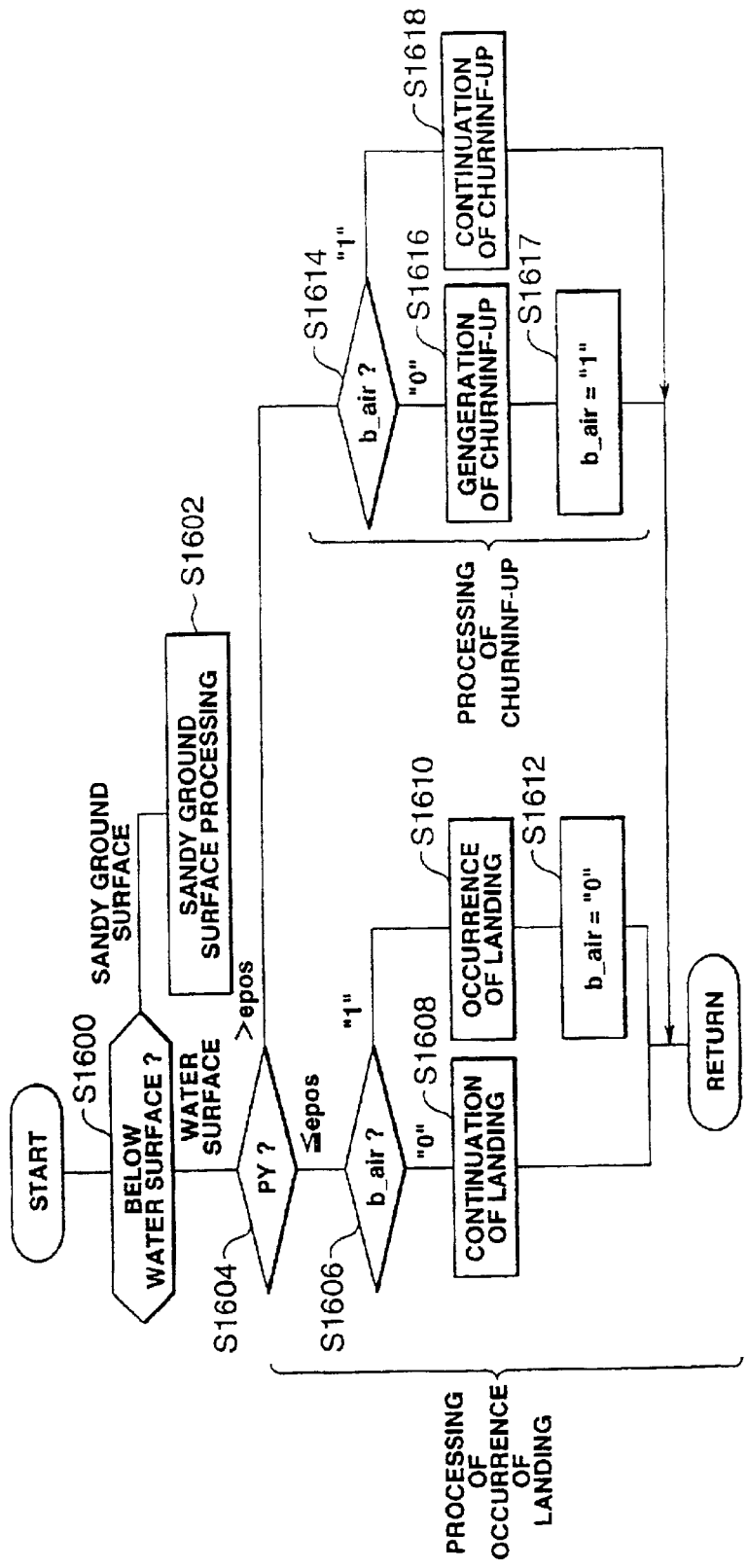
FIG. 48 is a flow chart of flying material movement processing.

FIG. 48 is a flow chart of this embodiment (processing of movement of flying material) described above. In S1600, it is determined whether there is a water surface below the checked part or not. This determination is performed for a stage (scene) in which churning-up of water or sand is anticipated. In other words, this determination is not performed where the surface on which the warrior is standing is a rocky surface, soil, or other solid object. By proceeding in this way, although there are various different stages, such processing of flying material can be carried out rapidly by being confined to the stages where it is necessary. If the surface below the part is not water, processing shifts to the next step. In this stage, the grounding attribute flag described above (b water) is set to "1". In the case of a stage above sand, processing shifts to processing (S1602) of a sandy surface. However, since this processing is identical with the processing on a water surface, description thereof is omitted. In the next process, in S1604, a determination is made as to whether or not any part of the character (warrior) has landed, by comparing the Y co-ordinate (Py) of the current position of the character and the Y co-ordinate (epos) of the water surface position. Depending on this determination, if the checked part is below the water surface, processing shifts to processing of occurrence of landing, while, in the opposite case to this, it shifts to processing of occurrence of churning up.

In S1606, a determination is made as to whether or not [the character] was in the grounded condition at the previous interrupt, by checking the landing determination flag. If this flag (b air) is "0", this grounded condition is continued for a few interrupts (S1608). On the other hand, if this flag is "1", it is concluded that landing has just occurred at the present interrupt, and landing occurrence processing (S1610) is performed; also, this flag is reset to "0" (S1612) and return is effected to the main routine of FIG. 34.

However, if the Y co-ordinate of the checked part is higher than the position of the water surface, processing shifts to S1614 and [a determination] is performed as to whether or not the character was in the grounded condition on the preceding interrupt, by checking the landing determination flag. If, on the previous occasion, the character was in a landed condition i.e. the checked part was below the water surface, it is assumed that, for example, kicking-up by the feet as shown in the Figure has currently taken place and the upwards churning-up pattern is displayed (S1616) matching the movement of the feet through the water. This flag is then set to "1" and return (S1617) is executed. On the other hand, if the character was not in the landed condition on the previous occasion, churning-up processing is continued (S1618).

As described above, with this embodiment, the amount of movement and the direction of movement of a character can be reflected by the surface material (water or sand etc.) that is moved to match the movement of the character.

Next, processing will be described that simulates flying-up movement (one type of flying material movement processing) of leaves (one type of flying material) that has fallen on to the stage caused by a wind generated by movement of a character (warrior) in the game.

Figure 49:
FIG. 49 is a rear view of a character to which flying material movement processing has been applied.

Referring to FIG. 49, 170 indicates a moving warrior and 172 indicates leaves that are made to fly up by the moving warrior. "Wind" as referred to herein does not mean a wind that is maintained for several interrupts but, rather, a vector that has an effect on the behaviour of leaves within a single interrupt (an interrupt is the period for display of one scene and is in this case ⅟60 seconds, in other words, the period between vertical synchronisation signals).

Figure 50:
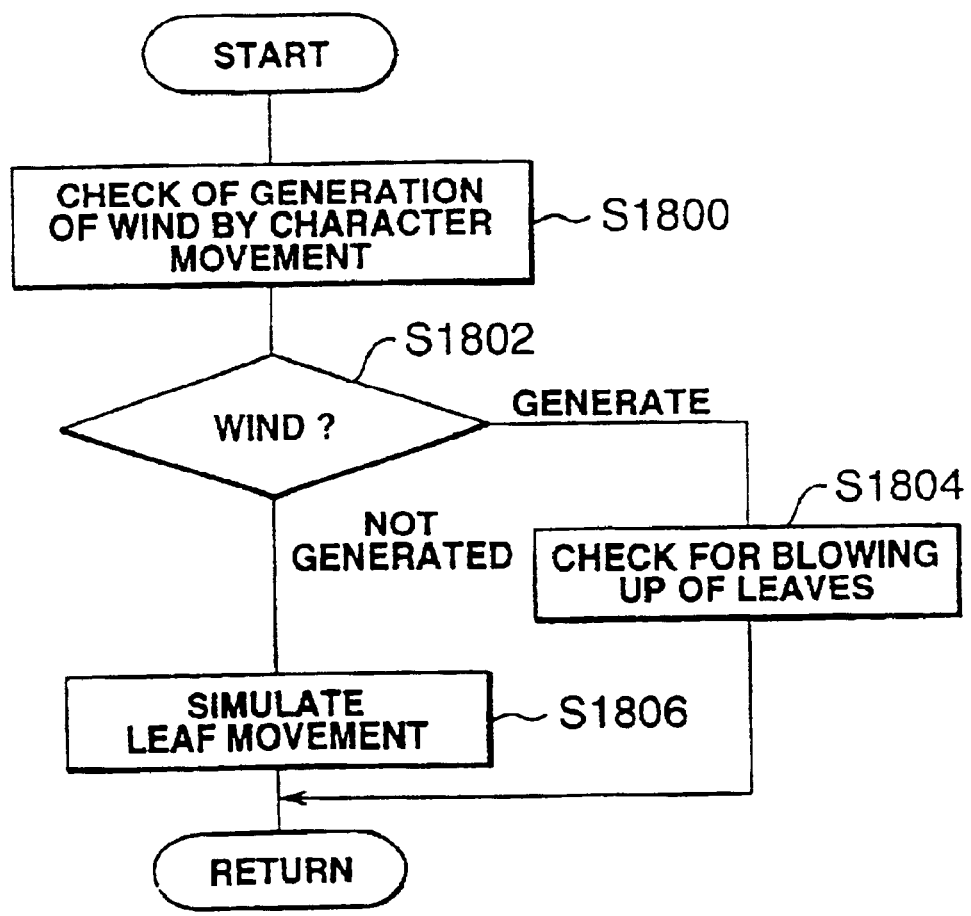
FIG. 50 is a diagrammatic flow chart of such processing.

This processing is executed in accordance with the diagrammatic flowchart shown in FIG. 50. In this flowchart, a check is performed (S1800, S1802) to establish whether or not a wind has been generated by movement of a character. Next, when generation of a wind is simulated, processing shifts to the routine to check flying-up of leaves (S1804), and the movement of leaves is the simulated (S1806). In this games machine, the condition that leaves that have been initially blown up into the air are allowed to fall is simulated; this free falling movement is continued until the leaves reach the ground surface; after the leaves reach the ground surface from the air, movement of the leaves along the ground until they stop is also simulated. If no wind is generated, movement of the leaves is continued (S1806) without checking whether the leaves are blown up.

Figure 51:
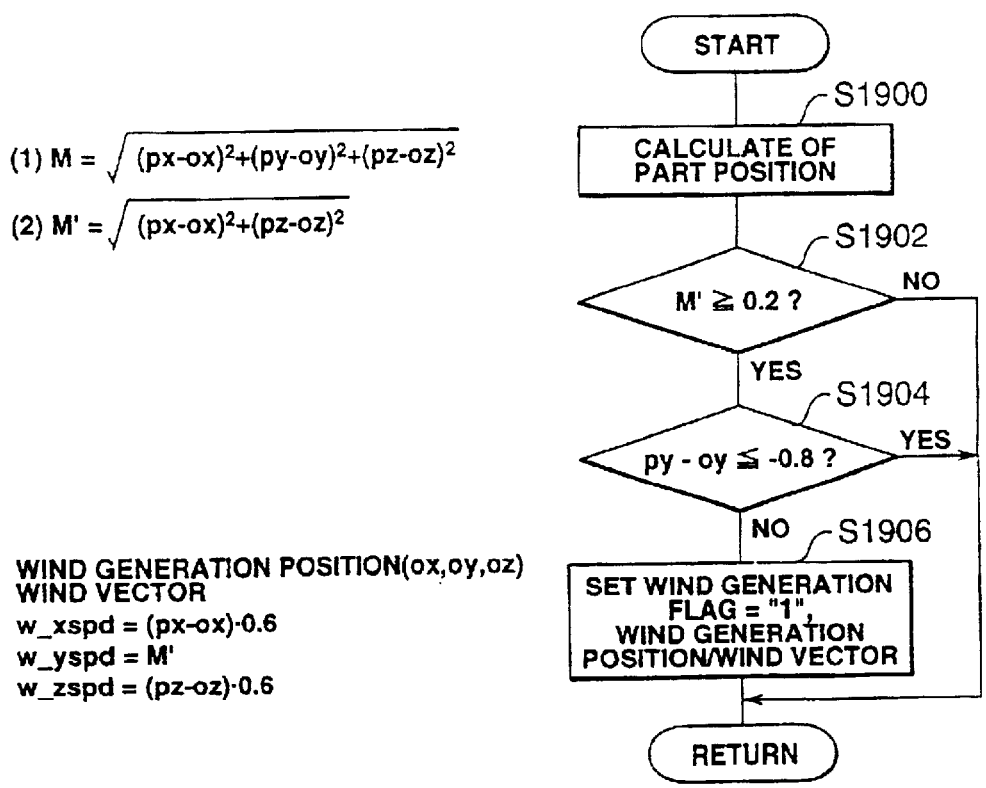
FIG. 51 is a detailed flow chart thereof.

First of all, a flow chart for checking generation of wind will be described with reference to FIG. 51. In S1900, the part position is calculated. This calculation is performed at each interrupt mutually for warriors 1 and 2, if there are a pair of warriors. The parts that are subjected to the check are a total of three locations: right leg, left leg, and head. Whether or not wind is generated is determined by checking the amounts of movement of these respective parts. This determination is performed as follows. As shown in the Figure, let us take the position of the part being checked on the previous occasion (i.e. one interrupt previous) as (OX, Oy, OZ), and the position on the present occasion as (PX, Py, PZ). The amount of movement M on this occasion is as indicated by equation (1) of FIG. 51. In this case, the amount of movement M' (expression (2)) in the XZ co-ordinate system is employed. In step S1902, if M' is larger than 0.2, the amount of movement of the part is deemed to be sufficient to generate wind, and processing shifts to the next step. If M' is smaller than this value, wind is deemed not to be generated and this routine is terminated. In S1904, if the amount of movement (Py−Oy) in the Y direction is (Py−Oy) ≦−0.8, the wind direction is deemed to be extremely downwards and wind is therefore deemed not to be generated. In Si906, the wind generation flag is set to "wind is generated (=1)", and the wind generation position and wind magnitude (vector) are determined.

The wind generation position and the vector of its X, Y, Z direction are as shown in the Figure. M' is corrected to 0.12 ≦ M' ≦1.0. This M' is the vector of the Y direction of the wind. The vectors of the X and Z directions are taken to be values obtained by multiplying the amounts of change of the X direction and Y direction by 0.6. The reason for multiplying by 0.6 is that the vectors in the X and z directions are taken to be relatively smaller in value than the vector in the Y direction, so as chiefly to simulate the condition of wind blowing upwards in model space. Wind is deemed to generate only a single vector during a single interrupt. If wind is generated in more than one location, wind is deemed to be generated in whichever of these has the largest value.

Figure 52:
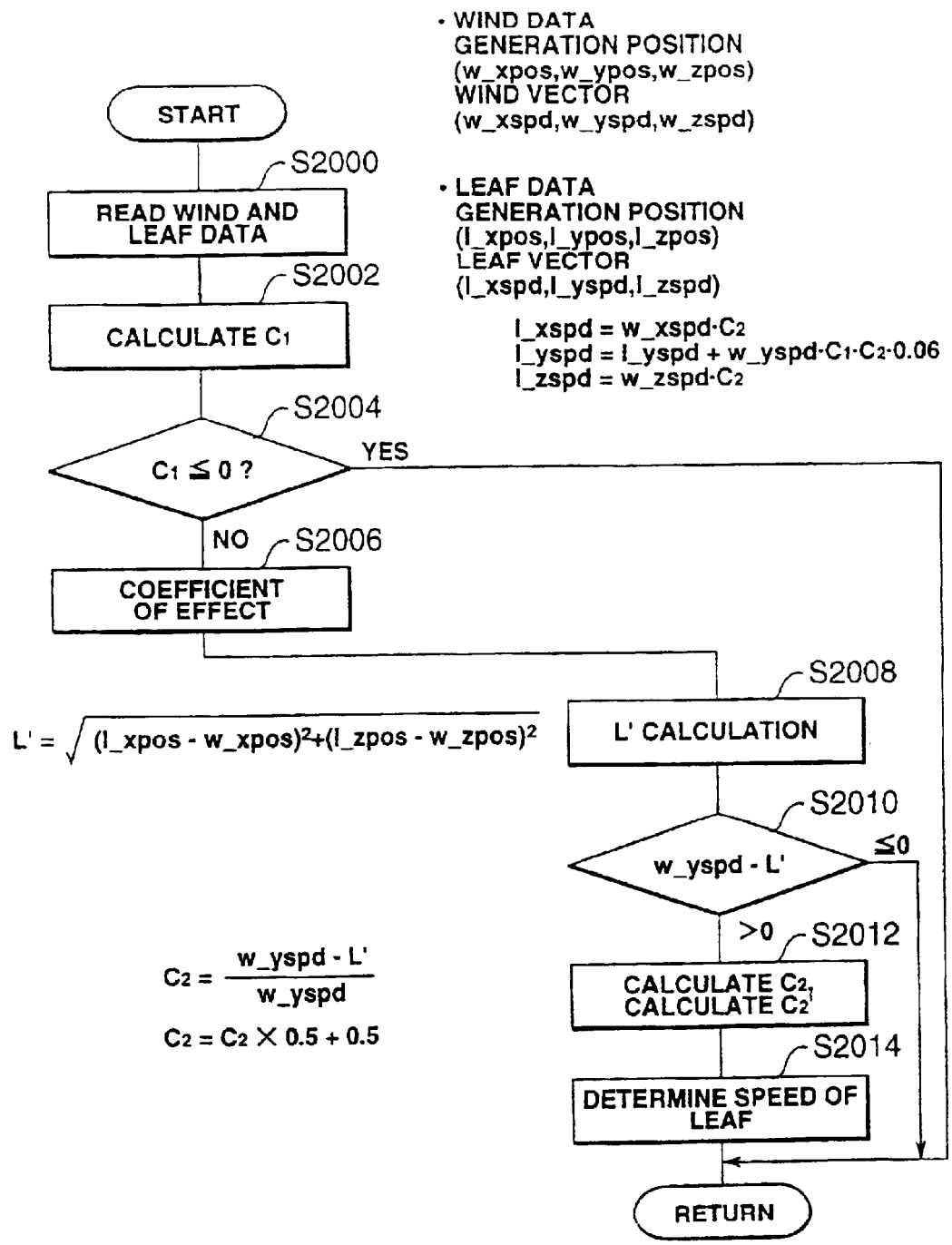
FIG. 52 is a detailed flow chart thereof.

Next, a flow chart of the check for blowing-up of leaves will be described (FIG. 52). A check is made for each leaf, using the wind generation position and leaf position, to ascertain whether or not the leaf could be affected by wind; if it is within the affected range, the movement of the leaf (speed, vector) is changed under the effect of the wind.

In step 2000, the wind data and leaf data are read. These data (X component, Y component and Z component) are as shown in the Figure. Calculation regarding the height of the leaf is performed in S2002. This calculation is as follows. Letting the height from the ground be epos, a height 1 m above the ground is epos +1.0 (m). Let us take C1 as the value obtained by subtracting the height of the leaf 1 ypos from this height.

$$C1 = epos + 1.0 - 1\ ypos \quad (m)$$

If C1≦0, the position of the leaf (more than 1 m above the ground) is deemed to be sufficiently high as not to be effected by the wind produced by actions of the character, so processing is terminated. Under these conditions, the leaf is not effected by wind (degree of effect 0%). On the other hand, if it is determined that there will be an effect due to wind (S2004: No) i.e. if C1>0, the effect coefficient corresponding to the value of C1 is determined (S2006). For example, if the leaf is on the ground, (1 ypos=epos, C1=1) so the leaf undergoes 100% of the effect of the wind. If C1=0.5, it undergoes 50% of the effect. C1 takes a value 0 C1 ≦1.0. This is explained in FIG. 68. This effect coefficient is a coefficient for designating what percentage of the effect of the wind the leaf is subjected to, depending on the height of the leaf. Next, in S2008, the position of generation of the wind and the distance L' in the XZ plane of the leaf are calculated. As described above, w yspd in the calculation expression of L' shown in the Figure is the vector in the Y axis direction of the wind and also serves as the effect distance (radius) with respect to the leaf.

Figure 53:
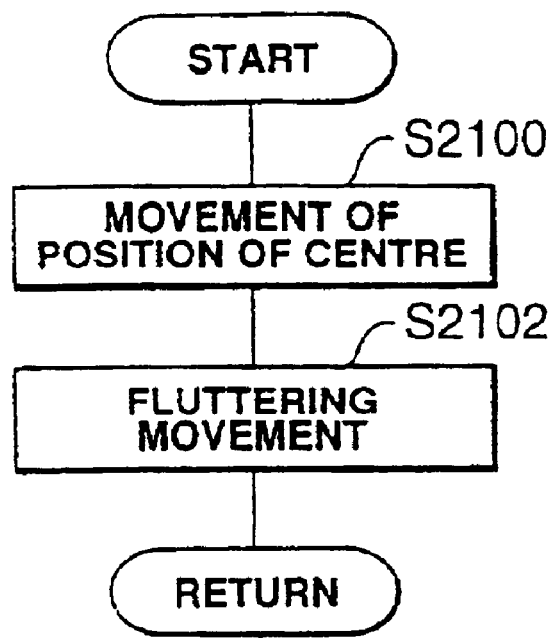
FIG. 53 is a detailed flow chart thereof.
Figure 68:
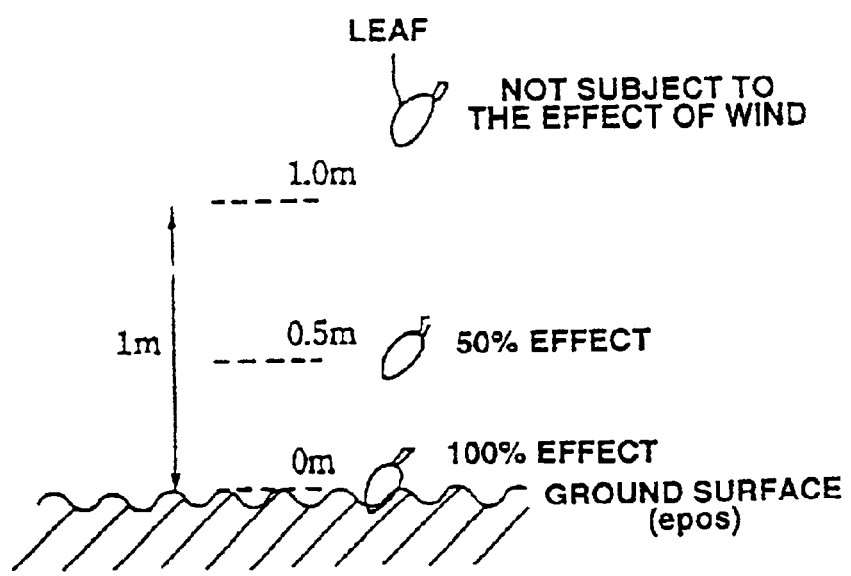
FIG. 68 is a view given in explanation of a coefficient whereby leaves are affected by wind depending on the respective heights of the leaves in flying material motion processing of FIG. 4.

If w yspd-L' is 0 or less, the leaf is deemed to be outside the range of effect of the wind, so there is deemed to be no effect from the wind and return is executed (S2010). On the other hand, if it is more than 0, C2 (effect coefficient dependent on distance) is calculated. Further, this C2 is corrected to calculate C2'. An example of this effect coefficient is shown in FIG. 68. In S2014, the effect of the wind on the leaf (vector: X direction, Y direction, Z direction) i.e. the speed of the leaf (vector) is determined as shown in the Figure; thus the movement of the leaf is simulated (S1806 of FIG. 50) by adding this effect at the current position of the leaf. The processing routine for leaf movement will be described immediately afterwards. The leaf speed in the X direction and Z direction are constantly newly set and the Y speed is added to the speed on the previous occasion (previous interrupt). Next, a detailed flow chart simulating leaf movement is described (FIG. 53).

As shown in FIG. 54, two modes of leaf movement, namely, movement of the centre position of the leaf and rotational movement X, Y rot are given.

(1) shows movement in which the centre position of the leaf is displaced by the effect of wind or by weight and (2) shows fluttering movement of the leaf simulated by X rot and Y rot. These movements are described by a diagrammatic flow chart and constitute one link of pre-fall movement.

A characteristic expression for the former movement (when in the air and when landed from the air) is as shown in S2100 of the Figure. The reason for multiplying the speed in the X direction (1 xspd) by 0.87 to obtain the new speed in the X direction in the case where the leaf is in the air is to take into account air resistance. The same applies in regard to the Z direction. The new speed in the Y direction is obtained by subtracting 0.002 from the speed in the Y direction. This simulates gradual increase in the speed in the direction of the weight of the leaf. However, the maximum speed of fall in the Y direction (1 yspd) is taken as −0.006. The case where the leaf has landed will be described later.

Figure 55:
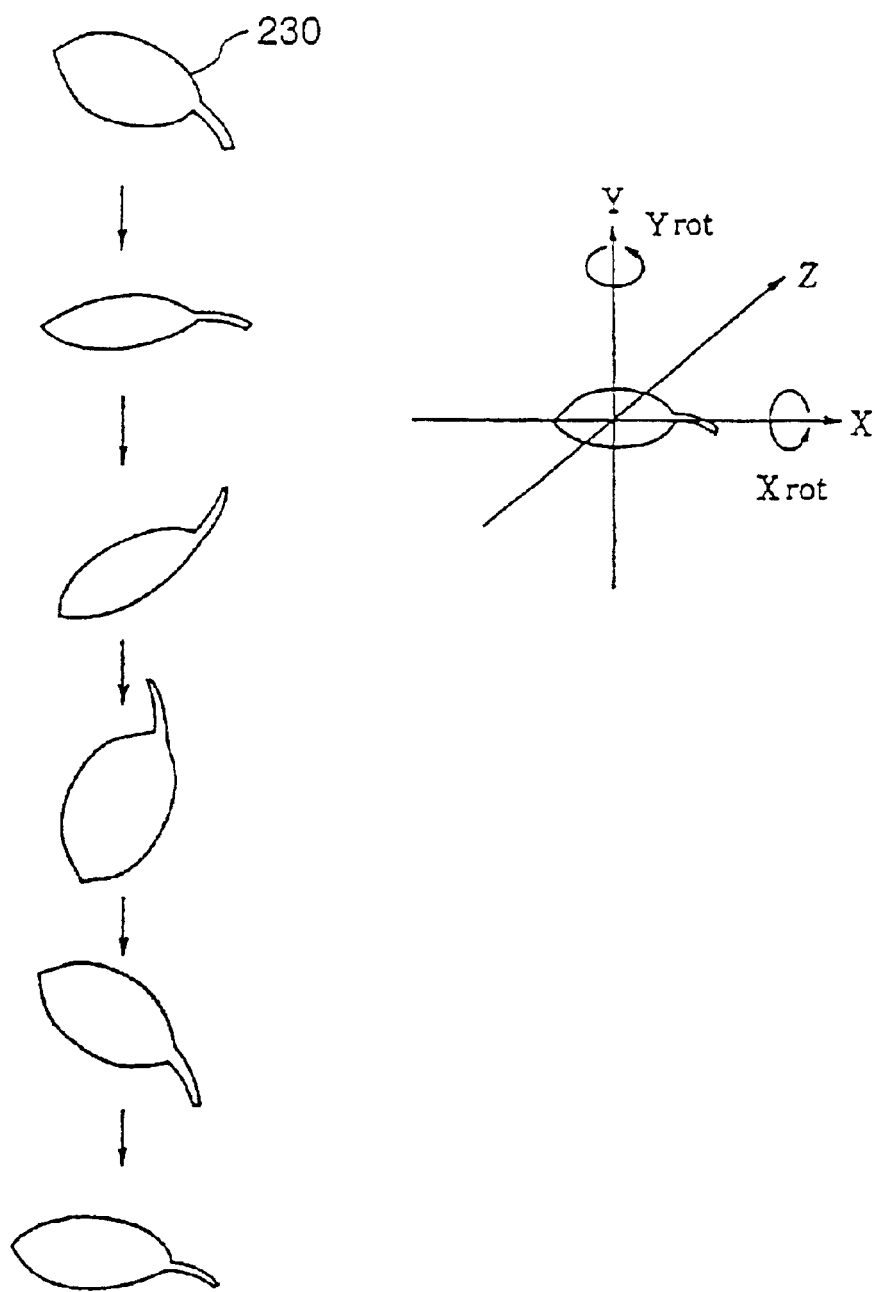
FIG. 55 is a view illustrating a mode of movement of flying material.

In contrast, as shown in FIG. 55, the fluttering condition of leaf 230 is simulated by means of X rot and Y rot described above. In this embodiment, 32 patterns of X rot are provided and successive pattern changing is performed. Rotation based on Y rot is as follows.

Y rotational speed=1 yspd×1200×256

One-turn rotation (360°) is expressed by 0x0000~0xFFFF (0~65536). This is 1° (solid black block symbol)$^2$ 182 (0xb6). It should be noted that, if Y rot were also subjected to pattern changing, there would be a risk of leaf movement simulation appearing to be coarse, so only one rotational element (X rot) is subjected to pattern change, the remaining element (Y rot) being found by calculation.

As shown in FIG. 53, movement of the leaf after it has reached the ground surface is simulated using the centre movement characteristic expression and rotational movement characteristic expression (S2100, S2102). The centre movement characteristic expression is shown in FIG. 53. In this movement characteristic expression, the speed of the leaf in the Y axis direction (1 yspd) is set to 0, so a condition in which the leaf moves over the ground surface whilst rotating is simulated. In this characteristic expression, the reason why the X direction speed and Y direction speed are respectively multiplied by 0.5 is to take account of ground friction: the fact that the frictional resistance of the ground is larger than the resistance of the air is simulated by multiplying by a smaller value than in the case where the leaf is in air. A determination is made as to whether or not the angle of rotation of the leaf about the X axis (X rot) is "0"; if it is "0", the leaf is deemed to have come into contact with the ground surface in parallel and movement of the leaf is stopped. After the leaf has risen into the air under the influence of the wind generated by movement of the character, movement of the leaf is therefore stopped at the time point when this leaf falls on to the ground surface and becomes parallel with the ground surface.

Whether a leaf that had been floating in the air has landed or not is determined by comparing the Y co-ordinate of the ground surface and the Y co-ordinate of the leaf. If the Y co-ordinate of the leaf s (or "=") the Y co-ordinate of the ground surface, the leaf is determined to be in a grounded condition. Shape modelling of the leaf is effected by mapping a leaf design (texture) on to a single polygon.

Since the amount of movement and direction of movement of the flying material (water/sand/leaf) as described above is determined by the movement characteristic of the character (model), the movement of the model can be precisely reflected in the flying material. Such flying material is made to fly up or falls down in response to the movement of the original model, so the actions of the flying material can be simulated with high quality by reflecting the movement of the model to these.

Also, with the movement processing of moving material described above, (free) falling movement of the model (flying material) in virtual space can be reproduced with a high degree of dramatic effect and with high quality. For example, images of fluttering leaves can be generated.

Free-Fall Movement Processing

Next, movement processing of an object falling in virtual space will be described. In this embodiment, the object is taken to be snow, and simulation of dramatic effects by applying a "swirling" movement to the snow will be described. In this connection, what is meant by "swirling" is a comparatively irregular movement such as a condition in which snow falls whilst being blown about by the wind or a condition in which the snow rises and falls in the manner of a falling leaf after being stirred up by movement of a warrior. This embodiment efficiently simulates this "swirling" condition. A practical example of the swirling of snow will now be described. The swirling and falling snow is constituted by one or more polygons and is affected by the wind vector that is set up in model space (this vector may be suitably varied). The movement of the snow polygons is simulated by the effect produced by free fall due to its weight and the wind vector (the foregoing is the first means of the claim) and by circular movement (second means of the same claim) in the XZ plane of virtual space (horizontal plane i.e. co-ordinate system parallel to the ground surface). The angular speed and amplitude of the circular movement are stored in tabular form in the memory and one of these is selected for use.

The circular movement described above that applies swirling to the behaviour of the snow is applied as follows. Taking the angular speed as wo, the angle of rotation as q and the amplitude as a, the amount of offset with respect to the X component (x off) and Z component (z off) of the swirling component i.e. the basic behaviour of the snow (determined by free fall and a vector due to the wind) is as follows.

x off=sin $(q+\omega).a$ y off=cos $(q+\omega).a$

This offset data is calculated ten times during each interrupt and added to the basic position of the snow.

The equation of motion of the snow is as follows.

x pos: snow position (X direction)
y pos: snow position (Y direction)
z pos: snow position (Z direction) are assumed.
x pos=x pos+x off+wind x (x component of wind vector speed)
y pos=y pos+fall (falling speed of the snow), for example −1 cm/int)
z pos=z pos+z off+wind z (z component of the wind vector speed)

In the present embodiment, the swirling and falling behaviour of snow blown about by the wind (see FIG. 56) is expressed by the foregoing equations of motion. Consequently, the complex "swirling" movement of the snow can be obtained by a simple calculation expression and the calculation load applied to the CPU block is therefore not very great.

Figure 56:
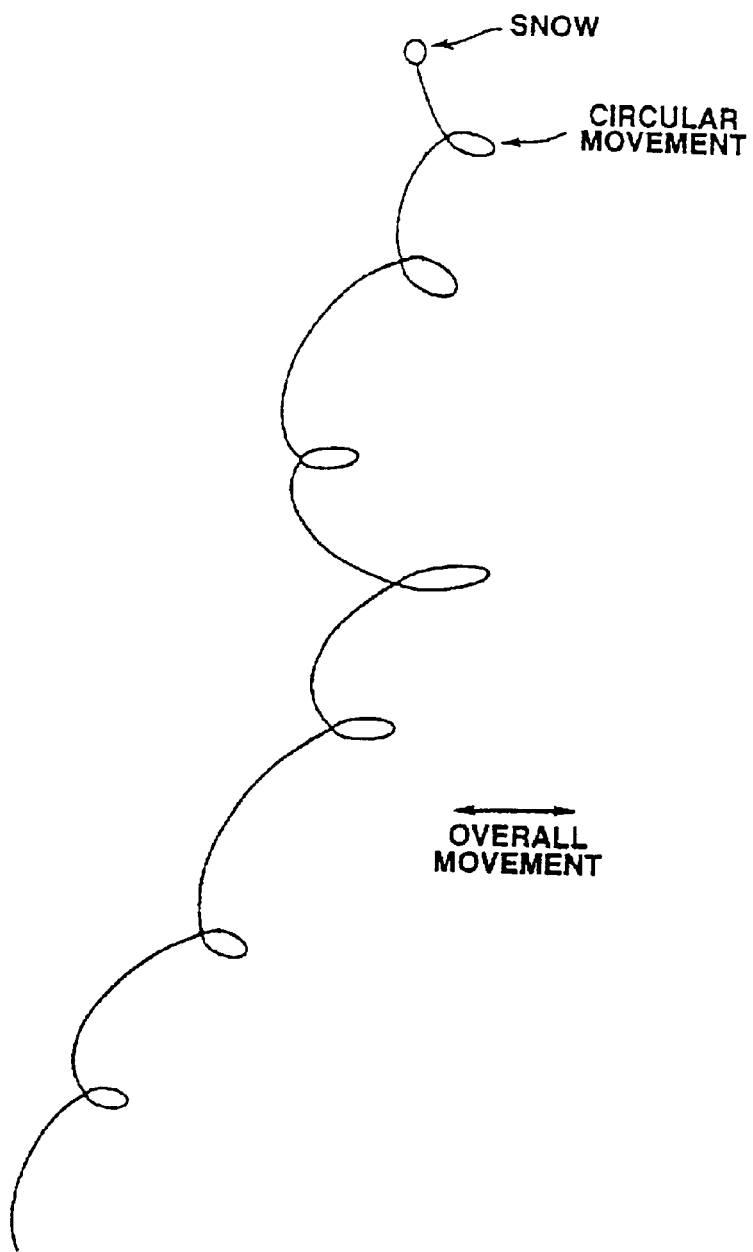
FIG. 56 is a view illustrating the movement track of an object in respect of which free-fall movement processing has been performed.

FIG. 56 shows the track of movement of such snow: even though a vector whose magnitude and direction are varied in a prescribed direction is added to freely falling snow, the "swirling" condition cannot be accurately simulated. Accordingly, this "swirling" may be reproduced by adding a circular motion (this is a type of circulating movement; elliptical movement or the like could also be employed) to this snow.

By means of this processing, the quality in simulating free-fall movement of a model in virtual space can be raised, so the dramatic effect of free-fall image processing can be manifested to a high degree.

Collision determination processing in irregularly shaped zone Next, collision processing between an irregularly shaped zone and a model will be described. This processing has the following significance. In this connection, a zone is a region restricting movement of a warrior and can easily be understood by for example imagining a ring whose periphery is enclosed by a wall of irregular shape. The warrior can move freely within this ring but can not cross the wall to move out side the ring. This wall corresponds to a "zone" in this description.

An irregularly shaped zone 250 is shown at (A) of FIG. 57. This zone is set up in the XZ plane (the Y axis is the height direction) of virtual space. This zone is set up as a heptagon. Such a zone could be set up in various modes. If a ring with a stone periphery is imagined as such a zone, this means a stone arena. FIG. 57 shows the principles of this processing. The position of the character must be corrected so that the character does not move beyond the wall, in order to demonstrate that the wall (zone) actually exists. In this embodiment, collision determination is performed between the character and the wall of the warrior arena, whose size and shape can be set at will, and an expulsion vector in the normal direction of the wall is calculated in order to correct the position.

FIG. 57 (A) is a model diagram of this collision determination; (B) is a diagram showing the principles of the vector calculation; and (C) is a partial view to a larger scale of the model diagram for determination of collision of a character (model) and zone. In FIG. 57, the vector calculation expression is also given.

As shown in (A), in this collision determination, the shape of the character is approximated by a sphere; furthermore, the wall and this sphere are projected in parallel on to a plane (XZ plane) parallel to the ground surface so as to find the positional relationship between the sides forming the region of the zone and the circle 252 obtained by projecting the sphere. The position of the sphere is the calculated position of the character. In this Figure, L is one vertex of an arbitrary side of this zone and R is another vertex of this side. This is set such that L comes in the anti clockwise direction with respect to an arbitrary side.

T in the Figure is the centre-point of the projected circle of the character. Vector R, vector T, and vector L are vectors set from some arbitrary point of this co-ordinate system to these various points. Also, vector P is a vector drawn perpendicularly from the centre co-ordinate of the circle to each side of the zone. Vector P is a vector drawn at right angles to side LR from the point of intersection of the circle and the tangent to this circle parallel to side LR, and corresponds to the expulsion vector in this process. The object of this process is the calculation of expulsion vector V. When the centre of the circle is outside straight line RL (this is assumed to be a positive region), as shown in the Figure, an expulsion vector is set up as shown by expression (1) in the Figure. In contrast, when the centre of the circle is within straight line RL (this is taken to be the negative region), it is set up as in expression (2). In other words, if the distance between the centre of the circle and straight line RL is more than radius (d), an expulsion vector is not set up. If this distance is exceeded, an expulsion vector is set up. In this case, since the vector is directed in the direction of the wall, unit vector Pe is set up in the opposite direction to when the centre of the circle is outside straight line RL.

Figure 58:
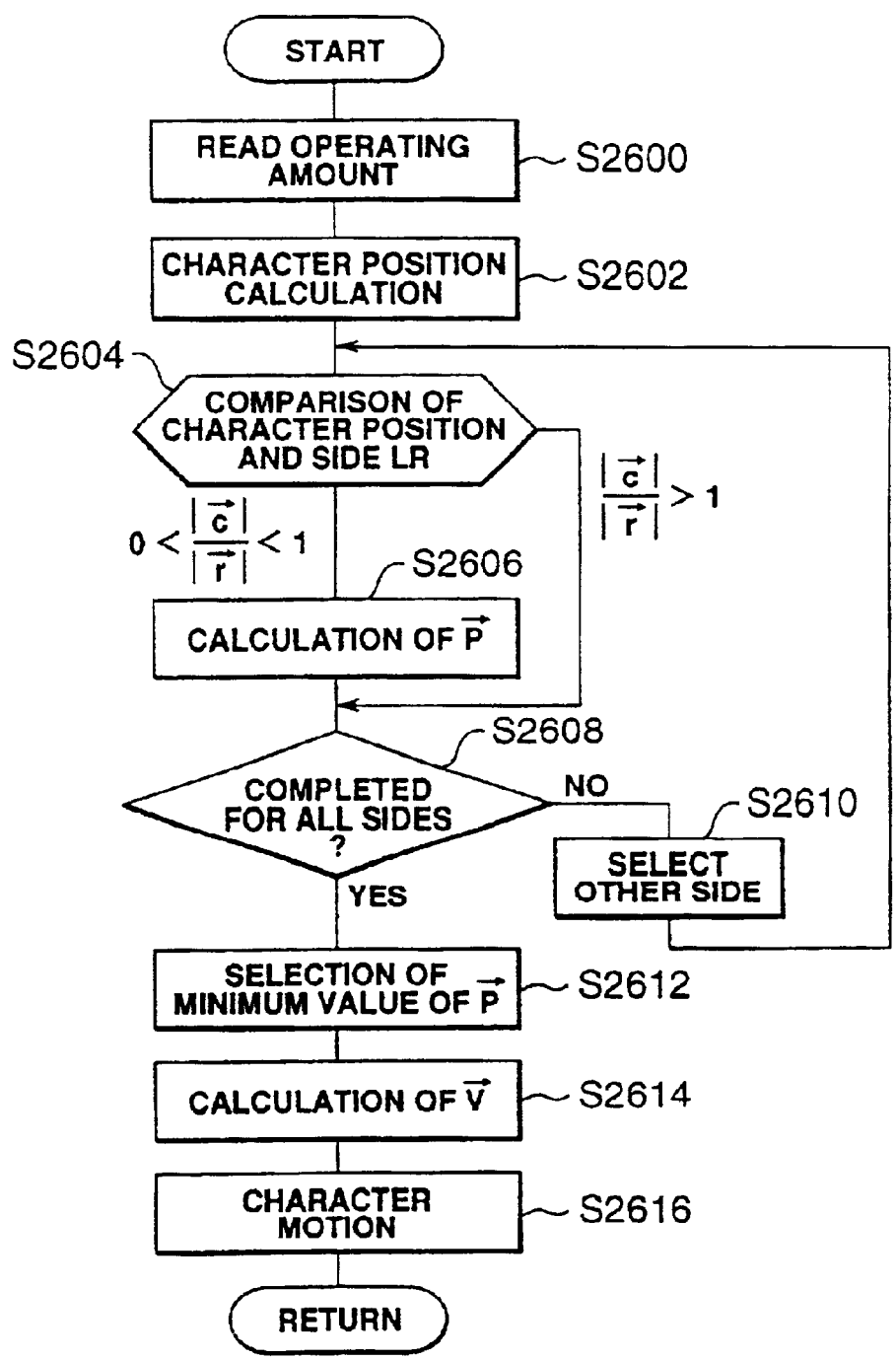
FIG. 58 is a flow chart thereof.

FIG. 58 is a flow chart given in explanation of the operation of this embodiment. First of all, the amount of operation of the button or direction key of the controller is read (S2600). The calculated position of the character is determined from this operating amount (S2602). Specifically, this position is requested by the operation of the controller and is the position of the character calculated as if there were no zone.

Next, in S2604, a comparison is made of this character position and a given side RL. Specifically, the relationship of expression (3) of FIG. 57 is checked. If the result of this determination is negative (>1), this relationship is checked for the next side RL. If in this case a vector P cannot be drawn at right angles to this side from point T (in other words, this cannot be done in respect of a side that is the subject of collision determination), processing shifts to S2608 without performing calculation processing of vector P of S2606.

If this relationship is affirmed, the value of vector P is calculated in accordance with what is shown in FIG. 57 in S2606. Next, in S2608, a determination is made as to whether the processing of S2604 has terminated for all the sides; if this is denied, processing shifts to S2610 and comparison is executed for the other sides (S2604). On the other hand, if this is affirmed, processing shifts to S2612 and the minimum value of vector P is selected. The side at which this vector P is to be set up is determined as the wall (side/zone) at which an expulsion vector is to be set up in the normal direction. In other words, it is determined that the character is making contact with the side where this vector is set up.

In the next step (S2614), a determination is made as to whether or not the centre of the circle is within the zone: if it is outside the zone, an expulsion vector is set up in accordance with expression (1) of the Figure; if it is within the zone, an expulsion vector is set up in accordance with expression (2). In the case of expression (1) and (2), if the magnitude of vector P is smaller than the radius of the circle, a collision is deemed to have occurred between the character and the wall and the expulsion vector described above is set up. By means of this expulsion vector, image processing is executed (S2616) whereby further movement of the character beyond this zone (wall) is restrained in the actual image.

Of course, image processing could be executed whereby, by the expulsion vector from this wall, the model is pulled by vector V defined in the normal direction of the side from the wall. FIG. 57 shows an example of image processing in these circumstances, reference numeral 350 being a warrior while reference numeral 352 is an irregularly shaped wall. The condition is shown (condition (1) in the Figure) in which, even though a warrior 352 tries to move towards the zone in the Figure (left-hand direction in the Figure), this is obstructed by the zone so that movement is not possible. That is, as shown in (2) of the Figure, while the warrior 350 as a whole is in a condition in which movement is prevented by the zone, right leg 354 (a subsidiary part of the character) can be extended or retracted as shown by the double-headed arrow. The player can thereby be made aware that the model that he is controlling is blocked by a zone so that it cannot move further in this direction.

With the processing indicated in this embodiment, an expulsion vector is arranged to be calculated for each side, so, even in the case of an irregularly shaped zone, determination of collision between this zone and the character can be carried out in a reliable manner (specifically, collision determination is affirmed when the value of the expulsion vector is given) and the results of this determination can be reflected in image processing.

Compilation of texture series

Figure 59:
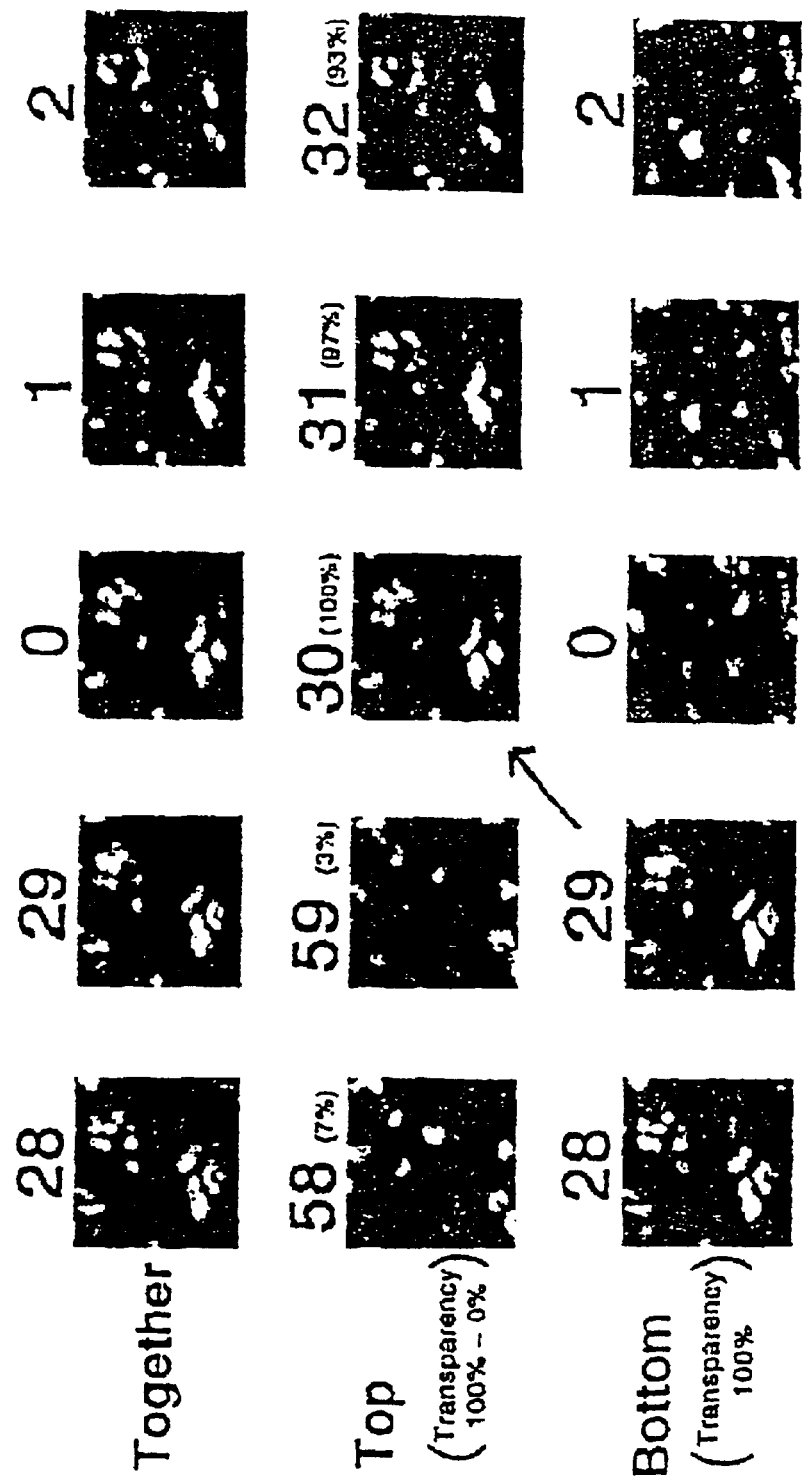
FIG. 59 is a diagram illustrating the principles of compilation of a texture sequence.
Figure 60:
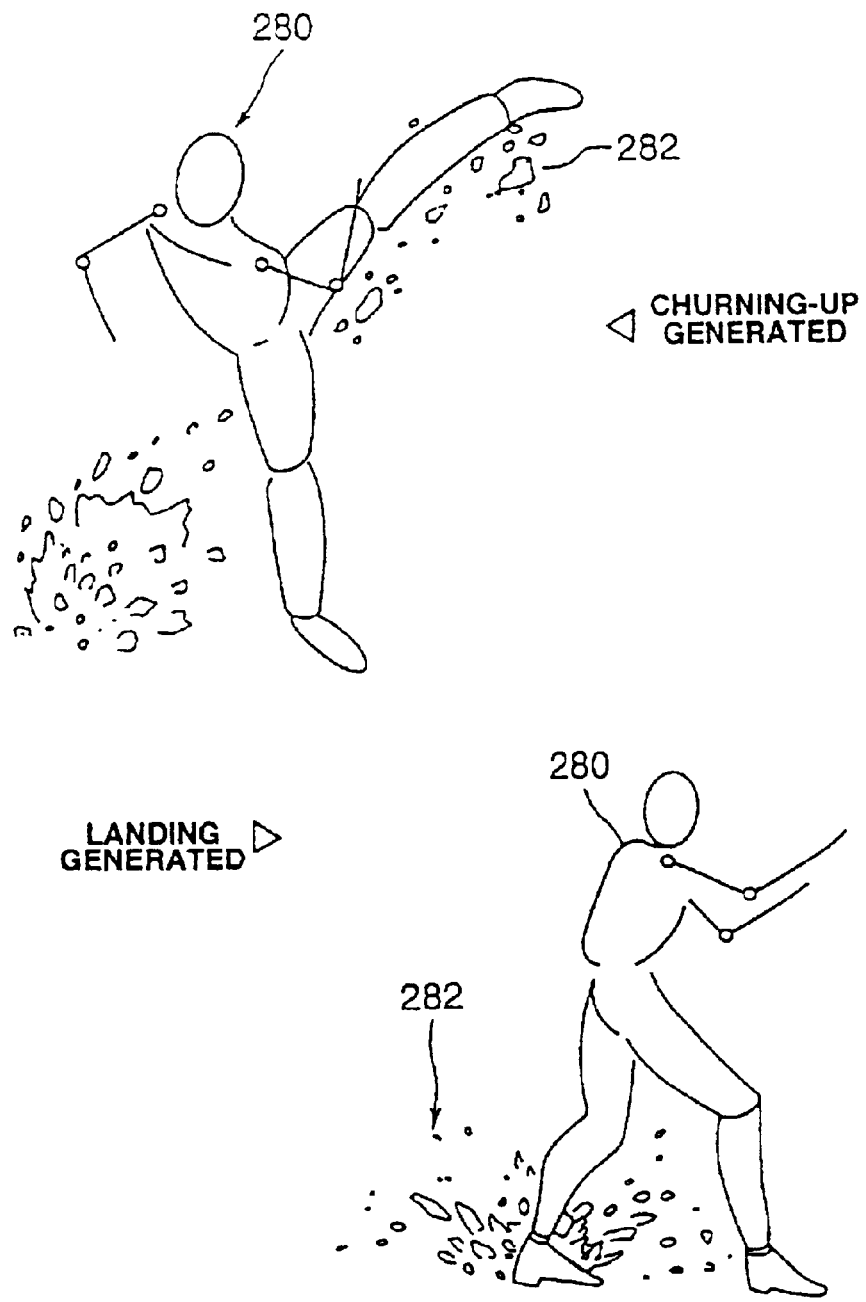
FIG. 60 is a front view illustrating a condition in which churning-up and landing occurrence of flying material have been produced by a model.

Next, a mode of compiling a repeated texture series will be described. FIG. 59 is a diagram given in illustration of this. In the lower section (Bottom), a first texture series is shown; in the middle section (Top), a second texture series is shown. In the upper section (Together), there is shown a third texture series obtained as a result of superimposing the first texture series and second texture series.

The third texture series is a texture series wherein an image (pattern of reflection on sea) which is an image repeated with a prescribed period is formed at a target.

The third texture series is constituted of 30 still pictures 0~29; these pictures are successively mapped onto a polygon (i.e. the pictures are mapped onto polygons 0~29), then further mapped onto numbers 0~29; by repeating these operations, it is arranged that the picture changes at the joining portions of these texture series (for example 28~2) take place in a naturalistic manner (continuously, in other words, without skipping pictures). By this means, an image in which the reflection pattern on the sea surface is repeated can be compiled.

Thus the first and second texture series are compiled using commercially available application software, as already described. In the generation of the texture series, the parameter values are different for respective series. However, due to software limitations, the texture groups of the first region and last region of the texture series are designs showing poor linkage, though they are the same in respective series. Specifically, these are for example number 0 and number 29 of the first texture series and number 0 and number 59 of the second texture series.

Accordingly, in this processing, a transparency parameter that successively changes (0~100%) is applied to the second texture. The numerical values above the second texture series are the values relating to this transparency. 100% indicates a condition in which there is no transparency at all; apart from this, 7% indicates a condition in which transparency is more advanced (93% transparency). 0% gives complete transparency. A parameter of 100% is applied to the first texture.

The third texture series is compiled by successively superimposing the first texture series and the second texture series. Specifically, number 0 of the third texture series is formed by superimposing number 0 of the first texture series and number 30 of the second texture series, number 1 of the third texture series is formed by superimposing number 1 of the first texture series and number 31 of the second texture series, number 29 of the third texture series is formed by superimposing number 29 of the first texture series and number 59 of the second texture series.

In this process, when number 0 of the first texture series and number 30 of the second texture series are superimposed, since the transparency of number 30 of the second texture series is 0 (completely non-transparent condition), number 0 of the first texture series is completely hidden by number 30 of the second texture series so the image of number 0 of the third texture series is equivalent to the image of number 30 of the second texture series. In contrast, when number 29 of the first texture series and number 59 of the second texture series are superimposed, since the transparency of number 30 of the second texture series is 97% (practically transparent condition), the image of number 29 of the third texture series is practically equivalent to the image of number 29 of the first texture series (in other words, the image of number 59 of the second texture series is practically invisible). Thus, when the second texture series is generated, the method of applying the parameter is such that the picture of number 30 is a picture that continues from the picture number 29 of the first texture series, so, when the third texture series is viewed, a picture can be generated whose joining is naturalistic, as described, at the joining section (number 28~number 2) of the texture series. By assigning parameters to the respective texture series such that the picture of the end section of the first texture series (for example number 25 to 29) and that at the initial section of the second texture series (for example number 30 to number 34) link up (or effectively do so), as shown by the arrow in the Figure, by taking into account transparency, continuity can be achieved from number 29 of the first texture series to number 30 of the second texture series, thereby producing pictures in a naturalistically linked mode as illustrated in the drawing by the third texture series.

By storing the third texture series in a prescribed region of memory and successively mapping this onto the polygons indicating the sea surface, images can be displayed in which the pattern and shape of white waves on the sea surface (portions of high brightness on the screen i.e. portions that are displayed as white in FIG. 27) are periodically repeated. In the example shown in the Figure, if one picture is displayed every $\frac{1}{30}$ sec, taking this as being 30 pictures, images in which the pattern of the white-waves portion of the sea surface is periodically repeated every second can be reproduced.

The speed with which the wave mode is reproduced and the number of textures employed can be altered as required. Taking the case of a stage in which a warrior is standing at the centre of the screen, in the near area of the stage (i.e. the vicinity of the centre of the screen), a reproduction speed of ($\frac{1}{30}$ sec per frame, 30 frame reproduction) as described may be assumed; for waves further than this, in order to reduce the calculation load on the computer, the reproduction speed per frame can be lowered and the total number of frames used can be reduced. For example, frames number 0, number 10, number 20 and number 29 of the third texture series may be employed. The reason for doing this is because, even though the reproduction of the images in the vicinity of the periphery of the screen is somewhat rough, the adverse impression on the player is slight and there is more benefit in the lowering of the calculation load on the computer graphics device.

The third texture series is stored in memory of the games device as described. A character series as described above can therefore by utilised in the field of games machines employing computer graphics. The described method of generating a character series can be used not only in the technical field of computer graphics but also in the technical field of compilation of animation video.

Slow Reproduction Processing

Figure 61:
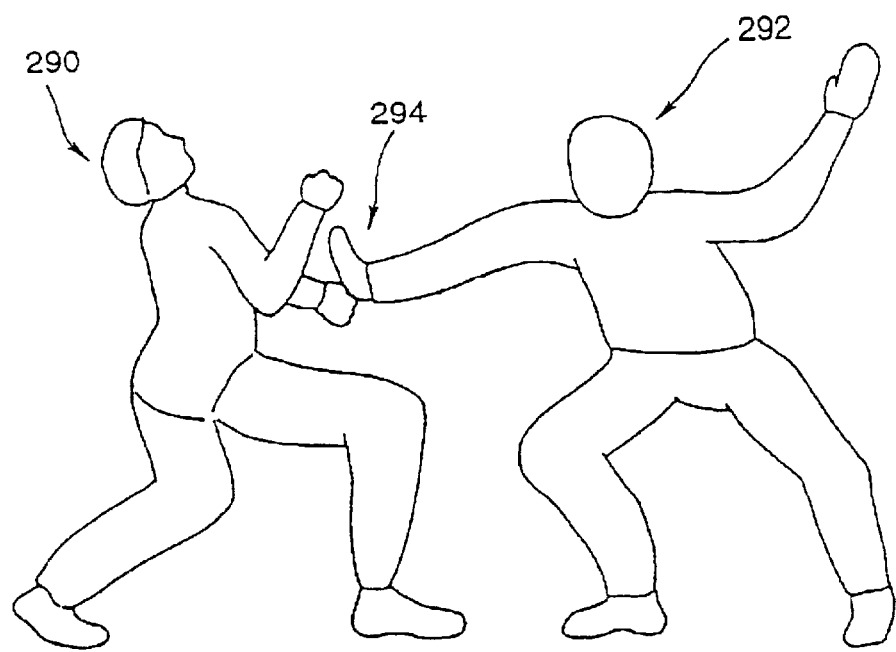
FIG. 61 is a side view given in explanation of character operation for explaining the principles of slow reproduction processing.
Figure 62:
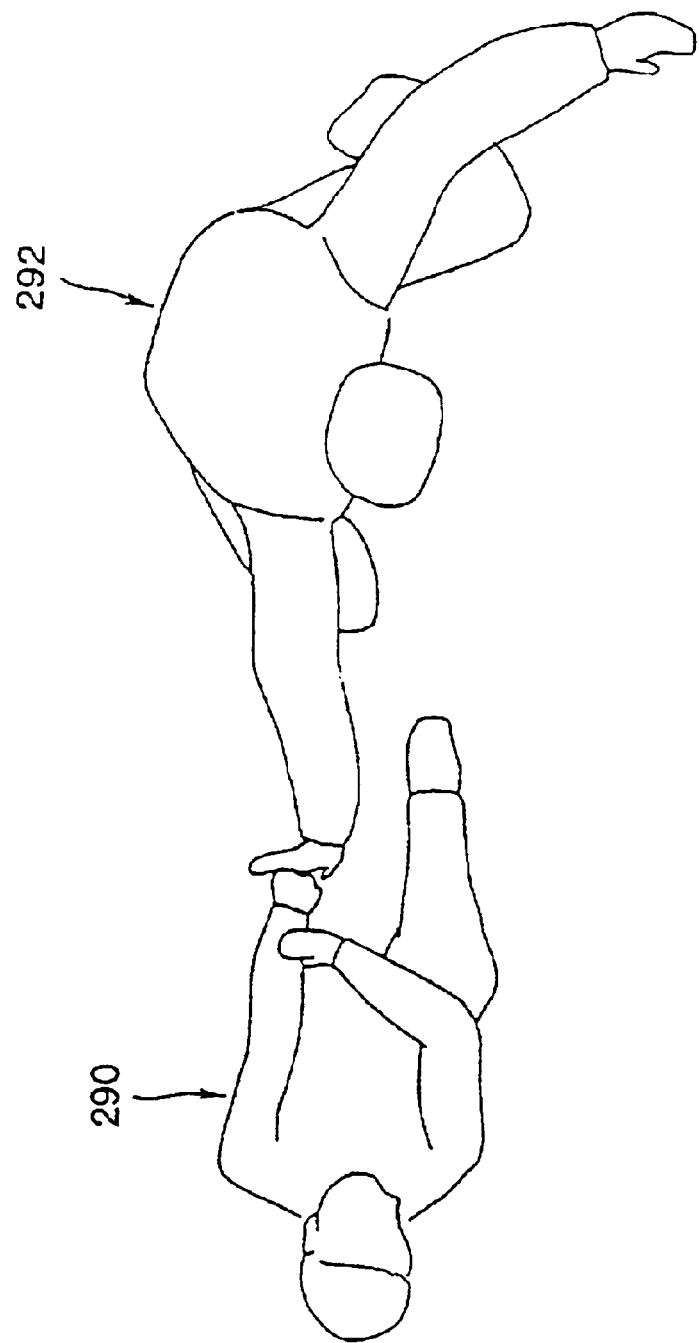
FIG. 62 is a plan view seen from above of FIG. 61.

FIG. 61 to 64 are character operating diagrams given in explanation of the principles of slow reproduction processing (processing with altered reproduction speed). A condition is shown in which two warriors 290 and 292 are facing each other and the two warriors are competing in order to decide which of the two has superior skills. In FIG. 61, 290 is the warrior under attack and 292 is the attacking warrior. Reference numeral 294 is the site of an attack where warrior 290 has been subjected to an attacking move (attack: punch) from warrior 292. FIG. 61 and FIG. 62 which is a plan view of FIG. 61 seen from above shows the condition in which warrior 290 has been directly subjected to the attack.

Figure 63:
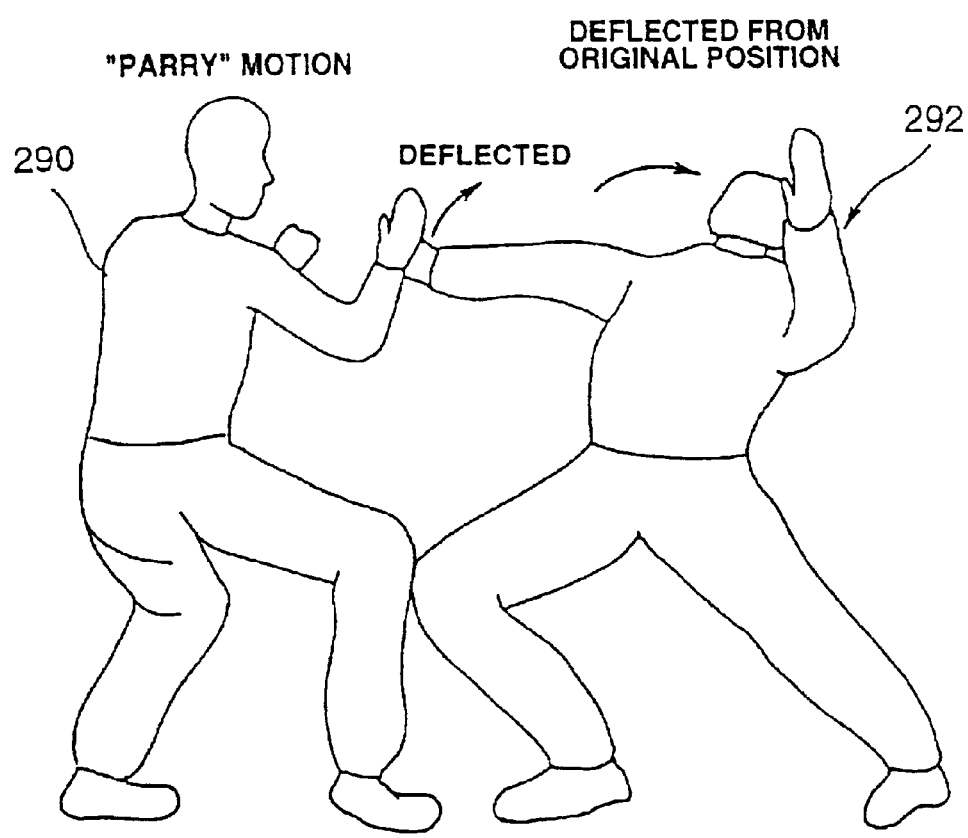
FIG. 63 is a side view given in explanation of character action in the slow reproduction condition.
Figure 64:
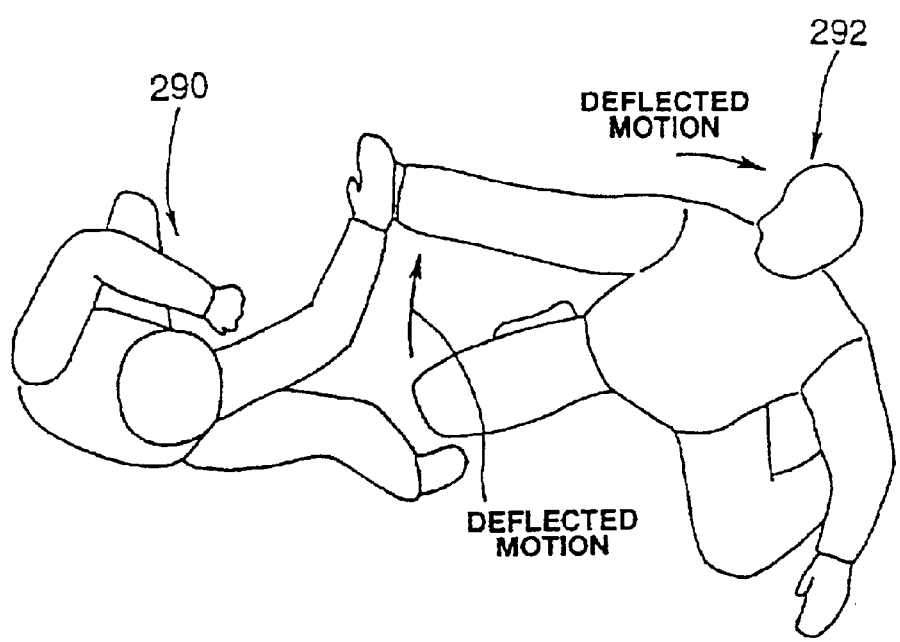
FIG. 64 is a plan view seen from above of FIG. 63.
Figure 65:
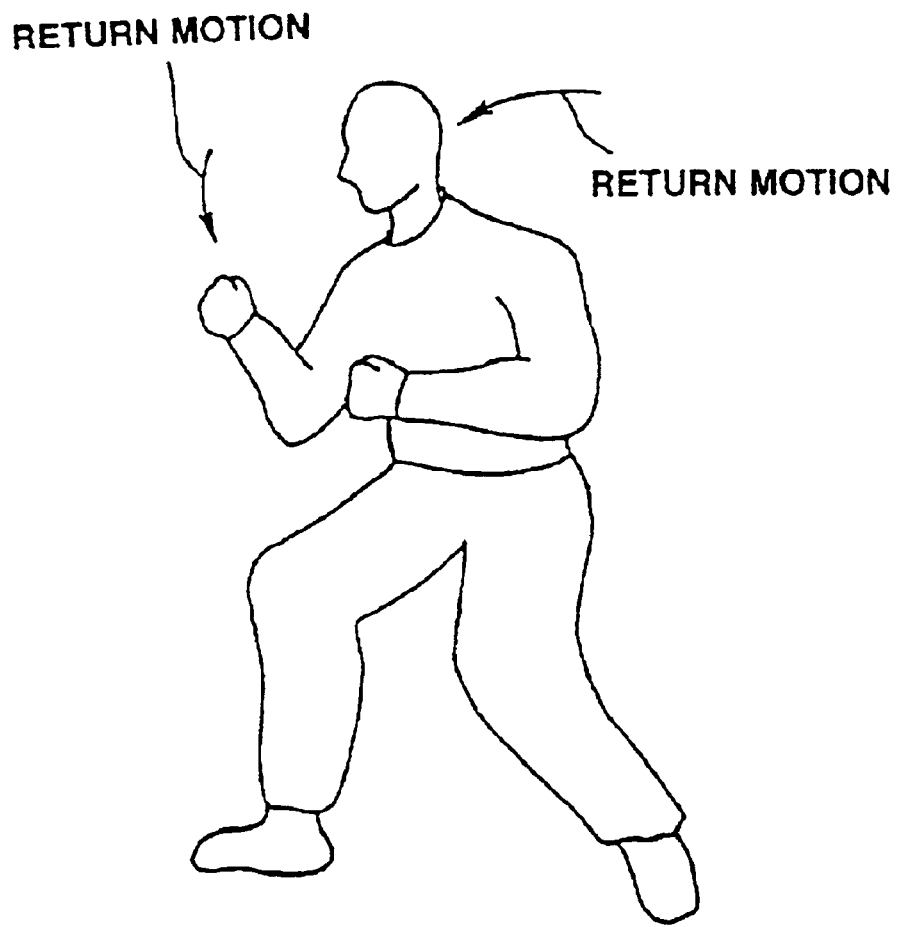
FIG. 65 is a side view showing a character in the condition in which it has returned to its original position.

In contrast, as shown in FIG. 63 and FIG. 64 which is a plan view thereof, warrior 290 parries (i.e. defends) the move from warrior 292 using his right hand part; if this succeeds, a motion is reproduced whereby warrior 292 recoils (gets out of position) in the direction of the arrow. At this point, slow reproduction is performed whereby the reproduction speed of the motion of warrior 292 is lowered.

Thus, let us now suppose that one character (warrior) performs a move ("punch") on another warrior. On the other hand, let us assume that the other warrior practically simultaneously performs a move parrying this punch. It should be noted that this punch or parry could be generated by suitable operation of a control button and/or direction key by the player.

Figure 66:
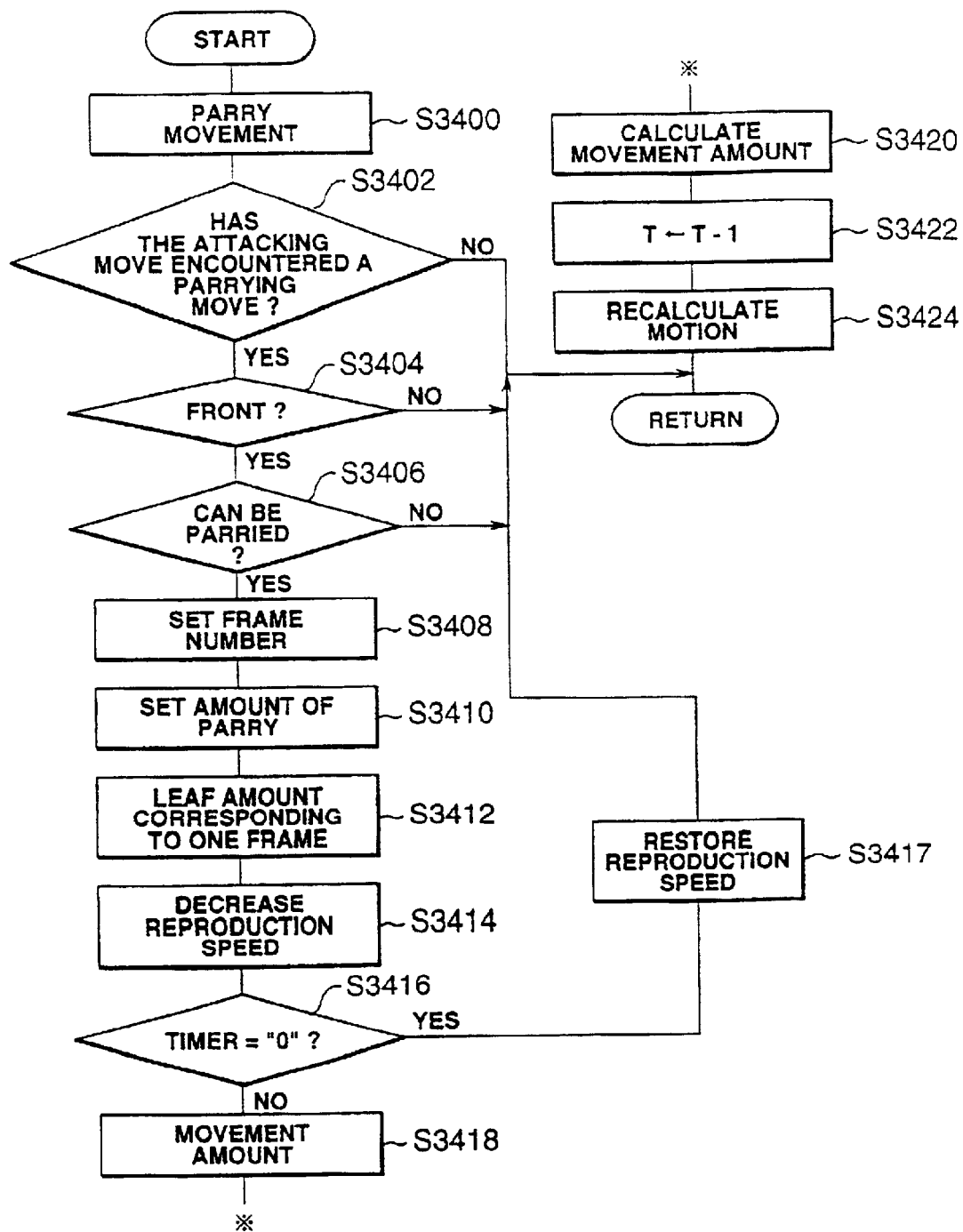
FIG. 66 is an action flow chart of this operation.
Figure 67:
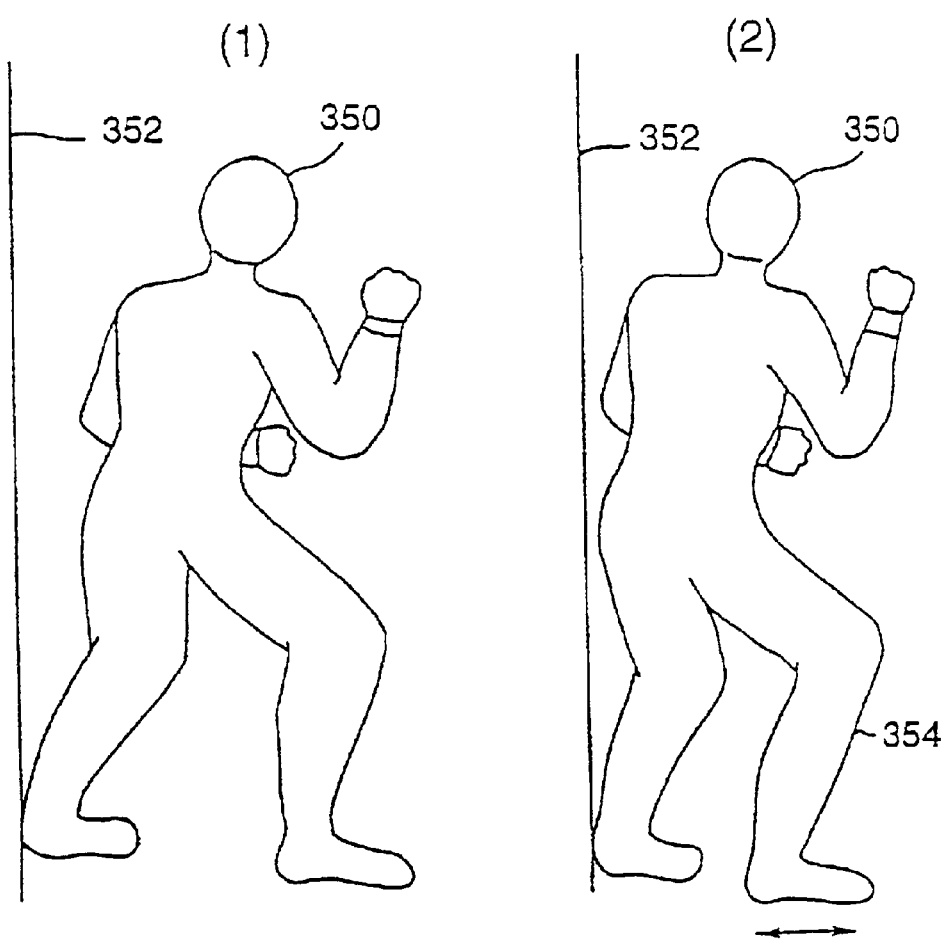
FIG. 67 is a motion diagram of a model represented by collision determination processing of an irregularly shaped zone and a model.

When parrying of this punch is established, a motion is generated whereby the attacking warrior recoils considerably to the rear. At this point, the speed of reproduction of this motion is made smaller than the speed of reproduction of the images of the defending warrior. When this happens, due to this slow reproduction, an "opening" is produced in respect of the attacking warrior, making it easy for the defending warrior to perform an attacking move on the attacking warrior. Once warrior 292 has recoiled, he gradually returns to his original stance (before recoil) as in FIG. 65. FIG. 66 is a flow chart showing this processing. At S3400, the defending warrior performs a parry as described. In S3402, a determination is made as to whether the other side's attacking move (in the case of the Figure, a "punch") has met with a parry (i.e. a collision determination in regard to the hand part of the attacking warrior and a hand part that is under a parry action command). If the result of this determination is negative, return is executed without performance of slow reproduction. On the other hand, if the result of this determination is affirmative, if the attacking character is not positioned in front of the defending character, return is executed; if it is in front, processing goes to S3406 (S3404). In S3406, a determination is made as to whether the move is a move that can be parried or not. For example, if it is a punch, it can be parried; if it is a kick it cannot be parried. This determination can be achieved more easily by setting up special flags for each move and checking the contents of the flag register. If the move is a move that can be parried, the process is terminated; if the move is a move that cannot be parried, processing shifts to S3408. In this step, a number of frames for which slow reproduction is to be performed is set and this is held in a timer. In the next step, S3410, the amount that is to be parried by the move is set (in the example of the Figure, if recoil motion of the attacking warrior is reproduced, the amount of recoil of each part). The number of frames and the amount of parry are calculated in accordance with prescribed characteristic expressions or may be held in tabular form.

In S3412, the amount of parry is divided by the set number of frames and a leaf amount (amount of movement and direction of movement in the spatial co-ordinate system) corresponding to one frame is calculated. Then, in S3414, the speed of reproduction (display speed) of the attacking warrior is made for example half that of the defending warrior. For example, the reproduction speed of the attacking character is made $\frac{1}{30}$ sec, half of $\frac{1}{60}$ sec.

Next, in S3416, the timer value is determined;. if this is "0", slow reproduction is deemed to have been completed and the reproduction speed of the attacking warrior is returned to the original condition (S3417) and return is executed. On the other hand, if it is not "0", the leaf amount for one frame is multiplied by the timer value and this is regarded as an amount of movement by the attacker. Then, in S3420, this amount of movement is added to the co-ordinate value of the attacking warrior. Specifically, in the position of attacking warrior 292 of FIG. 51, the amount of movement (recoil amount: original position (position of warrior 292 of FIG. 61)) when a parry took place in FIG. 63 is added.

Next, in S3422, 1 is subtracted from the value (T) of the timer, and, in S3424, the motion position of the attacking warrior 292 (FIG. 63) is re-calculated. Return to the main routine is then executed.

With this processing, if the parry succeeded, images are reproduced wherein the attacking warrior, after first of all recoiling considerably, gradually recoils further in the slow reproduction condition. At this point, the defending warrior can easily perform an attacking move on the attacking warrior.

With this processing, reproduction of motion by another warrior can be performed whilst the reproduction speed for motion by a first warrior is lowered, so the player can more effectively perform fighting moves of the defending warrior that he is controlling: this has led to the provision of a facility for slow reproduction as a game element. Slow reproduction can therefore enable a high degree of dramatic effect to be achieved.

It should be noted that the present invention is not restricted to the embodiments described above but could be further modified in various ways by persons skilled in the art within the scope of the claims.

As the memory (recording) medium for storing the operating program of the games machine, apart from cartridge ROM or CD-ROM as described above, communication media such as the Internet or personal computer networks could be used; an electronic mail server is also included.

What is claimed is:

1. An image processing device for a game, comprising:
a processor for providing a number of characters in a virtual space;
a display for displaying images of the virtual space from a virtual viewpoint;
first means for determining whether a condition is established between a first character and a second character, wherein the condition is established when the first character initiates a first motion relative to the second character;
second means for reflecting a response to the established condition in the movement of the two characters, wherein, in response to the first motion, the second character initiates a second motion relative to the first character; and
third means for lowering a reproduction speed of motion of the first character when the second motion succeeds relative to the first motion.

2. The image processing device of claim 1, wherein the established condition is a competition to determine which of the first character and second character has superior skills.

3. The image processing device of claim 1, wherein the first motion comprises an attacking motion.

4. The image processing device of claim 1, wherein the second motion comprises a defending motion.

5. The image processing device of claim 1, wherein the first motion is controlled by a player of the game.

6. The image processing device of claim 1, wherein the second motion is controlled by a player of the game.

7. The image processing device of claim 1, wherein the first motion is controlled by a first player of the game, and wherein the second motion is controlled by a second player of the game.

8. The image processing device of claim 1, wherein the second motion succeeds relative to the first motion depending on relative positions of the first and second characters in the virtual space.

9. The image processing apparatus of claim 1, wherein the second motion succeeds relative to the first motion depending on the first motion.

10. The image processing apparatus of claim 1, wherein the second motion succeeds relative to the first motion depending on the first and second motions.

11. The image processing apparatus of claim 1, wherein the reproduction speed of motion of the first character is lowered after a time delay.

12. The image processing device of claim 1, wherein, after the reproduction speed of motion of the first character is lowered, the reproduction speed of motion of the first character is raised after a time delay.

* * * * *